US012699602B1

(12) United States Patent
Ciolkosz et al.

(10) Patent No.: US 12,699,602 B1
(45) Date of Patent: Aug. 4, 2026

(54) PARALLEL THREAD SYNCHRONIZATION

(71) Applicant: NVIDIA Corporation, Santa Clara, CA (US)

(72) Inventors: Piotr Ciolkosz, Stalowa Wola (PL); Kyrylo Perelygin, San Jose, CA (US); Harold Carter Edwards, Campbell, CA (US); Wesley Maxey, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1231 days.

(21) Appl. No.: 17/367,053

(22) Filed: Jul. 2, 2021

Related U.S. Application Data

(60) Provisional application No. 63/216,437, filed on Jun. 29, 2021.

(51) Int. Cl.
*G06F 9/52* (2006.01)
*G06F 9/54* (2006.01)

(52) U.S. Cl.
CPC .............. *G06F 9/522* (2013.01); *G06F 9/544* (2013.01)

(58) Field of Classification Search
CPC ...................................................... G06F 9/522
See application file for complete search history.

(56) References Cited

U.S. PATENT DOCUMENTS

2011/0072244 A1* 3/2011 Lindholm et al. ........ G06F 9/38
2011/0078417 A1* 3/2011 Fahs et al. ................ G06F 9/38

2012/0198214 A1* 8/2012 Gadre et al. ............ G06F 9/312
2013/0305021 A1* 11/2013 Grover et al. .......... G06F 9/312
2016/0259667 A1* 9/2016 Bailey et al. .......... G06F 9/505
2018/0293102 A1* 10/2018 Ray et al. .............. G06F 9/505
2019/0026149 A1* 1/2019 Jiang et al. ........... G06F 9/4843
2019/0035051 A1* 1/2019 Vembu et al. ............ G06T 1/20

OTHER PUBLICATIONS

International Search Report and Written Opinion for Application No. PCT/US2022/076442, mailed Jan. 20, 2023, filed Sep. 14, 2022, 14 pages.
Valero-Lara et al., "Analysis in Performance ancl New Model for Multiple Kernels Executions on Many-Core Architectures," 12th International Conference on Cognitive Informatics and Cognitive Computing, Jul. 2, 2013, 6 pages.
Pradeep, "CUDA Refresher: The CUDA Programming Model," retrieved from https://deweloper.nvidia.com/bl-og/cudare-refresher-cuda-prograrmning-model/, Jun. 26, 2020, 4 pages.
Awatramani et al., "Increasing GPU ThroughPut Using Kernel Interleaved Thread Block Scheduling," IEEE 31st International Conference on Computer Design, Oct. 6, 2013, 4 pages.
Zhao et al., "Fair and Cache Blocking Aware Warp Scheduling for Concurrent Kernel Execution on GPU," Future Generation Computer Systems, vol. 112, May 21, 2020, 13 pages.
IEEE, "IEEE Standard 754-2008 (Revision of IEEE Standard 754-1985): IEEE Standard for Floating-Point Arithmetic," Aug. 29, 2008, 70 pages.

* cited by examiner

*Primary Examiner* — James J Debrow
(74) *Attorney, Agent, or Firm* — Davis Wright Tremaine LLP

(57) ABSTRACT

Apparatuses, systems, and techniques to implement cooperative thread groups. In at least one embodiment, two or more groups of synchronized threads are synchronized and executed in parallel for efficient execution on a GPU.

60 Claims, 47 Drawing Sheets

Parallel Processing

102 — Thread ⟹ Core — 104

106 — Warp
108 —

* Up to 32 Cores running
32 concurrent Threads

Parallel Processing
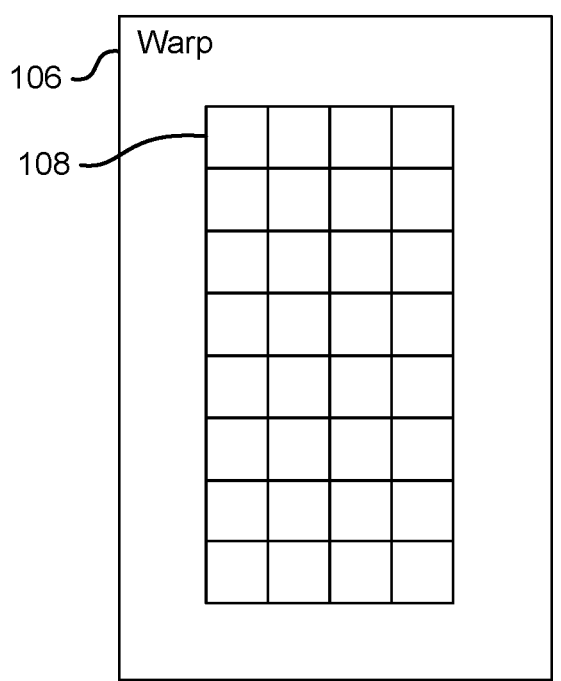
\* Up to 32 Cores running
32 concurrent Threads
FIG. 1

Multi-Warp Cooperative Group of Threads 64 cores/64 threads/2
Warps

Multi-Warp Cooperative Group of Threads 128 cores/128 threads/4 Warps

16-Warps 4 Warps/Group

16-Warps 8 Warps/Group

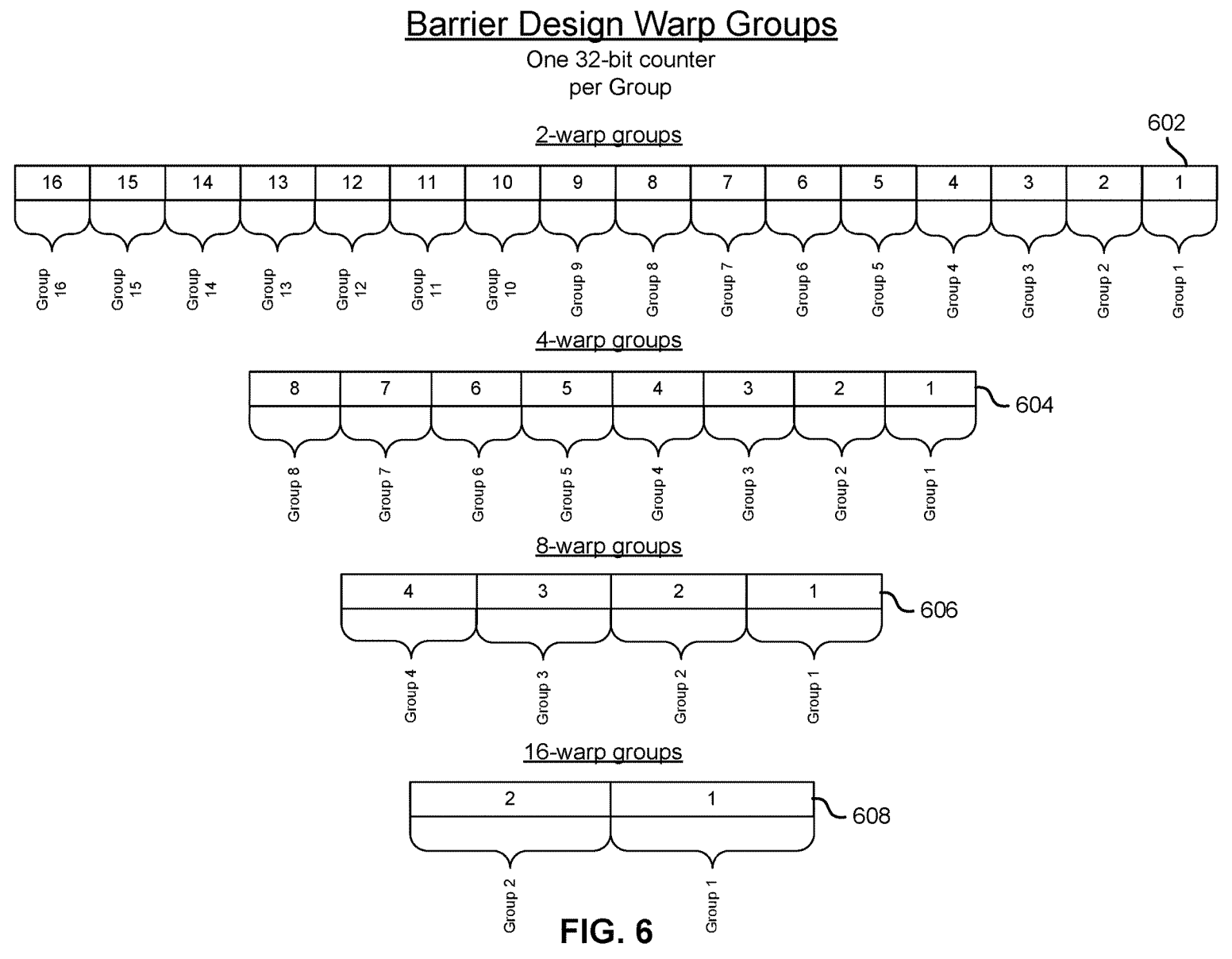

Barrier Design Warp Groups

One 32-bit counter per Group

2-warp groups

602

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|

Group 1, Group 2, Group 3, Group 4, Group 5, Group 6, Group 7, Group 8, Group 9, Group 10, Group 11, Group 12, Group 13, Group 14, Group 15, Group 16

4-warp groups

604

| 1 | 2 | 3 | 4 | 5 | 6 | 7 | 8 |
|---|---|---|---|---|---|---|---|

Group 1, Group 2, Group 3, Group 4, Group 5, Group 6, Group 7, Group 8

8-warp groups

606

| 1 | 2 | 3 | 4 |
|---|---|---|---|

Group 1, Group 2, Group 3, Group 4

16-warp groups

608

| 1 | 2 |
|---|---|

Group 1, Group 2

FIG. 6

DATA CENTER
1000
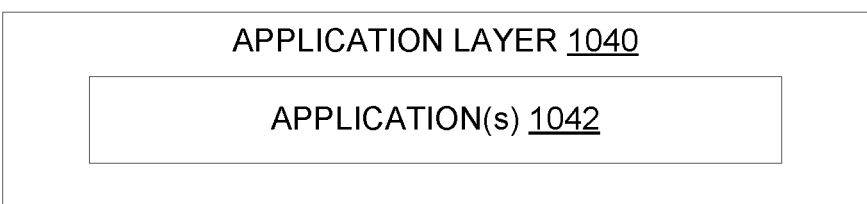
APPLICATION LAYER 1040
APPLICATION(s) 1042
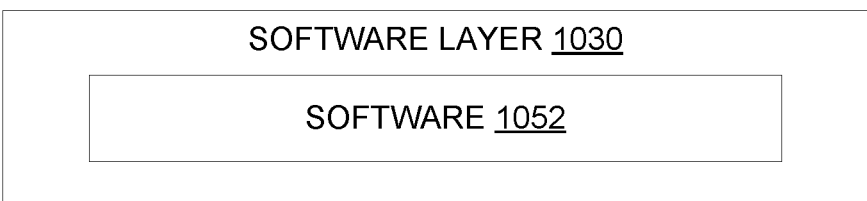
SOFTWARE LAYER 1030
SOFTWARE 1052
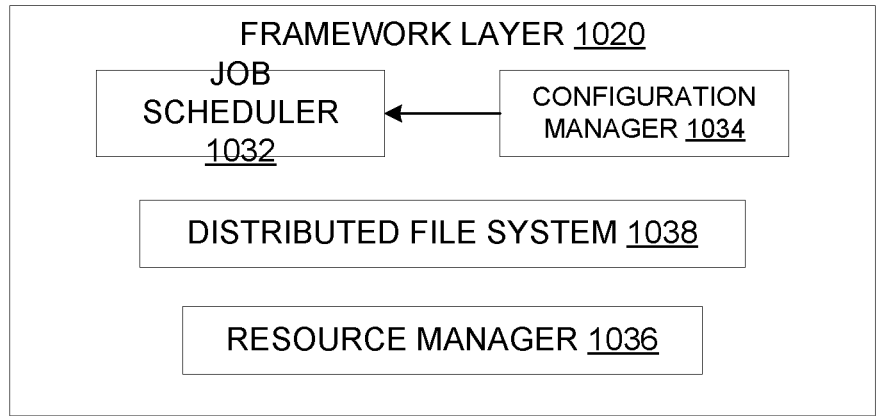
FRAMEWORK LAYER 1020
JOB SCHEDULER 1032 ◄─── CONFIGURATION MANAGER 1034
DISTRIBUTED FILE SYSTEM 1038
RESOURCE MANAGER 1036
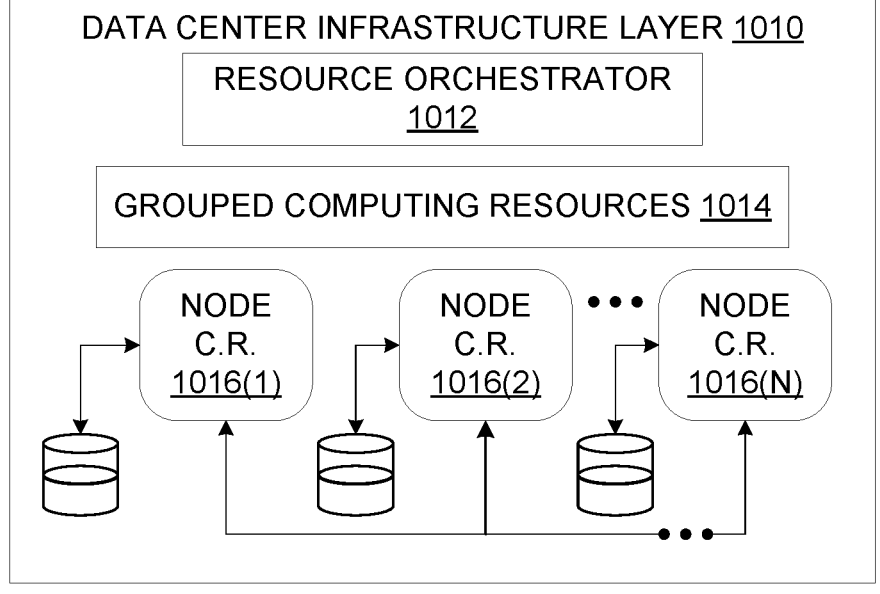
DATA CENTER INFRASTRUCTURE LAYER 1010
RESOURCE ORCHESTRATOR 1012
GROUPED COMPUTING RESOURCES 1014
NODE C.R. 1016(1)  NODE C.R. 1016(2)  • • •  NODE C.R. 1016(N)
FIG. 10

1500

1910

GRAPHICS PROCESSOR
1940

INTER-CORE TASK MANAGER
(e.g., THREAD DISPATCHER)
1945

| SHADER CORE 1955A | SHADER CORE 1955C | SHADER CORE 1955E | - - - | SHADER CORE 1955N-1 |

| SHADER CORE 1955B | SHADER CORE 1955D | SHADER CORE 1955F | - - - | SHADER CORE 1955N |

TILING UNIT
1958

| MMU 1920A | MMU 1920B |
| CACHE 1925A | CACHE 1925B |
| INTERCONNECT 1930A | INTERCONNECT 1930B |

GRAPHICS CORE
2000

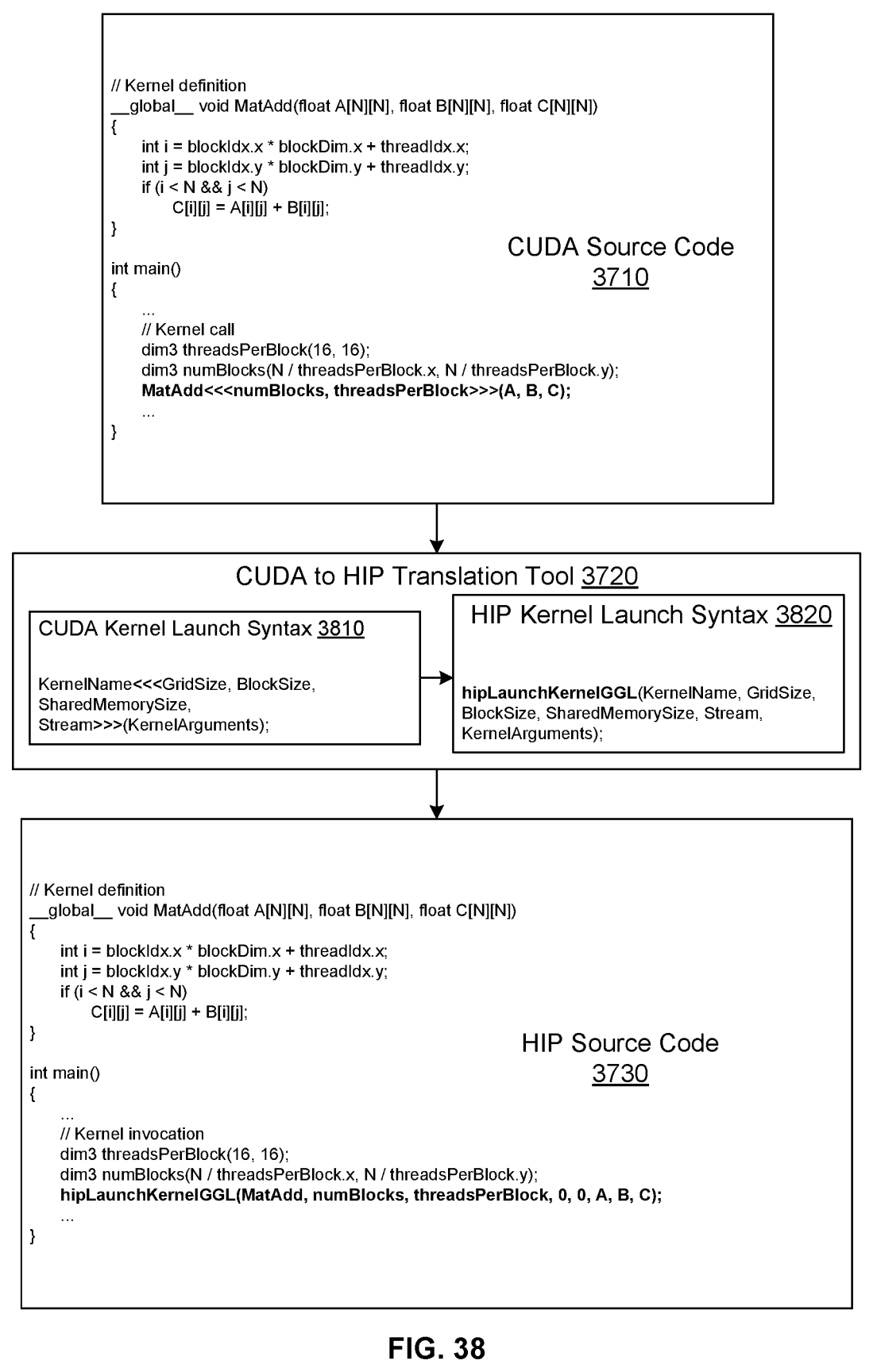

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
} int main()
{
    ...
    // Kernel call
    dim3 threadsPerBlock(16, 16);
    dim3 numBlocks(N / threadsPerBlock.x, N / threadsPerBlock.y);
    MatAdd<<<numBlocks, threadsPerBlock>>>(A, B, C);
    ...
}
```

CUDA Source Code
3710

CUDA to HIP Translation Tool 3720

CUDA Kernel Launch Syntax 3810

KernelName<<<GridSize, BlockSize, SharedMemorySize, Stream>>>(KernelArguments);

HIP Kernel Launch Syntax 3820 hipLaunchKernelGGL(KernelName, GridSize, BlockSize, SharedMemorySize, Stream, KernelArguments);

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
} int main()
{
    ...
    // Kernel invocation
    dim3 threadsPerBlock(16, 16);
    dim3 numBlocks(N / threadsPerBlock.x, N / threadsPerBlock.y);
    hipLaunchKernelGGL(MatAdd, numBlocks, threadsPerBlock, 0, 0, A, B, C);
    ...
}
```

HIP Source Code
3730

FIG. 38

Grid <u>4020</u>
*GridSize = dim3(BX,BY,1)   BlockSize = dim3(TX,TY,1)*

Thread Block <u>4030(1,1)</u>

| Thread <u>4040(1,1)</u> | ••• | Thread <u>4040(1,TY)</u> |

| Thread <u>4040(TX,1)</u> | ••• | Thread <u>4040(TX,TY)</u> |

<u>4030(1,BY)</u>

<u>4030(BJ,1)</u>

<u>4030(BJ,BY)</u>

Compute Unit <u>3940(1)</u>

Shared Memory <u>3960(1)</u>

<u>4030(BJ+1,1)</u>

Compute Unit <u>3940(2)</u>

<u>4030(BJ+1,BY)</u>

<u>4030(BX,1)</u>

<u>4030(BX,BY)</u>

Shared Memory <u>3960(2)</u>

Compute Unit <u>3940(C)</u>

Programmable Processing Unit 3920(1)

PARALLEL THREAD SYNCHRONIZATION

CROSS-REFERENCE TO RELATED APPLICATIONS

This application claims the benefit of U.S. Provisional Application No. 63/216,437, filed Jun. 29, 2021, titled "PARALLEL THREAD SYNCHRONIZATION," the entire contents of which is incorporated herein by reference.

FIELD

At least one embodiment pertains to processing resources used to execute a program using parallel processing. For example, at least one embodiment pertains to processors or computing systems that execute one or more CUDA programs which use cooperative thread groups that spans multiple warps.

BACKGROUND

Configuring an application program to utilize multiple processing resources in parallel can greatly increase performance of program. For example, by increasing number of processing cores that can be used concurrently, time required to complete a program can be reduced. Therefore, techniques that allow greater amounts of parallelism are an important area of development.

BRIEF DESCRIPTION OF DRAWINGS

FIG. 1 illustrates an example of a warp, in accordance with at least one embodiment;

FIG. 6 illustrates an example of a barrier implementation based on a counter, in accordance with at least one embodiment;

FIG. 10 illustrates an exemplary data center, in accordance with at least one embodiment;

FIG. 38 illustrates an exemplary kernel translated by CUDA-to-HIP translation tool of FIG. 37C, in accordance with at least one embodiment;

DETAILED DESCRIPTION

Figure 2:
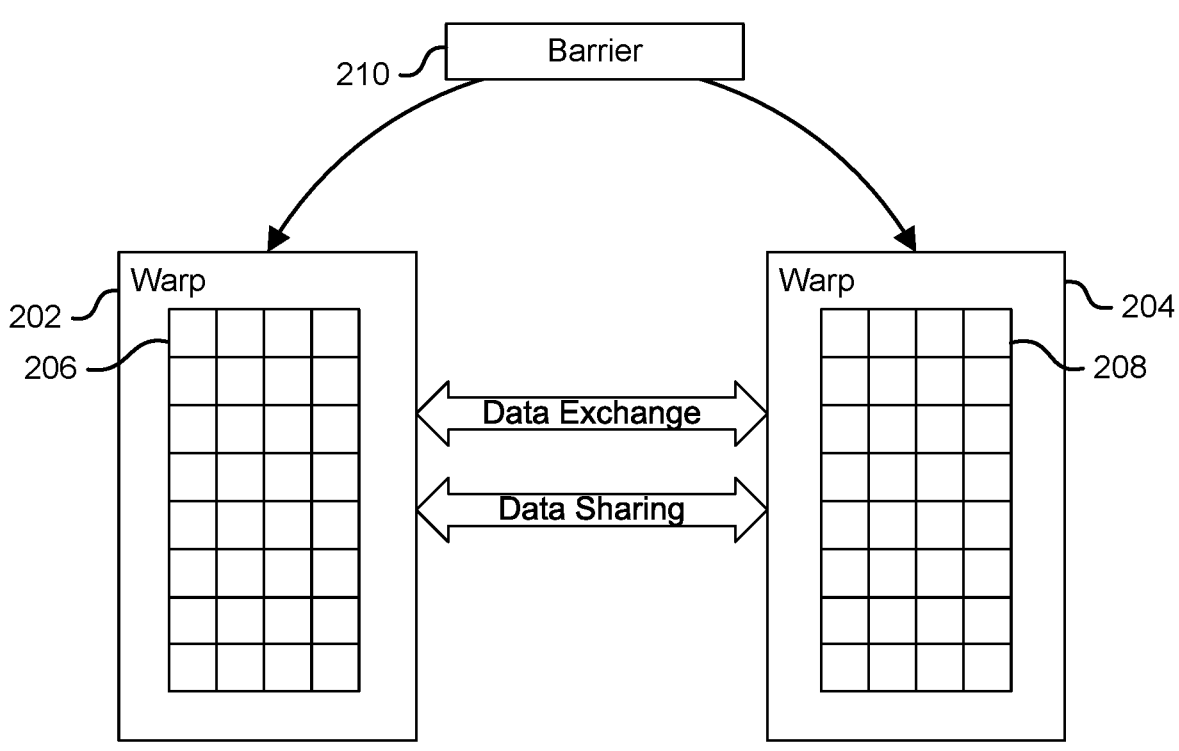
FIG. 2 illustrates an example of a cooperative thread group spanning 2 warps, in accordance with at least one embodiment.

The present document describes systems and methods that allow for increased parallelism when executing an application by allowing increased flexibility in composition of cooperative thread groups. In at least one embodiment, a cooperative thread group is a group of threads running on a multi-core processor or graphics processing unit ("GPU") with multiple cores such as CUDA cores. In at least one embodiment, each thread is assigned to a dedicated core and runs concurrently with other threads in a group.

In at least one embodiment, cooperative groups is a library feature that implements a cooperative model, where multiple threads are named by a single group handle or identifier. In at least one embodiment, such a handle can be used to direct all threads in a group to collectively perform operations. In at least one embodiment, cooperative groups may be used to split a thread block into groups of at most 32 threads. In at least one embodiment, this limit is imposed by hardware limitations of a processor, such as maximum size of a HW warp on a GPU. In at least one embodiment, such limitations may make it difficult to express decompositions of a problem into larger groups of 128 or 256 threads, unless each fragment is a separate thread block.

At least one embodiment adds support for thread groups of size 64, 128, 256, 512 and 1024 threads to operate as a cooperative group notwithstanding a limit of 32 threads per warp. In at least one embodiment therefore, groups of 64 or more threads span multiple warps. In at least one embodiment, using such groups, it is possible to express synchronization and collective operations using fragments of a thread block. In at least one embodiment, such fragments are independent. In at least one embodiment, different fragments of a thread block can be specialized for different types of computations.

In at least one embodiment, collective operations may include one or more of: reduce, all, any, and shfl. In at least one embodiment, a portion of memory is reserved for synchronization barriers used by these groups. In at least one embodiment, additional memory is reserved for collectives. In at least one embodiment, multi-warp barriers are implemented using atomicAdd to count arrived warps and use highest bit as a barrier phase. In at least one embodiment, each group uses a separate barrier, therefore one barrier is allocated per possible group.

In at least one embodiment, because a number of warps in a cooperative group is limited (to 32, 64, or some other implementation-specific value) by hardware, a full range of an integer is not needed to count arriving warps. However, in at least one embodiment it may not be possible to use fewer bits as a barrier because hardware atomic addition operations do not support smaller datatypes.

However, instead of using smaller barriers, at least one embodiment exploits a limit of 32 warps by representing each warp in a group with one bit in a 32-bit barrier. In at least one embodiment, an arriving warp uses an atomic OR operation to set a corresponding bit to record arrival. In at least one embodiment, old value retuned by an atomic OR operation is compared with a group mask, and if a warp is a last warp to arrive at a barrier, an atomic AND operation is performed to clear all bits that represent a cooperative group's warps to release them from the afore-mentioned barrier.

In at least one embodiment, a single barrier can be used for multiple groups as long as groups do not have any common warps. In at least one embodiment, with this approach, one barrier is needed for each possible size of multi-warp group, instead of one barrier per possible group.

Numerous specific details are set forth to provide a more thorough understanding of at least one embodiment. However, it will be apparent to one skilled in art that inventive concepts may be practiced without one or more of these specific details.

In at least one embodiment, collective operations, multi-warp groups, and other features require allocation of working space (memory) that is shared by a cooperative group. In at least one embodiment, lifetime of this memory is often limited to duration of collective operation and is at most a lifetime of a kernel.

In at least one embodiment, for a thread block or smaller scope cooperative group working space may reside in shared memory or global memory. In at least one embodiment, for grid block or smaller scope cooperative group working space may reside in global memory. In at least one embodiment, for multi-grid or smaller scope cooperative group working space may reside in unified or system memory.

In at least one embodiment, working space in shared memory can only be given within a kernel as a carve-out from kernel's total shared memory. In at least one embodiment, working space in global memory should be given at kernel launch with this contract. In at least one embodiment, during execution a kernel has exclusive use of global memory working space, and upon exiting a kernel has no claim to a global memory working space.

In at least one embodiment, working space is a memory carve-out provided by user. In at least one embodiment, working space is allocated by a driver and passed to CG runtime via parameters.

At least one embodiment allows any object that satisfies is_trivially_copyable constraint to access a SoL shuffle implementation. In at least one embodiment, performance should be tuned for some given size. e.g. [1-8] byte objects use native_shfl_xxx intrinsics while larger ones may use multiple device shuffles or finally an in memory shuffle accelerated with shared or global memory.

In at least one embodiment, this allows cg::reduce ( . . . ) to shuffle custom types. In at least one embodiment, complex numbers and vector types are allowed to work with an API.

```
cuda::std::complex<float> c = input [threadIdx.x];
// Any structure that satifies 'group.shfl' will also satisfy cg::reduce
auto result = cg::reduce(..., c, op);
```

5

In at least one embodiment, developers often use matrix types or other abstractions that device intrinsics do not normally have overloads for. For example:

```
struct half_pair {
  half x;
  half y;
};
__shfl_down_sync (..., half_pair,...) // Fails to compile
```

6

In at least one embodiment, this use case is supported within a Cooperative Group warp/tile interface and provide an easy way to access SoL intrinsics if an object is trivial. In at least one embodiment, this also automatically extends warp and tile cooperative_groups::reduce ( . . . ) which allows for efficient SOL reductions on complex types.

In at least one embodiment, users see following front end when attempting to shuffle a trivial object:

```
// participating group
auto tile = cg::tiled_partition<32>(tb);
// This type is definitely not supported by __shfl_down_sync (...)
cuda::std::tuple<int, int> val(x, y);
// This interface now handles dispatching to a shuffle that can handle this object
tile.shfl_down(val, tile.size( )/2);
```

In at least one embodiment, an example object that should raise a compilation error:

```
struct not_trivial {
  int x;
  // Non-trivial copy constructor (i.e. we'd bypass copy side-effects)
  not_trivial(not_trivial const&) { }
};
// Raises a static assert that "Object is not trivially copyable"
tile. shfl_down(non_trivial{ }, tile.size( )/2);
```

In at least one embodiment, interface for tile and warp group shuffles would be modified to use a shuffle dispatch structure that automatically decides strategy for a given object.

```
template <typename TyElem, typename TyRet = details::remove_qual<TyElem>>
_CG_QUALIFIER TyRet shfl_down(TyElem&& elem, unsigned int delta) const {
    //shuffle_dispatch is front-end for deciding correct strategy
  return details::tile::shuffle_dispatch<TyElem>::shfl_down(
    _CG_STL_NAMESPACE::forward<TyElem> (elem), build_mask( ), delta, numThreads);
}
```

In at least one embodiment, an interface for shuffle_dispatch inherits a strategy that is best suited for shuffling a given object.

```
// Almost all arithmetic types are supported by native shuffle
// Vector types are exception
template <typename TyElem>
using use_native_shuffle = _CG_STL_NAMESPACE::integral_constant<
  bool,
    _CG_STL_NAMESPACE::is_integral<
      _CG_STL_NAMESPACE::remove_reference_t<TyElem>>::value
  details::is_float_or_half<
      _CG_STL_NAMESPACE::remove_reference_t<TyElem>>::value
>;
template <typename TyElem,
    bool IsNative = use_native_shuffle<TyElem>::value,
    bool InMem = (sizeof (TyElem) > 16)>
struct shuffle_dispatch;
template <typename TyElem>
struct shuffle_dispatch<TyElem, true, false>: public NativeShuffle { };
template <typename TyElem>
struct shuffle_dispatch<TyElem, false, false>: public CompatShuffle { };
template <typename TyElem>
struct shuffle_dispatch<TyElem, false, true>: public InMemShuffle { };
};
```

In at least one embodiment, a design for a shuffle strategy follows:

```
struct NativeShuffle {
    template <typename TyElem>
    _CG_STATIC_QUALIFIER TyElem shfl(
        TyElem elem, unsigned int gMask, unsigned int srcRank, unsigned int threads) {
      return __shfl_sync (gMask, elem, srcRank, threads);
    }
    template <typename TyElem>
    _CG_STATIC_QUALIFIER TyElem shfl_down(
        TyElem elem, unsigned int gMask, unsigned int delta, unsigned int threads) {
      return __shfl_down_sync (gMask, elem, delta, threads);
    }
    template <typename TyElem>
    _CG_STATIC_QUALIFIER TyElem shfl_up(
        TyElem elem, unsigned int gMask, unsigned int delta, unsigned int threads) {
      return __shfl_up_sync (gMask, elem, delta, threads);
    }
    template <typename TyElem>
    _CG_STATIC_QUALIFIER TyElem shfl_xor(
        TyElem elem, unsigned int gMask, unsigned int lMask, unsigned int threads) {
      return __shfl_xor_sync(gMask, elem, lMask, threads);
    }
};
```

In at least one embodiment, restriction of single warp has been a common complaint for more complex producer/consumer models. In at least one embodiment, instead of a single warp producing, a solution might call for two warps, together or pipelined, producing into another set of equally warp-multiple consumers. In at least one embodiment, even in a single-warp producer scenario, a solution may need one consumer to synchronize with producer, independently of other consumer. In at least one embodiment, this would require two different groups of 2 warps each with 64 threads.

In at least one embodiment, Cooperative Groups allow a thread block to be statically split into groups of at most 32 threads (size of a hardware warp). In at least one embodiment, it makes it impossible to express decompositions of a problem into groups of 128 or 256 threads. In at least one embodiment, implementation of a class representing a group spanning multiple warps would allow to express such decompositions using Cooperative Groups in same way warp partitions are expressed. In at least one embodiment, implementation of a group of 128 threads is required to allow Cooperative Groups to expose intrinsics like this to users.

At least one embodiment modifies thread_block_tile class to allow sizes of 64, 128, 256 and 512 in addition to smaller sizes of thread blocks. In at least one embodiment, class exposes different interface based on size of group. In at least one embodiment, for sizes<=32, interface of class deploys threads within a single warp so that they are executed in parallel. In at least one embodiment, for sizes>32 class exposes some of methods present in thread_block_tile: sync, thread_rank, size, meta group_rank and meta_group_size. In at least one embodiment, it also exposes a few of collectives present in thread_block_tile: any, all and shfl, but in case of shfl, only calls with same source index in all calling threads are supported (broadcast operation).

In at least one embodiment, interfaces accepting thread_block_tile like reduce and memcpy_async accept thread_block_tile with new sizes as well, except binary_partition and labeled_partition functions.

In at least one embodiment, to implement synchronization and collectives, methods of multi-warp thread_block_tiles use shared memory. In at least one embodiment, a user provides this shared memory to a new this_thread_block overload using block_tile_memory structure in order to be able to partition that thread_block into tiles of new sizes. In at least one embodiment, that structure is declared as a shared memory variable. In at least one embodiment, Block_tile_memory structure has two template parameters, maximal number of threads current block can consist of and amount of memory in bytes that each warp can use for collective operations. In at least one embodiment, these arguments are needed to determine how much shared memory needs to be allocated. In at least one embodiment, because new this_thread_block overload prepares shared memory before partitioned groups are used, it is now called by all threads in partitioned group.

```
// Maximal number of threads in current thread block.
const unsigned int max_threads = 512;
// Each warp can use 16B for collectives.
const unsigned int per_warp_scratch = 16;
__shared__ wide_tile_memory<per_warp_scratch, max_threads> scratch;
auto thb = this_thread_block(scratch);
auto four_warps = experimental::tiled_partition<128> (thb);
four_warps.sync( );
auto result = cg::reduce(four_warps, val, op);
```

In at least one embodiment, multi-warp thread_block_tile provides interface that is a subset of methods of single-warp thread_block_tile. In at least one embodiment, implementation of those methods requires each group that is possible to be created to have exclusive access to a 4B memory location used as barrier during synchronization of that group. In at least one embodiment, only groups of size that is a power of two are allowed, and therefore number of all possible groups that can be obtained through partitions of a cooperative thread array ("CTA") is equal to number of warps in that CTA minus 2.

In at least one embodiment, to implement collectives, each warp uses some memory to exchange data. In at least one embodiment, amount of memory each warp has access to is configured through TileCommunicationSize template parameter to block_tile_memory.

In at least one embodiment, each CTA uses $T/32*(4+P)$ bytes of shared memory, where T is specified maximal number of threads in CTA and P is specified number of bytes per warp for collective operations. In at least one embodiment, this memory is assigned statically to different groups and warps inside that groups, so that it is determined which one should be used by a member of a multi-warp thread_block_tile from its thread_rank and size of group.

In at least one embodiment, each template parameter of block_tile_memory has a default parameter. In at least one embodiment, maximal CTA size defaults to 1024 threads, which is hardware limit for CTA size. In at least one embodiment, default per warp memory size is set to 8B, to allow efficient operation of collectives using most common data types.

```
namespace details {
    _CG_CONST_DECL unsigned int def_max_block_size = 1024;
    _CG_CONST_DECL unsigned int def_tile_communication_size = 8;
}
// Calculation of indexes to access a group's sync slot or a warp's reduction slot.
unsigned int sync_id = (details::cta::thread_rank( ) / Size + (max_num_threads / Size − 2));
unsigned int reduction_id = (details::cta::thread_rank( ) − thread_rank( ) ) / 32 + warp_id;
```

In at least one embodiment, collectives are implemented according to following reduction algorithm with slight modifications depending on collective:

```
auto warp = tiled_partition<32>(*this);
TyVal* warp_reduction_location = get_reduction_location<TyVal> ( );
*warp_reduction_location = reduce(warp, value, op);
// Last warp to arrive barrier enters if, reduces partial results from warps and releases
other warps from barrier.
if (sync_warps_last_releases (...)) {
    auto reduction_threads = tiled_partition<numWarps> (warp);
    if (reduction_threads.meta_group_rank( ) == 0) {
        // Access reduction locations of other warps to read their partial result and to write
result for them to return.
        TyVal* thread_reduction_location =
get_reduction_location<TyVal>(reduction_threads. thread_rank( ));
        *thread_reduction_location = reduce(reduction_threads, *thread_reduction_location,
op);
    }
    sync_warps_release(...);
}
TyVal result = * warp_reduction_location;
warp.sync( );
return result;
```

In at least one embodiment, in case of shfl, source warp releases other threads from barrier instead of last warp arriving. In at least one embodiment, in case of collectives operating on types larger than specified per warp size (size of reduction location), multiple rounds of data transfers are performed between each warp and releasing warp.

In at least one embodiment, methods involving rank/size calculation like thread_rank or meta_group_size are reused from current implementation of thread_block_tile, because static rank/size calculation scheme is same.

FIG. 1 illustrates an example of a warp, in accordance with at least one embodiment. In at least one embodiment, an application utilizes parallel processing by defining a plurality of threads that can be performed in parallel on a plurality of processing cores. In at least one embodiment, one thread 102 runs on one core 104. In at least one embodiment, thread can be a copy or an instance of a program or program segment. In at least one embodiment, a Kernel is a function that is specified to run a plurality of times on a plurality of cores. In at least one embodiment, a Warp is a group of threads running on a set of processor cores in parallel. In at least one embodiment, a warp 106 includes at most 32 threads 108. In at least one embodiment, maximum number of threads that can be in a warp is limited by an implementation of a multiprocessor.

In at least one embodiment, a multiprocessor such as a graphical processing unit ("GPU") is provided with code defining a plurality of threads to be executed. In at least one embodiment, GPU distributes threads to a plurality of cores, which allow threads to be run in parallel. In at least one embodiment, threads are divided into 32-thread warps, which are then scheduled and run one or more warps at a time. In at least one embodiment, maximum size of a warp can be larger or smaller based on type of GPU. In at least one embodiment, warps may be run in parallel or in serial.

In at least one embodiment, a programmer can specify a group of threads to be executed as a cooperative group. In at least one embodiment, a cooperative group is a group of threads to be run on a corresponding number of cores concurrently. In at least one embodiment, if a cooperative group fits within a warp, threads of a cooperative group can be arranged within a single warp and executed concurrently. In at least one embodiment, if a number of threads in a cooperative group exceeds maximum size of a warp, a mechanism is needed to synchronize 2 or more warps of threads to run concurrently.

FIG. 2 illustrates an example of a cooperative thread group spanning 2 warps, in accordance with at least one embodiment. In at least one embodiment, first warp 202 and a second warp 204 are synchronized so that they execute in parallel. In at least one embodiment, first warp 202 includes a first tread Block 206 of 32 threads and second warp 204 includes a second thread block 208 of 32 threads for total of 64 threads that are able to operate as a cooperative thread group. In at least one embodiment, synchronization between first warp 202 and second warp 204 is accomplished using a barrier 210. In at least one embodiment, barrier 210 is stored in shared memory that is accessible to any thread in either first warp 202 or second warp 204.

In at least one embodiment, barrier 210 is a 32-bit value. In at least one embodiment, as each warp completes, barrier 210 is incremented using an atomic addition operation. In at least one embodiment, when value of barrier 210 reaches a number of warps in a cooperative thread group, it can be determined that all threads in cooperative thread block are synchronized. In at least one embodiment, barrier 210 can be used to release block threads in first warp 202 or second warp 204.

Figure 3:
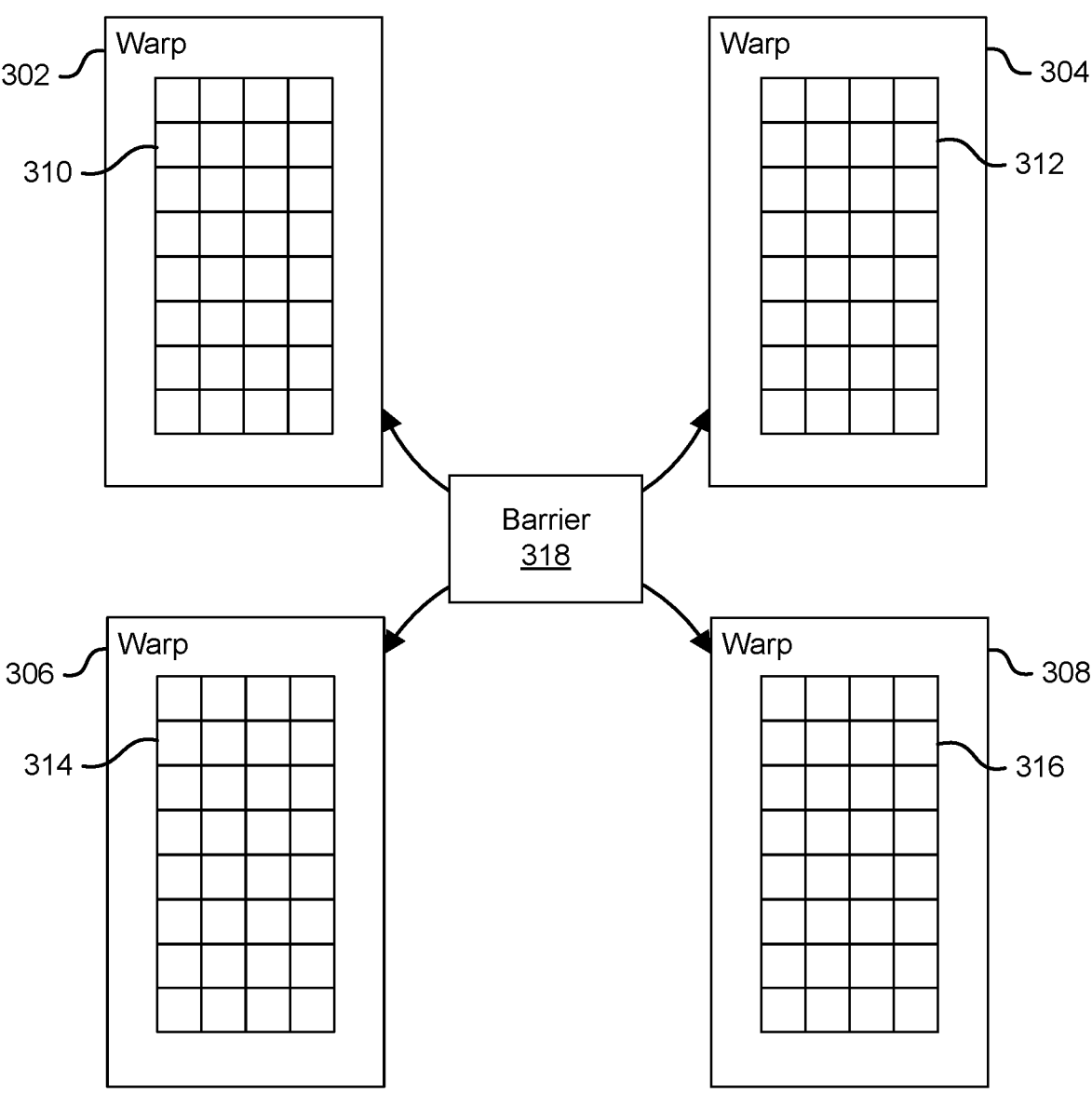
FIG. 3 illustrates an example of a cooperative thread group spanning 4 warps, in accordance with at least one embodiment.

FIG. 3 illustrates an example of a cooperative thread group spanning 4 warps, in accordance with at least one embodiment. In at least one embodiment, a cooperative thread group includes 4 warps; a first warp 302, second warp 304, a third warp 306, and a fourth warp 308. In at least one embodiment, each warp has 32 threads; first warp 302 has a first group of threads 310, second warp 304 has a second group of threads 312, third warp 306 has a third group of threads 314, and fourth warp 308 has a fourth group of threads 316.

In at least one embodiment, first warp 302, second warp 304, third warp 306, and fourth warp 308 are synchronized using a barrier 318. In at least one embodiment, barrier is implemented as a counter that starts at zero and increments as each warp is synchronized until counter reaches four indicating that all warps are synchronized. In at least one embodiment, barrier 318 blocks all threads and releases them when a fours bit is set. In at least one embodiment, barrier 318 is implemented as a bit field with each bit representing a different warp. In at least one embodiment, when properly synchronized, all four warps and their associated threads can be executed and operate cooperatively.

Figure 4:
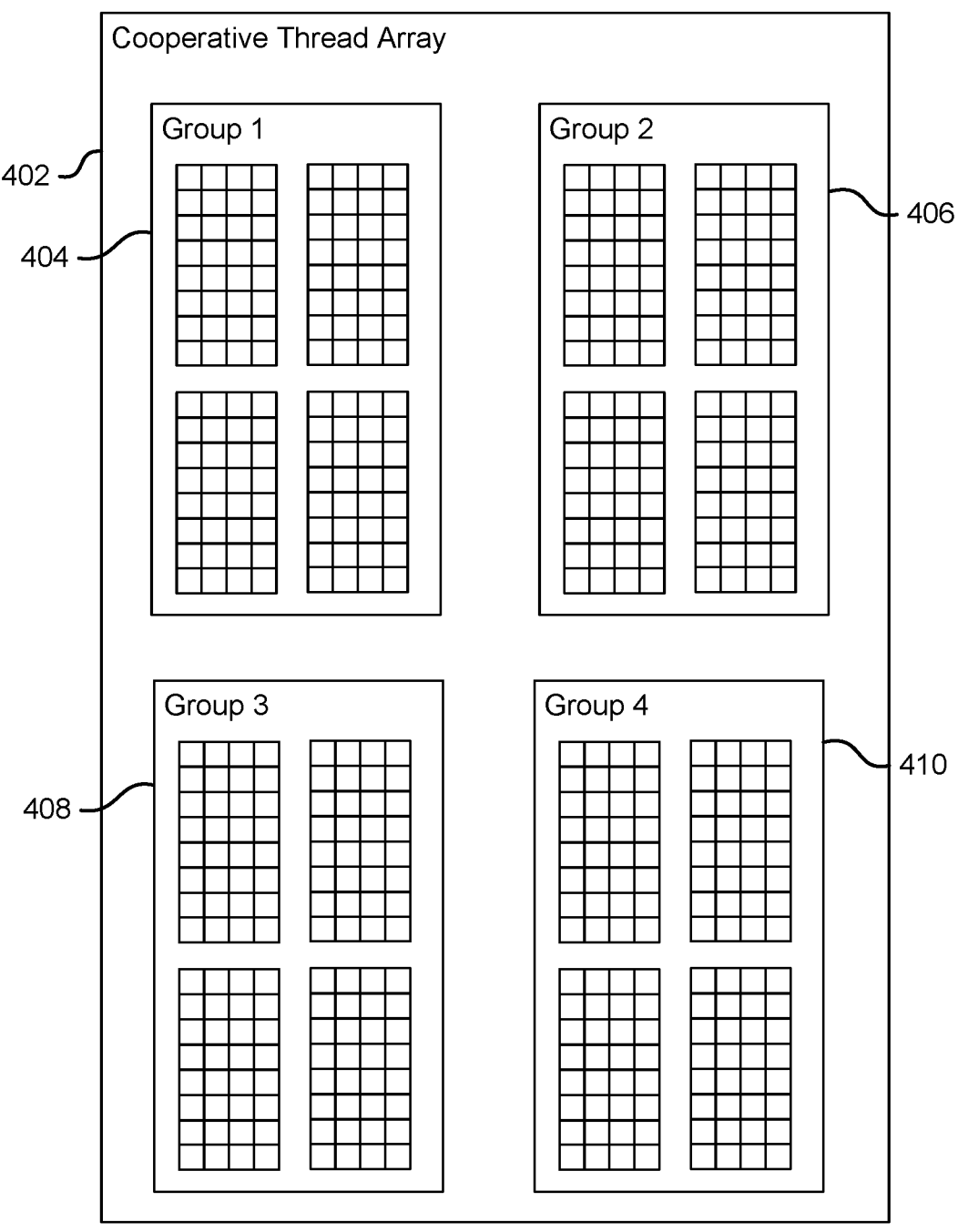
FIG. 4 illustrates an example of a cooperative thread array with four groups, each group spanning 4 Warps, in accordance with at least one embodiment.

FIG. 4 illustrates an example of a cooperative thread array with four groups, each group spanning 4 Warps, in accordance with at least one embodiment. In at least one embodiment, a cooperative thread array 402 includes four cooperative thread groups; a first cooperative group 404, second cooperative group 406, a third cooperative group 408, and a fourth cooperative group 410. In at least one embodiment, each cooperative group spans four warps of 32 threads.

In at least one embodiment, first cooperative group 404, second cooperative group 408, third cooperative group 410, and fourth cooperative group 412 are synchronized using a barrier for each cooperative group. In at least one embodiment, barriers are implemented as four counters stored in shared memory that each start at zero and increment as each warp in corresponding group is synchronized until counter reaches four indicating that all warps in corresponding group are synchronized. Different breakdowns of groups and warps are possible with number of barriers needed depending on number of groups.

Figure 5:
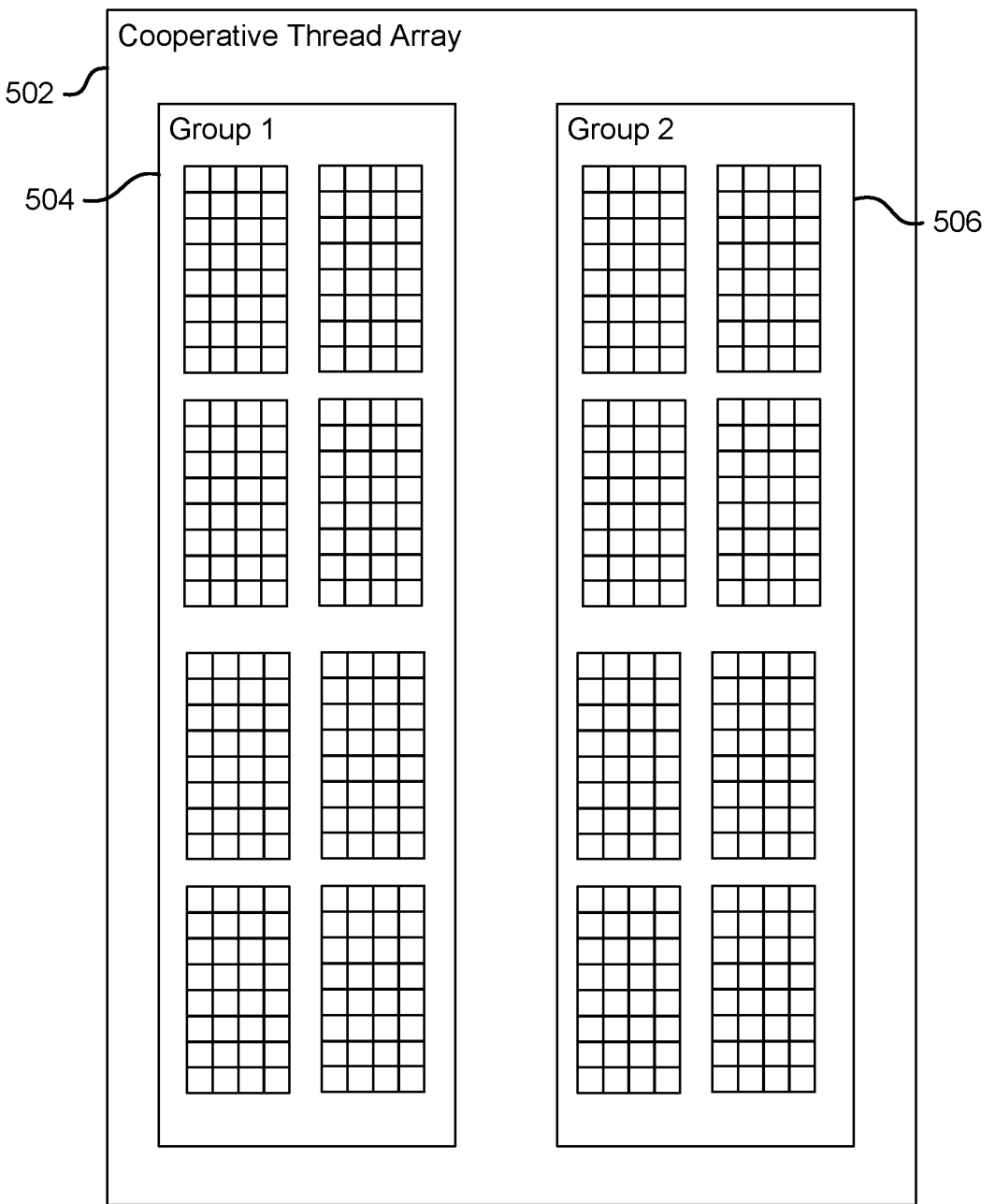
FIG. 5 illustrates an example of a cooperative thread array with four groups, each group spanning 8 Warps, in accordance with at least one embodiment.

FIG. 5 illustrates an example of a cooperative thread array with four groups, each group spanning 8 Warps, in accordance with at least one embodiment. In at least one embodiment, a cooperative thread array 502 includes four cooperative thread groups; a first cooperative group 504 and a second cooperative group 506. In at least one embodiment, each cooperative group spans eight warps of 32 threads.

In at least one embodiment, first cooperative group 504 and second cooperative group 508 are synchronized using a barrier for each cooperative group. In at least one embodiment, barriers are implemented as two counters stored in shared memory that each start at zero and increment as each warp in corresponding group is synchronized until counter reaches eight indicating that all warps in corresponding group are synchronized.

In at least one embodiment, multi-warp barriers are implemented using an atomic addition operation such as atomicAdd to count arrived warps and use highest bit as barrier phase. In at least one embodiment, each group uses a separate barrier, so a single barrier is allocated per possible group. In at least one embodiment, barriers are allocated in shared memory before group composition is knows, so all possible barriers are allocated. In at least one embodiment, because number of warps in a group is limited to 32, full range of int is not needed to count arriving warps, but atomicAdd does not support smaller types to use as a barrier instead.

In at least one embodiment, instead of using smaller barriers, limit of 32 warps is relied upon to represent each warp in group with one bit in a 32-bit barrier. In at least one embodiment, arriving warp will use atomicOr to mark its bit as arrived. In at least one embodiment, old value retuned by atomicOr is going to be compared with a corresponding group mask, if a warp is last warp to arrive on barrier, it does atomicAnd to clear all bits of warps in group to release them from barrier.

In at least one embodiment, a single barrier can be used for multiple groups as long as these groups do not have any common warps. In at least one embodiment, one barrier is used for each possible size of multi-warp group, instead of one barrier per possible group. In at least one embodiment, memory demands for barriers are significantly reduced, as shown in table below.

| Size of CTA | Number of Counter Barriers | Number of Bit Field Barriers |
|---|---|---|
| 1024 | 32 | 5 + 1* (8 allocated for alignment) |
| 512 | 16 | 4 + 1* (8 allocated for alignment) |
| 256 | 8 | 3 + 1* |
| 128 | 4 | 2 + 1* (4 allocated for alignment) |
| 64 | 2 (4 allocated for alignment) | 1 + 1* (4 allocated for alignment) |

*+1 in table counts one additional barrier for thread_block arrive and wait implementation, which is not related to multi-warp groups.

In at least one embodiment, in order to leave options for possible future use-cases similar to arrive-wait barriers in thread_block as well as simplicity, allocate 8 barriers are allocated in all cases. In at least one embodiment, it may be reduced to 4 for smaller CTAs.

In at least one embodiment, this barrier implementation allows implementation of arrive-wait functions described below without using registers to keep barrier phase between arrive and wait.

In at least one embodiment, arrive wait barriers are added to CUDA device side API, allowing similar functionality in CG groups larger than a single warp. In at least one embodiment, arrive and wait are a collective, and have to be called by all threads in warp in case of a thread_block_tile and thread_block and by all threads in thread block in case of a grid_group.

In at least one embodiment, arrive marks calling warp or thread block as arrived at group barrier. In at least one embodiment, call to wait is going to stall calling thread until all warps or thread blocks call arrive.

In at least one embodiment, arrive and wait needs to be called in pairs, calling wait function on a group results in undefined behavior, if a matching arrive call was not made on same group in calling thread. In at least one embodiment, calling arrive twice without wait between them results in undefined behavior.

In at least one embodiment, current implementation of group synchronization is already done in arrive and wait steps, implementation of these new functions is just going to use same algorithm exposed as two separate steps.

In at least one embodiment, only exception to that is thread_block group, which uses syncthreads( ) built-in. In at least one embodiment, in this case arrive and wait functions are going to use multi-warp groups implementation of these functions. In at least one embodiment, multi-warp groups are limited to sizes that are power of two, however synchronization mechanism is not limited to situations where thread block is a power of two.

In at least one embodiment, a memory barrier, may be called a membar, memory fence or fence instruction. In at least one embodiment, a barrier is implemented as a barrier instruction that causes a processor to enforce an ordering constraint on memory operations issued before and after a barrier instruction. In at least one embodiment, this may be enforced in hardware or software. In at least one embodiment, operations issued prior to a barrier are guaranteed to be performed before operations issued after a barrier. In at least one embodiment, this can be referred to a synchronization.

In at least one embodiment, a barriers may be used when implementing low-level machine code that operates on memory shared by multiple devices, threads, or processes. In at least one embodiment, such code includes synchronization primitives and lock-free data structures on multiprocessor systems, and device drivers that communicate with computer hardware.

FIG. 6 illustrates an example of a barrier implementation based on a counter, in accordance with at least one embodiment. In at least one embodiment, a counter is used as a barrier for each possible group. In at least one embodiment, a CTA can be divided into a variety of groups of warps where each group includes an identified number of warps. In at least one embodiment, groups are limited to a number of warps that is a power of two.

In at least one embodiment, if a 1024 thread CTA is divided into sixteen groups of two warps each, then sixteen barriers 602 are used. In at least one embodiment, each of sixteen barriers 602 is a 32-bit value that is incremented as each warp arrives at its corresponding barrier. In at least one embodiment, smaller values (such as 8-bit bytes) may be used as a barrier if atomic addition operations that work on such values are available.

In at least one embodiment, if a 1024 thread CTA is divided into eight groups of four warps each, then eight barriers 604 are used. In at least one embodiment, each of eight barriers 604 is a 32-bit value that is incremented as each warp arrives at its corresponding barrier. In at least one embodiment, smaller values (such as 8-bit bytes) may be used as a barrier if atomic addition operations that work on such values are available.

In at least one embodiment, if a 1024 thread CTA is divided into four groups of eight warps each, then four barriers 604 are used. In at least one embodiment, each of four barriers 606 is a 32-bit value that is incremented as each warp arrives at its corresponding barrier. In at least one embodiment, smaller values (such as 8-bit bytes) may be used as a barrier if atomic addition operations that work on such values are available.

In at least one embodiment, if a 1024 thread CTA is divided into two groups of sixteen warps each, then two barriers 604 are used. In at least one embodiment, each of two barriers 608 is a 32-bit value that is incremented as each warp arrives at its corresponding barrier. In at least one embodiment, smaller values (such as 8-bit bytes) may be used as a barrier if atomic addition operations that work on such values are available.

In at least one embodiment, allowing for any of these groups to be used with 1024 thread CTA, a total of 16+8+4+2 barriers are needed.

Figure 7:
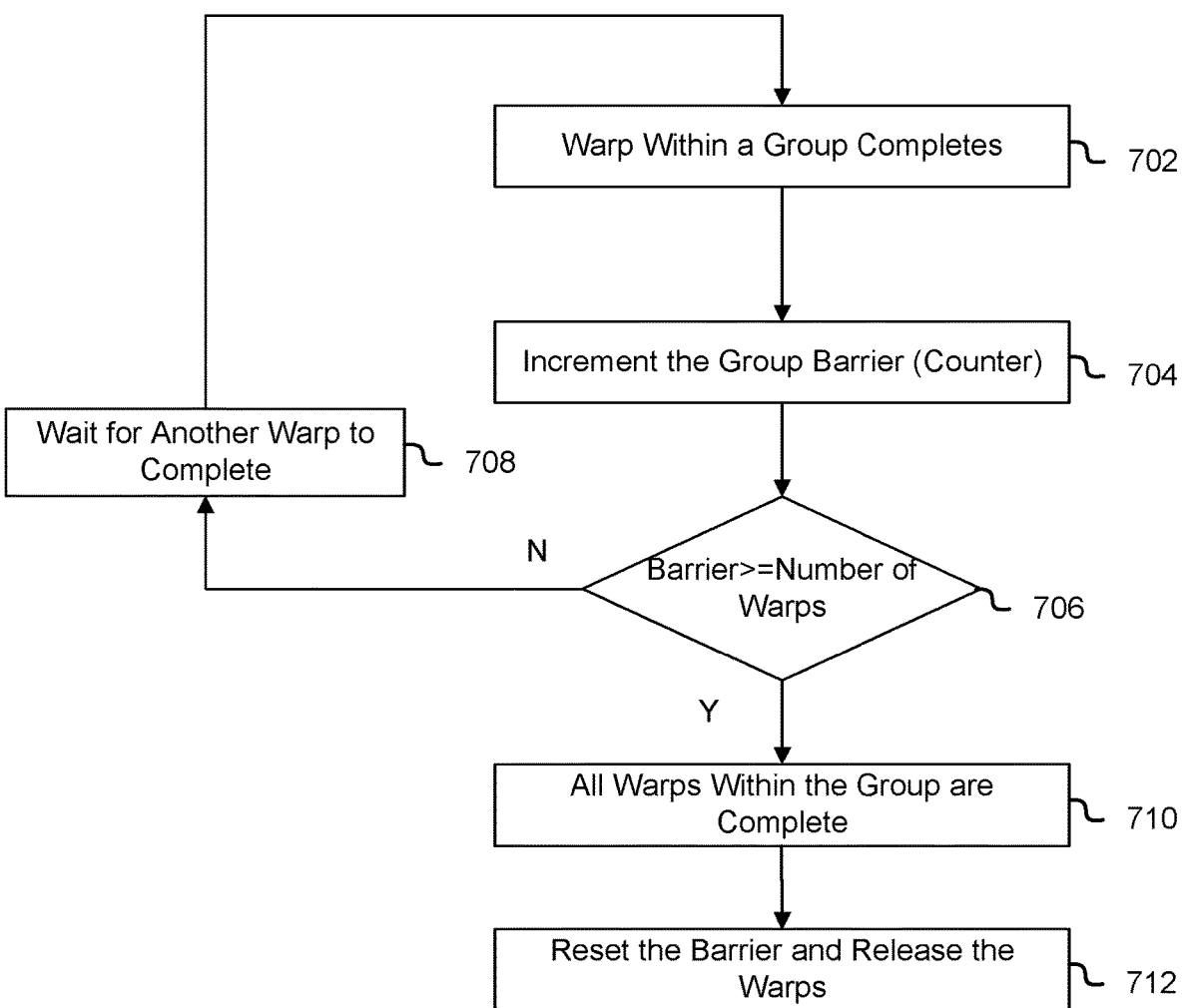
FIG. 7 illustrates an example of a process that, as a result of being performed by a computer system, updates a barrier of a multi-warp group in accordance with at least one embodiment.

FIG. 7 illustrates an example of a process that, as a result of being performed by a computer system, updates a barrier of a multi-warp group in accordance with at least one embodiment. In at least one embodiment, at block 702, computer system is notified that a warp within a cooperative group completes. In at least one embodiment, a status of work can be tracked by GPU, multicore processor, or by operating system coding software monitoring execution of threads within a core.

In at least one embodiment, as a result of determining that a warp is complete or in a synchronized state, execution advances block 704 where computer system increments a barrier for that warps group. In at least one embodiment, a barrier is incremented using an atomic addition operation. In at least one embodiment, at decision block 706, computer system determines, based at least in part on value of barrier, whether all warps of a group are complete or synchronized. In at least one embodiment, synchronization of a cooperative group is determined by determining that a barrier value is greater than or equal to a number of warps in said cooperative group.

In at least one embodiment, if computer system determines that not all warps in a group are complete, execution advances block 708 and computer system wait for another warp to complete. In at least one embodiment, if computer system determines that all warps in a group are complete synchronized, execution advances to block 710. In at least one embodiment, at block 712, a barrier associated with cooperative group is reset to zero and all warps associated with said cooperative group are released.

Figure 8:
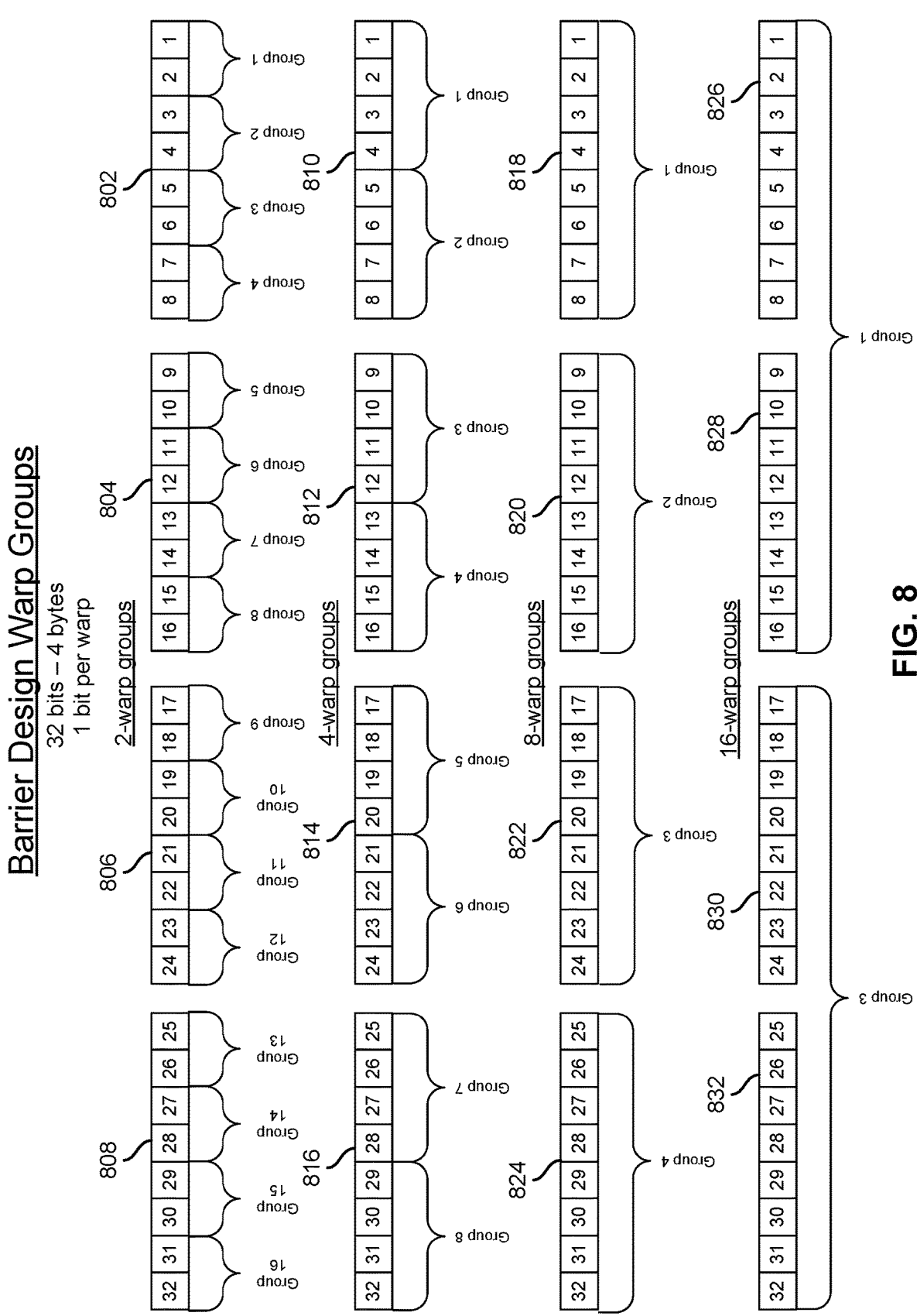
FIG. 8 illustrates an example of a barrier implementation based on a bit field, in accordance with at least one embodiment.

FIG. 8 illustrates an example of a barrier implementation based on a bit field, in accordance with at least one embodiment. In at least one embodiment, a barrier is implemented as a bit field, with each bit in bit field representing a different warp in a cooperative thread group. In at least one embodiment, state of a cooperative group is obtained by applying a mask associated with said group with a logical AND operation to a barrier. In at least one embodiment a bit associated with a warp is set by applying a mask associated with said warp with a logical OR operation to a barrier. In at least one embodiment, a barrier for a group can be reset by applying inverse of an associated mask with a logical and to said barrier.

In at least one embodiment, a CTA of 1024 threads is divided into sixteen groups of two warps each. In at least one embodiment, a single 32-bit barrier can represent all of synchronization data needed for all sixteen groups. In at least one embodiment, a first byte 802 stores synchronization information for groups one through four. In at least one embodiment, a second byte 804 stores synchronization information for groups five through eight. In at least one embodiment, a third byte 806 stores synchronization information for groups nine through twelve. In at least one embodiment, a fourth byte 808 stores synchronization information for groups thirteen through sixteen.

In at least one embodiment, a CTA of 1024 threads is divided into eight groups of four warps each. In at least one embodiment, a single 32-bit barrier can represent all of synchronization data needed for all eight groups. In at least one embodiment, a first byte 810 stores synchronization information for groups one and two. In at least one embodiment, a second byte 812 stores synchronization information for groups three and four. In at least one embodiment, a third byte 814 stores synchronization information for groups five and six. In at least one embodiment, a fourth byte 816 stores synchronization information for groups seven and eight.

In at least one embodiment, a CTA of 1024 threads is divided into four groups of eight warps each. In at least one embodiment, a single 32-bit barrier can represent all of synchronization data needed for all four groups. In at least one embodiment, a first byte 818 stores synchronization information for group one. In at least one embodiment, a second byte 820 stores synchronization information for group two. In at least one embodiment, a third byte 822 stores synchronization information for group three. In at least one embodiment, a fourth byte 824 stores synchronization information for group four.

In at least one embodiment, a CTA of 1024 threads is divided into two groups of sixteen warps each. In at least one embodiment, a single 32-bit barrier can represent all of synchronization data needed for both groups. In at least one embodiment, a first byte 826 and a second byte 828 store synchronization information for group one. In at least one embodiment, a third byte 830 and a fourth byte 832 store synchronization information for group two.

In at least one embodiment, since multiple groups are able to share a single barrier, significantly less storage space is required. In at least one embodiment, all above cooperative groups require only four 32-bit values, as opposed to 30 values using an approach illustrated in FIG. 6.

Figure 9:
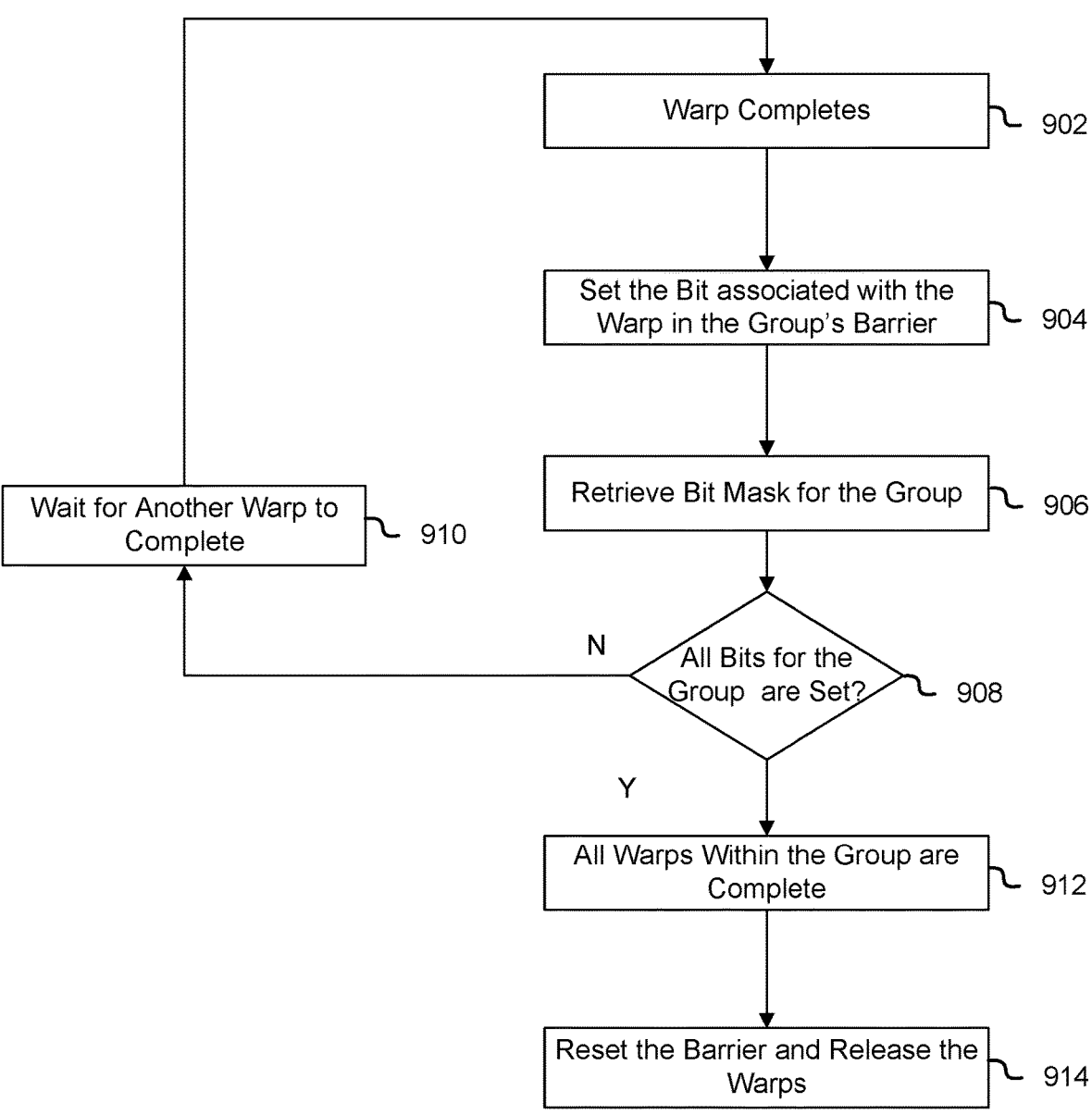
FIG. 9 illustrates an example of a process that, as a result of being performed by a computer system, updates a barrier of a multi-warp group in accordance with at least one embodiment.

FIG. 9 illustrates an example of a process that, as a result of being performed by a computer system, updates a barrier of a multi-warp group in accordance with at least one embodiment. In at least one embodiment, at block 902, a computer system detects completion of a group of parallel threads which, in some examples is called a warp. In at least one embodiment, at block 904, determines if warp is part of a cooperative group, and if so, sets a bit associated with warp in cooperative group's barrier. In at least one embodiment, at block 906 computer system obtains a bit mask associated with cooperative group. In at least one embodiment, a mask is a 32-bit field with ones indicating bits associated with group's warps. In at least one embodiment, a mask is applied to a barrier associated with this group to determine 908 if all warps of this group have arrived at barrier.

In at least one embodiment, at decision block 908, if computer system determines that all bits for cooperative group are not yet set, execution is directed to block 910, where computer system waits for another warp of threads to complete. In at least one embodiment, at decision block 908, if computer system determines that all bits for cooperative group are set, execution advances to block 912 and all warps of cooperative group are determined to be synchronized at barrier. In at least one embodiment, at block 914, barrier is reset by clearing bits associated with cooperative group, releasing associated warps.

Data Center

In at least one embodiment, techniques described above may be implemented in a data center as described below such as data center 1000. In at least one embodiment, an application run in a data center can be divided into dependent threads which are run in parallel on a plurality of processors. In at least one embodiment, processors may include any processor type described below. In at least one embodiment, one or more circuits cause two or more dependent threads to be performed in parallel using two or more separate multithreaded processor cores. In at least one embodiment, a processor core can be a core in a multi-core CPU, an SMP core in a GPU, or other circuit capable of executing storable instructions. In at least one embodiment, one or more circuits to cause a first group of threads to be organized in two or more subgroups of threads to be performed in parallel using two or more processor cores. In at least one embodiment, groups of threads can be cooperative group that runs in parallel. In at least one embodiment, a cooperative group includes a plurality of kernel threads arranged in a warp on a GPU. In at least one embodiment, synchronization operations between threads can be enabled through use of a barrier. In at least one embodiment one or more circuits perform a memory barrier operation to cause accesses to memory by a plurality of groups of threads to occur in an order indicated by memory barrier operation. In at least one embodiment, a barrier operation can be an atomic operation such as a bitwise logical operation (AND, OR, XOR, for example) or a mathematical operation such as an atomic addition or subtraction.

FIG. 10 illustrates an exemplary data center 1000, in accordance with at least one embodiment. In at least one embodiment, data center 1000 includes, without limitation, a data center infrastructure layer 1010, a framework layer 1020, a software layer 1030 and an application layer 1040.

In at least one embodiment, as shown in FIG. 10, data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1016(1)-1016(N) may be a server having one or more of above-mentioned computing resources.

In at least one embodiment, grouped computing resources 1014 may include separate groupings of node C.R.s housed within one or more racks (not shown), or many racks housed in data centers at various geographical locations (also not shown). Separate groupings of node C.R.s within grouped computing resources 1014 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1012 may configure or otherwise control one or more node C.R.s 1016(1)-1016(N) and/or grouped computing resources 1014. In at least one embodiment, resource orchestrator 1012 may include a software design infrastructure ("SDI") management entity for data center 1000. In at least one embodiment, resource orchestrator 1012 may include hardware, software or some combination thereof.

In at least one embodiment, as shown in FIG. 10, framework layer 1020 includes, without limitation, a job scheduler 1032, a configuration manager 1034, a resource manager 1036 and a distributed file system 1038. In at least one embodiment, framework layer 1020 may include a framework to support software 1052 of software layer 1030 and/or one or more application(s) 1042 of application layer 1040. In at least one embodiment, software 1052 or application(s) 1042 may respectively include web-based service software or applications, such as those provided by Amazon Web Services, Google Cloud and Microsoft Azure. In at least one embodiment, framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. In at least one embodiment, configuration manager 1034 may be capable of configuring different layers such as software layer 1030 and framework layer 1020, including Spark and distributed file system 1038 for supporting large-scale data processing. In at least one embodiment, resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. In at least one embodiment, resource manager 1036 may coordinate with resource orchestrator 1012 to manage these mapped or allocated computing resources.

In at least one embodiment, software 1052 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016 (N), grouped computing resources 1014, and/or distributed file system 1038 of framework layer 1020. In at least one or more types of applications may include, without limitation, CUDA applications.

In at least one embodiment, any of configuration manager 1034, resource manager 1036, and resource orchestrator 1012 may implement any number and type of self-modifying actions based on any amount and type of data acquired in any technically feasible fashion. In at least one embodiment, self-modifying actions may relieve a data center operator of data center 1000 from making possibly bad configuration decisions and possibly avoiding underutilized and/or poor performing portions of a data center.
Computer-Based Systems The following figures set forth, without limitation, exemplary computer-based systems that can be used to implement at least one embodiment.

In at least one embodiment, techniques described above may be implemented on a computer system as described below such as a computer system 1200 or exemplary integrated circuit 1400. In at least one embodiment, an application run in a computer system can be divided into dependent threads which are run in parallel on a plurality of processors. In at least one embodiment, processors may include any processor type described below including processing system 1100 or processing subsystem 1501. In at least one embodiment, one or more circuits cause two or more dependent threads to be performed in parallel using two or more separate multithreaded processor cores. In at least one embodiment, a processor core can be a core in a multi-core CPU, an SMP core in a GPU, or other circuit capable of executing storable instructions. In at least one embodiment, one or more circuits to cause a first group of threads to be organized in two or more subgroups of threads to be performed in parallel using two or more processor cores. In at least one embodiment, groups of threads can be cooperative group that runs in parallel. In at least one embodiment, a cooperative group includes a plurality of kernel threads arranged in a warp on a GPU. In at least one embodiment, synchronization operations between threads can be enabled through use of a barrier. In at least one embodiment one or more circuits perform a memory barrier operation to cause accesses to memory by a plurality of groups of threads to occur in an order indicated by memory barrier operation. In at least one embodiment, a barrier operation can be an atomic operation such as a bitwise logical operation (AND, OR, XOR, for example) or a mathematical operation such as an atomic addition or subtraction.

Figure 11:
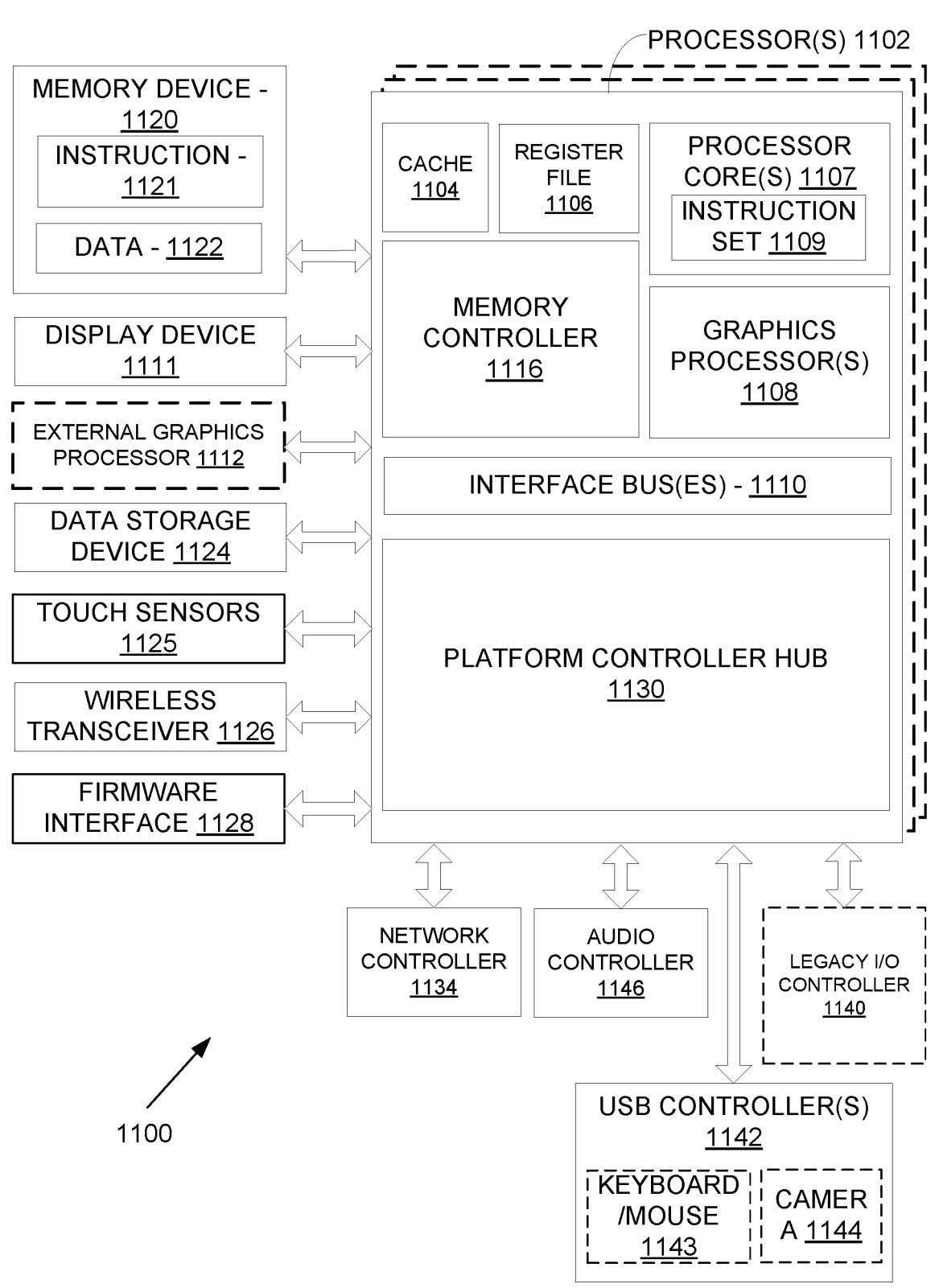
FIG. 11 illustrates a processing system, in accordance with at least one embodiment.

FIG. 11 illustrates a processing system 1100, in accordance with at least one embodiment. In at least one embodiment, processing system 1100 includes one or more processors 1102 and one or more graphics processors 1108, and may be a single processor desktop system, a multiprocessor workstation system, or a server system having a large number of processors 1102 or processor cores 1107. In at least one embodiment, processing system 1100 is a processing platform incorporated within a system-on-a-chip ("SoC") integrated circuit for use in mobile, handheld, or embedded devices.

In at least one embodiment, processing system 1100 can include, or be incorporated within a server-based gaming platform, a game console, a media console, a mobile gaming console, a handheld game console, or an online game console. In at least one embodiment, processing system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing ("CISC"), Reduced Instruction Set Computing ("RISC"), or computing via a Very Long Instruction Word ("VLIW"). In at least one embodiment, processor cores 1107 may each process a different instruction set 1109, which may include instructions to facilitate emulation of other instruction sets. In at least one embodiment, processor core 1107 may also include other processing devices, such as a digital signal processor ("DSP").

In at least one embodiment, processor 1102 includes cache memory ('cache') 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level 3 ("L3") cache or Last Level Cache ("LLC")) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in processing system 1100. In at least one embodiment interface bus 1110, in one embodiment, can be a processor bus, such as a version of a Direct Media Interface ("DMI") bus. In at least one embodiment, interface bus 1110 is not limited to a DMI bus, and may include one or more Peripheral Component Interconnect buses (e.g., "PCI," PCI Express ("PCIe")), memory buses, or other types of interface buses. In at least one embodiment processor(s) 1102 include an integrated memory controller 1116 and a platform controller hub 1130. In at least one embodiment, memory controller 1116 facilitates communication between a memory device and other components of processing system 1100, while platform controller hub ("PCH") 1130 provides connections to Input/Output ("I/O") devices via a local I/O bus.

In at least one embodiment, memory device 1120 can be a dynamic random access memory ("DRAM") device, a static random access memory ("SRAM") device, flash memory device, phase-change memory device, or some other memory device having suitable performance to serve as processor memory. In at least one embodiment memory device 1120 can operate as system memory for processing system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display ("HMD") such as a stereoscopic display device for use in virtual reality ("VR") applications or augmented reality ("AR") applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as PCI, or PCIe. In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution ("LTE") transceiver. In at least one embodiment, firmware interface 1128 enables communication with system firmware, and can be, for example, a unified extensible firmware interface ("UEFI"). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, processing system 1100 includes an optional legacy I/O controller 1140 for coupling legacy (e.g., Personal System 2 ("PS/2")) devices to processing system 1100. In at least one embodiment, platform controller hub 1130 can also connect to one or more Universal Serial Bus ("USB") controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, processing system 1100 can include an external memory controller 1116 and platform controller hub 1130, which may be configured as a memory controller hub and peripheral controller hub within a system chipset that is in communication with processor(s) 1102.

Figure 12:
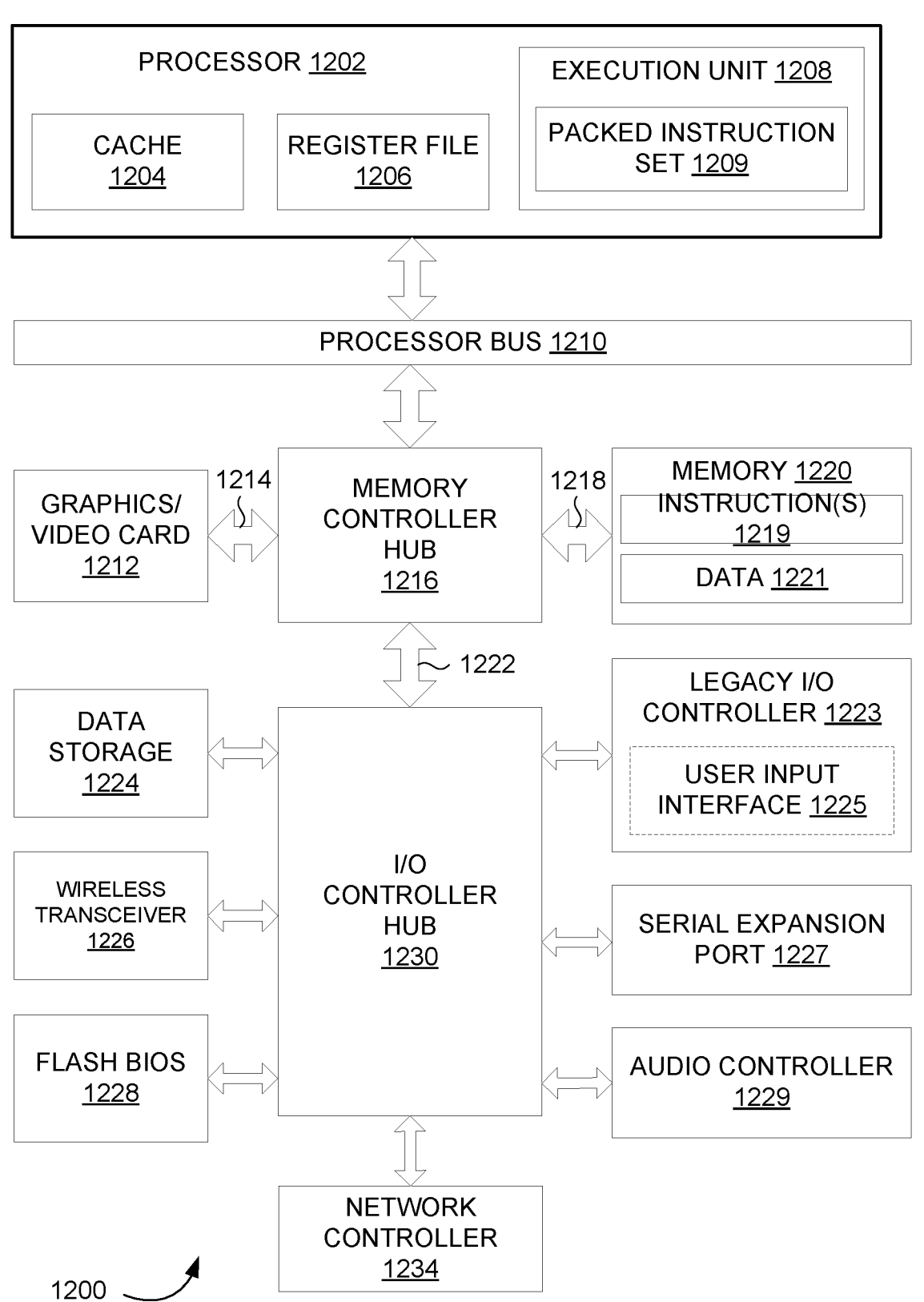
FIG. 12 illustrates a computer system, in accordance with at least one embodiment.

FIG. 12 illustrates a computer system 1200, in accordance with at least one embodiment. In at least one embodiment, computer system 1200 may be a system with interconnected devices and components, an SOC, or some combination. In at least on embodiment, computer system 1200 is formed with a processor 1202 that may include execution units to execute an instruction. In at least one embodiment, computer system 1200 may include, without limitation, a component, such as processor 1202 to employ execution units including logic to perform algorithms for processing data. In at least one embodiment, computer system 1200 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1200 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 1200 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 1200 may include, without limitation, processor 1202 that may include, without limitation, one or more execution units 1208 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 1200 is a single processor desktop or server system. In at least one embodiment, computer system 1200 may be a multiprocessor system. In at least one embodiment, processor 1202 may include, without limitation, a CISC microprocessor, a RISC microprocessor, a VLIW microprocessor, a processor implementing a combination of instruction sets, or any other processor device, such as a digital signal processor, for example. In at least one embodiment, processor 1202 may be coupled to a processor bus 1210 that may transmit data signals between processor 1202 and other components in computer system 1200.

In at least one embodiment, processor 1202 may include, without limitation, a Level 1 ("L1") internal cache memory ("cache") 1204. In at least one embodiment, processor 1202 may have a single internal cache or multiple levels of internal cache. In at least one embodiment, cache memory may reside external to processor 1202. In at least one embodiment, processor 1202 may also include a combination of both internal and external caches. In at least one embodiment, a register file 1206 may store different types of data in various registers including, without limitation, integer registers, floating point registers, status registers, and instruction pointer register.

In at least one embodiment, execution unit 1208, including, without limitation, logic to perform integer and floating point operations, also resides in processor 1202. Processor 1202 may also include a microcode ("ucode") read only memory ("ROM") that stores microcode for certain macro instructions. In at least one embodiment, execution unit 1208 may include logic to handle a packed instruction set 1209. In at least one embodiment, by including packed instruction set 1209 in an instruction set of a general-purpose processor 1202, along with associated circuitry to execute instructions, operations used by many multimedia applications may be performed using packed data in a general-purpose processor 1202. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 1208 may also be used in microcontrollers, embedded processors, graphics devices, DSPs, and other types of logic circuits. In at least one embodiment, computer system 1200 may include, without limitation, a memory 1220. In at least one embodiment, memory 1220 may be implemented as a DRAM device, an SRAM device, flash memory device, or other memory device. Memory 1220 may store instruction(s) 1219 and/or data 1221 represented by data signals that may be executed by processor 1202.

In at least one embodiment, a system logic chip may be coupled to processor bus 1210 and memory 1220. In at least one embodiment, the system logic chip may include, without limitation, a memory controller hub ("MCH") 1216, and processor 1202 may communicate with MCH 1216 via processor bus 1210. In at least one embodiment, MCH 1216 may provide a high bandwidth memory path 1218 to memory 1220 for instruction and data storage and for storage of graphics commands, data and textures. In at least one embodiment, MCH 1216 may direct data signals between processor 1202, memory 1220, and other components in computer system 1200 and to bridge data signals between processor bus 1210, memory 1220, and a system I/O 1222. In at least one embodiment, system logic chip may provide a graphics port for coupling to a graphics controller. In at least one embodiment, MCH 1216 may be coupled to memory 1220 through high bandwidth memory path 1218 and graphics/video card 1212 may be coupled to MCH 1216 through an Accelerated Graphics Port ("AGP") interconnect 1214.

In at least one embodiment, computer system 1200 may use system I/O 1222 that is a proprietary hub interface bus to couple MCH 1216 to I/O controller hub ("ICH") 1230. In at least one embodiment, ICH 1230 may provide direct connections to some I/O devices via a local I/O bus. In at least one embodiment, local I/O bus may include, without limitation, a high-speed I/O bus for connecting peripherals to memory 1220, a chipset, and processor 1202. Examples may include, without limitation, an audio controller 1229, a firmware hub ("flash BIOS") 1228, a wireless transceiver 1226, a data storage 1224, a legacy I/O controller 1223 containing a user input interface 1225 and a keyboard interface, a serial expansion port 1227, such as a USB, and a network controller 1234. Data storage 1224 may comprise a hard disk drive, a floppy disk drive, a CD-ROM device, a flash memory device, or other mass storage device.

In at least one embodiment, FIG. 12 illustrates a system, which includes interconnected hardware devices or "chips." In at least one embodiment, FIG. 12 may illustrate an exemplary SoC. In at least one embodiment, devices illustrated in FIG. 12 may be interconnected with proprietary interconnects, standardized interconnects (e.g., PCIe), or some combination thereof. In at least one embodiment, one or more components of system 1200 are interconnected using compute express link ("CXL") interconnects.

Figure 13:
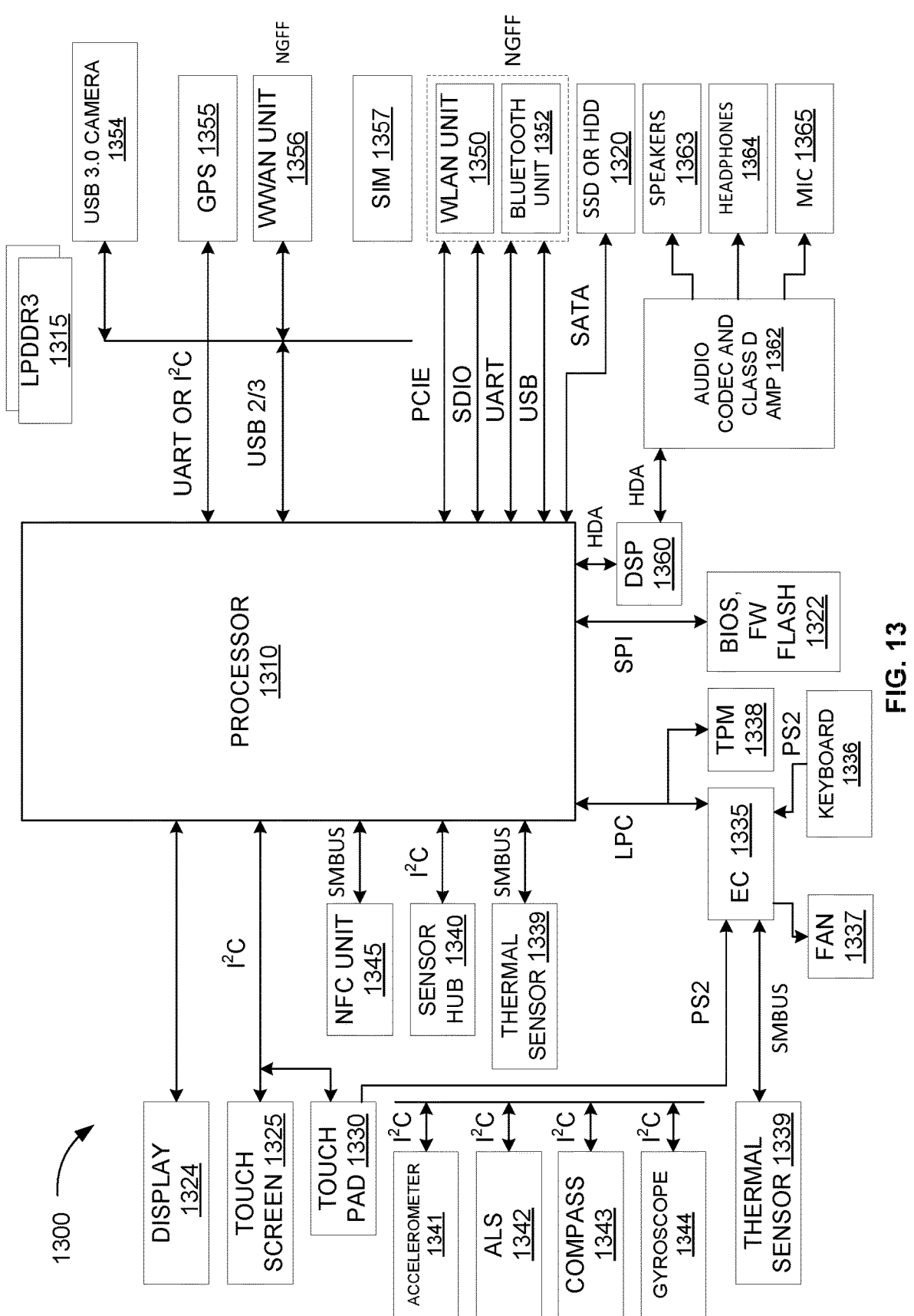
FIG. 13 illustrates a system, in accordance with at least one embodiment.

FIG. 13 illustrates a system 1300, in accordance with at least one embodiment. In at least one embodiment, system 1300 is an electronic device that utilizes a processor 1310. In at least one embodiment, system 1300 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 1300 may include, without limitation, processor 1310 communicatively coupled to any suitable number or kind of components, peripherals, modules, or devices. In at least one embodiment, processor 1310 is coupled using a bus or interface, such as an I²C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 13 illustrates a system which includes interconnected hardware devices or "chips." In at least one embodiment, FIG. 13 may illustrate an exemplary SoC. In at least one embodiment, devices illustrated in FIG. 13 may be interconnected with proprietary interconnects, standardized interconnects (e.g., PCIe) or some combination thereof. In at least one embodiment, one or more components of FIG. 13 are interconnected using CXL interconnects.

In at least one embodiment, FIG. 13 may include a display 1324, a touch screen 1325, a touch pad 1330, a Near Field Communications unit ("NFC") 1345, a sensor hub 1340, a thermal sensor 1346, an Express Chipset ("EC") 1335, a Trusted Platform Module ("TPM") 1338, BIOS/firmware/flash memory ("BIOS, FW Flash") 1322, a DSP 1360, a Solid State Disk ("SSD") or Hard Disk Drive ("HDD") 1320, a wireless local area network unit ("WLAN") 1350, a Bluetooth unit 1352, a Wireless Wide Area Network unit ("WWAN") 1356, a Global Positioning System ("GPS") 1355, a camera ("USB 3.0 camera") 1354 such as a USB 3.0 camera, or a Low Power Double Data Rate ("LPDDR") memory unit ("LPDDR3") 1315 implemented in, for example, LPDDR3 standard. These components may each be implemented in any suitable manner.

In at least one embodiment, other components may be communicatively coupled to processor 1310 through components discussed above. In at least one embodiment, an accelerometer 1341, an Ambient Light Sensor ("ALS") 1342, a compass 1343, and a gyroscope 1344 may be communicatively coupled to sensor hub 1340. In at least one embodiment, a thermal sensor 1339, a fan 1337, a keyboard 1336, and a touch pad 1330 may be communicatively coupled to EC 1335. In at least one embodiment, a speaker 1363, a headphones 1364, and a microphone ("mic") 1365 may be communicatively coupled to an audio unit ("audio codec and class d amp") 1362, which may in turn be communicatively coupled to DSP 1360. In at least one embodiment, audio unit 1362 may include, for example and without limitation, an audio coder/decoder ("codec") and a class D amplifier. In at least one embodiment, a SIM card ("SIM") 1357 may be communicatively coupled to WWAN unit 1356. In at least one embodiment, components such as WLAN unit 1350 and Bluetooth unit 1352, as well as WWAN unit 1356 may be implemented in a Next Generation Form Factor ("NGFF").

Figure 14:
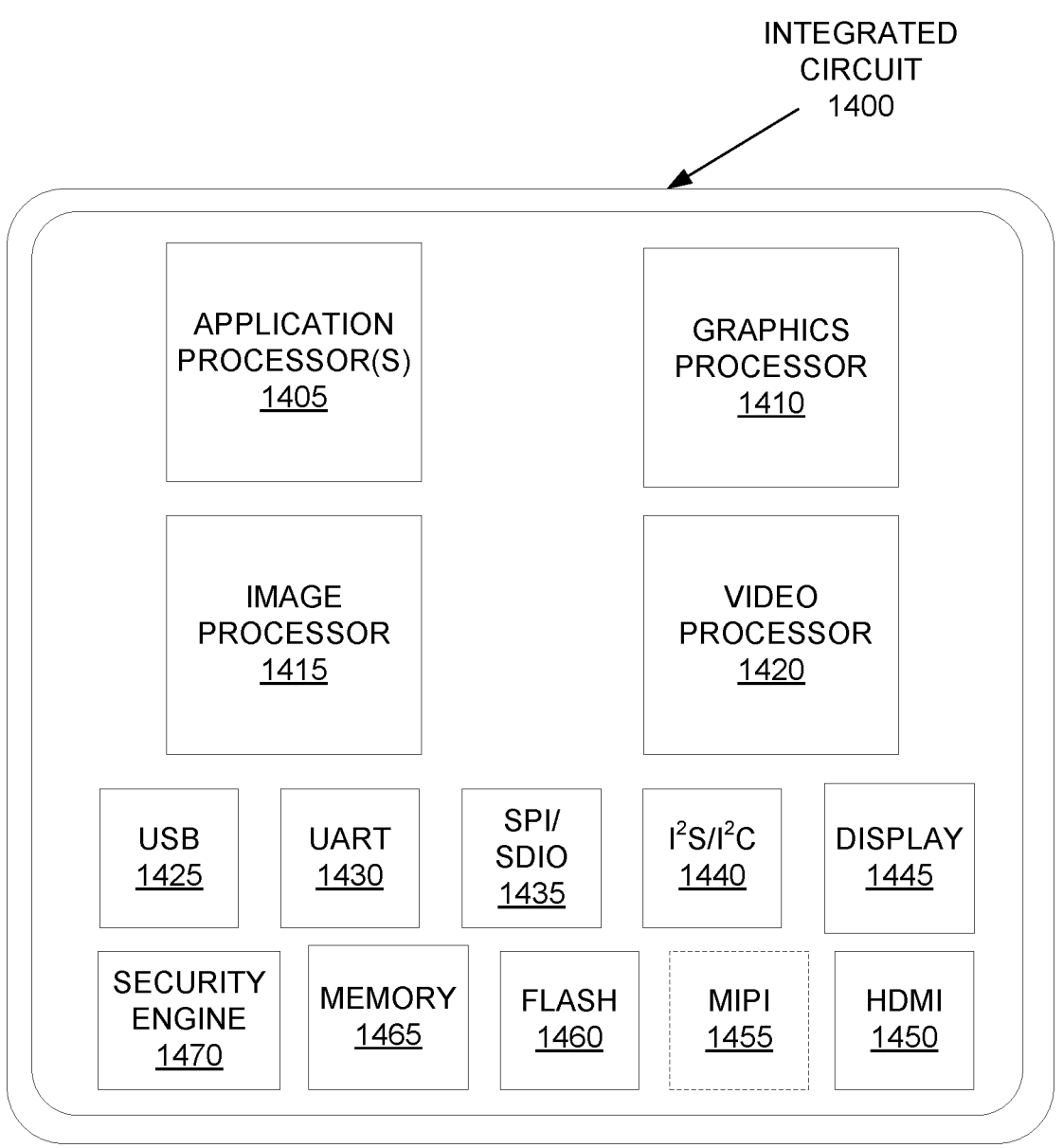
FIG. 14 illustrates an exemplary integrated circuit, in accordance with at least one embodiment.

FIG. 14 illustrates an exemplary integrated circuit 1400, in accordance with at least one embodiment. In at least one embodiment, exemplary integrated circuit 1400 is an SoC that may be fabricated using one or more IP cores. In at least one embodiment, integrated circuit 1400 includes one or more application processor(s) 1405 (e.g., CPUs, DPUs), at least one graphics processor 1410, and may additionally include an image processor 1415 and/or a video processor 1420, any of which may be a modular IP core. In at least one embodiment, integrated circuit 1400 includes peripheral or bus logic including a USB controller 1425, a UART controller 1430, an SPI/SDIO controller 1435, and an I²S/I²C controller 1440. In at least one embodiment, integrated circuit 1400 can include a display device 1445 coupled to one or more of a high-definition multimedia interface ("HDMI") controller 1450 and a mobile industry processor interface ("MIPI") display interface 1455. In at least one embodiment, storage may be provided by a flash memory subsystem 1460 including flash memory and a flash memory controller. In at least one embodiment, a memory interface may be provided via a memory controller 1465 for access to SDRAM or SRAM memory devices. In at least one embodiment, some integrated circuits additionally include an embedded security engine 1470.

Figure 15:
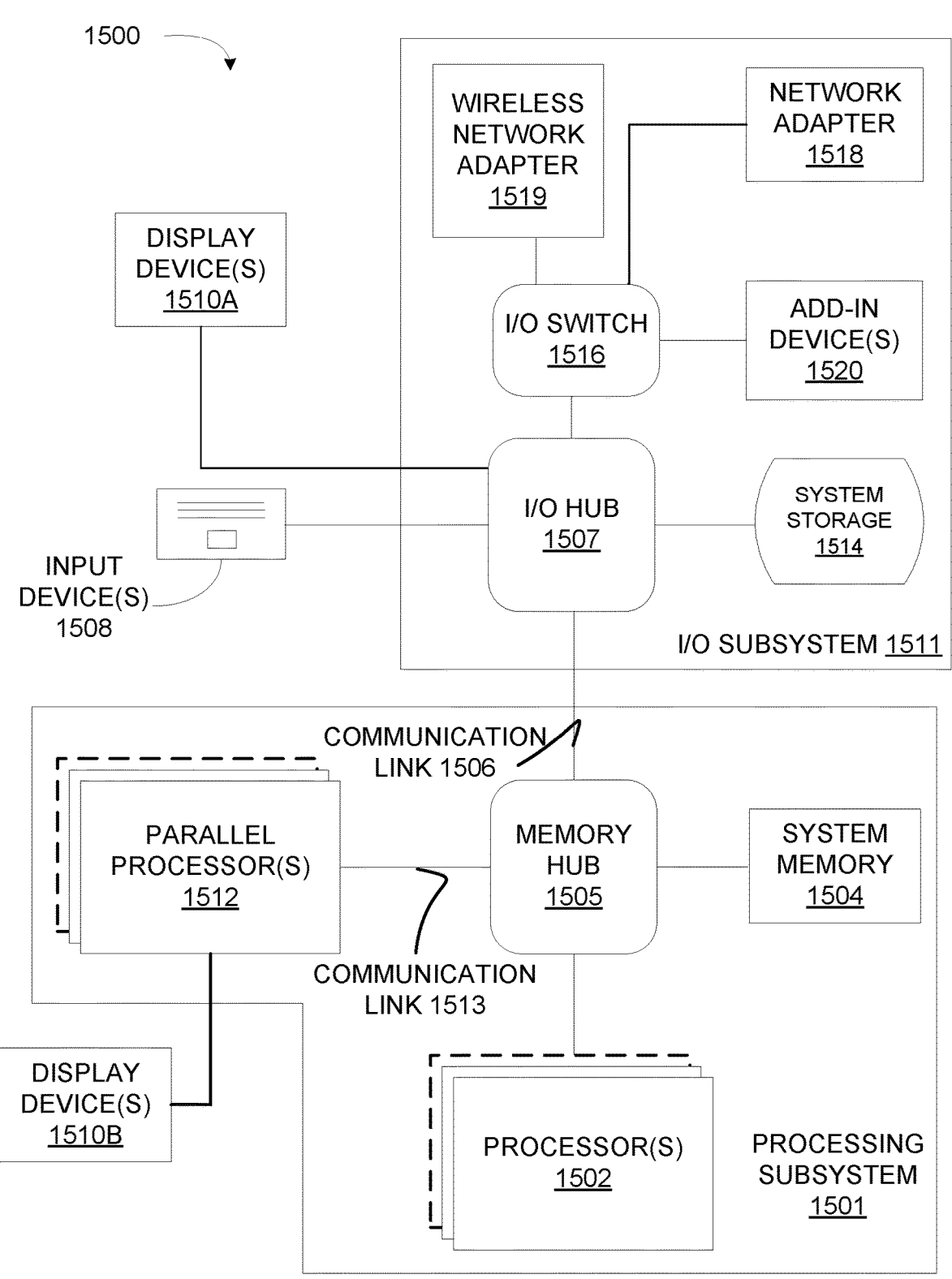
FIG. 15 illustrates a computing system, according to at least one embodiment.

FIG. 15 illustrates a computing system 1500, according to at least one embodiment; In at least one embodiment, computing system 1500 includes a processing subsystem 1501 having one or more processor(s) 1502 and a system memory 1504 communicating via an interconnection path that may include a memory hub 1505. In at least one embodiment, memory hub 1505 may be a separate component within a chipset component or may be integrated within one or more processor(s) 1502. In at least one embodiment, memory hub 1505 couples with an I/O subsystem 1511 via a communication link 1506. In at least one embodiment, I/O subsystem 1511 includes an I/O hub 1507 that can enable computing system 1500 to receive input from one or more input device(s) 1508. In at least one embodiment, I/O hub 1507 can enable a display controller, which may be included in one or more processor(s) 1502, to provide outputs to one or more display device(s) 1510A. In at least one embodiment, one or more display device(s) 1510A coupled with I/O hub 1507 can include a local, internal, or embedded display device.

In at least one embodiment, processing subsystem 1501 includes one or more parallel processor(s) 1512 coupled to memory hub 1505 via a bus or other communication link 1513. In at least one embodiment, communication link 1513 may be one of any number of standards based communication link technologies or protocols, such as, but not limited to PCIe, or may be a vendor specific communications interface or communications fabric. In at least one embodiment, one or more parallel processor(s) 1512 form a computationally focused parallel or vector processing system that can include a large number of processing cores and/or processing clusters, such as a many integrated core processor. In at least one embodiment, one or more parallel processor(s) 1512 form a graphics processing subsystem that can output pixels to one of one or more display device(s) 1510A coupled via I/O Hub 1507. In at least one embodiment, one or more parallel processor(s) 1512 can also include a display controller and display interface (not shown) to enable a direct connection to one or more display device(s) 1510B.

In at least one embodiment, a system storage unit 1514 can connect to I/O hub 1507 to provide a storage mechanism for computing system 1500. In at least one embodiment, an I/O switch 1516 can be used to provide an interface mechanism to enable connections between I/O hub 1507 and other components, such as a network adapter 1518 and/or wireless network adapter 1519 that may be integrated into a platform, and various other devices that can be added via one or more add-in device(s) 1520. In at least one embodiment, network adapter 1518 can be an Ethernet adapter or another wired network adapter. In at least one embodiment, wireless network adapter 1519 can include one or more of a Wi-Fi, Bluetooth, NFC, or other network device that includes one or more wireless radios.

In at least one embodiment, computing system 1500 can include other components not explicitly shown, including USB or other port connections, optical storage drives, video capture devices, and the like, that may also be connected to I/O hub 1507. In at least one embodiment, communication paths interconnecting various components in FIG. 15 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 1512 incorporate circuitry optimized for graphics and video processing, including, for example, video output circuitry, and constitutes a graphics processing unit ("GPU"). In at least one embodiment, one or more parallel processor(s) 1512 incorporate circuitry optimized for general purpose processing. In at least embodiment, components of computing system 1500 may be integrated with one or more other system elements on a single integrated circuit. For example, in at least one embodiment, one or more parallel processor(s) 1512, memory hub 1505, processor(s) 1502, and I/O hub 1507 can be integrated into an SoC integrated circuit. In at least one embodiment, components of computing system 1500 can be integrated into a single package to form a system in package ("SIP") configuration. In at least one embodiment, at least a portion of the components of computing system 1500 can be integrated into a multi-chip module ("MCM"), which can be interconnected with other multi-chip modules into a modular computing system. In at least one embodiment, I/O subsystem 1511 and display devices 1510B are omitted from computing system 1500.

Processing Systems

The following figures set forth, without limitation, exemplary processing systems that can be used to implement at least one embodiment.

In at least one embodiment, rather than a Streaming Multiprocessor (SM), a Stream Processing Unit ("SPU") may be used. In at least one embodiment, a single SPU contains multiple SPs, a branch control unit, and storage registers. In at least one embodiment, SPUs are grouped into a SIMD core, which contains a Thread Sequencer (or scheduler) to schedule threads on each SPU. In at least one embodiment, each SIMD core contains its own shared memory between SPUs, as well as other components like texture units and a cache. In at least one embodiment, each GPU contains multiple SIMD cores, as well as a form of global data storage (such as random access memory ("RAM")) and cache.

In at least one embodiment, GCN, and later in RDNA, SPU's are no longer needed. In at least one embodiment, SPs are combined into a SIMD core. In at least one embodiment, for GCN, a SIMD core has 16 SPs, and registers for shared memory. In at least one embodiment, for RDNA, each SIMD core has 32 SPs and more shared memory. In at least one embodiment, multiple SIMD cores are combined into one Compute Unit (CU). In at least one embodiment, for GCN, a single CU has four SIMD cores, along with data and instruction cache, a branch unit, and a "Scalar ALU." In at least one embodiment, a Scalar ALU is a special ALU for doing one-off math operations like log, sin/cos, etc.

In at least one embodiment, for RDNA, a single CU has two SIMD cores, with a scheduler, registers, and scalar ALU for each SIMD core. In at least one embodiment, these CUs have the same number of SPs as with GCN, but they are grouped into larger groups. In at least one embodiment, this serves a purpose when thread grouping as described below. In at least one embodiment, RDNA also pairs two CUs into a Work Group Processor (WGP), that has data and instruction cache shared across CUs. In at least one embodiment, a number of CUs/WGPs in a GPU varies across model.

In at least one embodiment, instead of a Warp, a Wavefront may be used. In at least one embodiment, GCN has 64 threads per wavefront, while RDNA cut this in half to 32 threads per wavefront. In at least one embodiment, this allows simplified scheduling and faster execution so that an entire wavefront can be executed by each SIMD core. In at least one embodiment, each CU can process four wavefronts (GCN), where each SIMD core works on a separate wavefront. In at least one embodiment, a hardware scheduler handles dispatching independent thread groups for each SIMD cores in each CU. In at least one embodiment, each SIMD core has its own internal scheduler. In at least one embodiment, to schedule workloads across CUs, an Asynchronous Compute Engine (ACE) may be used. In at least one embodiment, an ACE handles resource allocation, context switching, etc., and schedules wavefronts across CUs.

In at least one embodiment, an "Execution Unit" or EU may be used in place of an SP. In at least one embodiment, an EU is a single thread unit with two sets of 4-wide SIMD circuits. In at least one embodiment, one set of SIMD circuits has FPUs and integer ALUs, and one set of SIMD circuits has FPUs and special function units (SFUs), which may be called "extended math" (EM) units. In at least one embodiment, each EU has a thread control unit, and registers/memory to track thread state and data. In at least one embodiment, this may be used in place of a "core" or "streaming processor" in a "streaming multiprocessor".

In at least one embodiment, EUs are grouped into a "sub-slice" or "subslice," which is a collection of 16 EUs with a thread dispatch unit, instruction cache, data cache, texture cache, a load/store unit, and what may be called "samplers." In at least one embodiment, a "subslice" is used in place of an SM or SIMD core. In at least one embodiment, subslices are grouped into an Xe "slice" or "Xslice". In at least one embodiment, a slice or Xslice is useable in place of a CU.

In at least one embodiment, a warp may be replaced with a wave, wavefront or group of threads. In at least one embodiment, a "wave," "wavefront," or "threads" consists of at least 8 threads.

In at least one embodiment, techniques described above may be implemented on a computer system as described below such as a computer system 1200 or exemplary integrated circuit 1400. In at least one embodiment, an application run in a computer system can be divided into dependent threads which are run in parallel on a plurality of processors. In at least one embodiment, processors may include any processor type described below including APU 1600, CPU 1700, graphics core 2000, graphics processor 1910, GPGPU 2030, parallel processor 2100, graphics multiprocessor 2134, graphics processor 2200, processor 2300, processor 2400, graphics processor core 2500, PPU 2600, GPC 2700, SM 2800, or accelerator integration slice 1890. In at least one embodiment, one or more circuits cause two or more dependent threads to be performed in parallel using two or more separate multithreaded processor cores. In at least one embodiment, a processor core can be a core in a multi-core CPU, an SMP core in a GPU, or other circuit capable of executing storable instructions. In at least one embodiment, one or more circuits to cause a first group of threads to be organized in two or more subgroups of threads to be performed in parallel using two or more processor cores. In at least one embodiment, groups of threads can be cooperative group that runs in parallel. In at least one embodiment, a cooperative group includes a plurality of kernel threads arranged in a warp on a GPU. In at least one embodiment, synchronization operations between threads can be enabled through use of a barrier. In at least one embodiment one or more circuits perform a memory barrier operation to cause accesses to memory by a plurality of groups of threads to occur in an order indicated by memory barrier operation. In at least one embodiment, a barrier operation can be an atomic operation such as a bitwise logical operation (AND, OR, XOR, for example) or a mathematical operation such as an atomic addition or subtraction.

Figure 16:
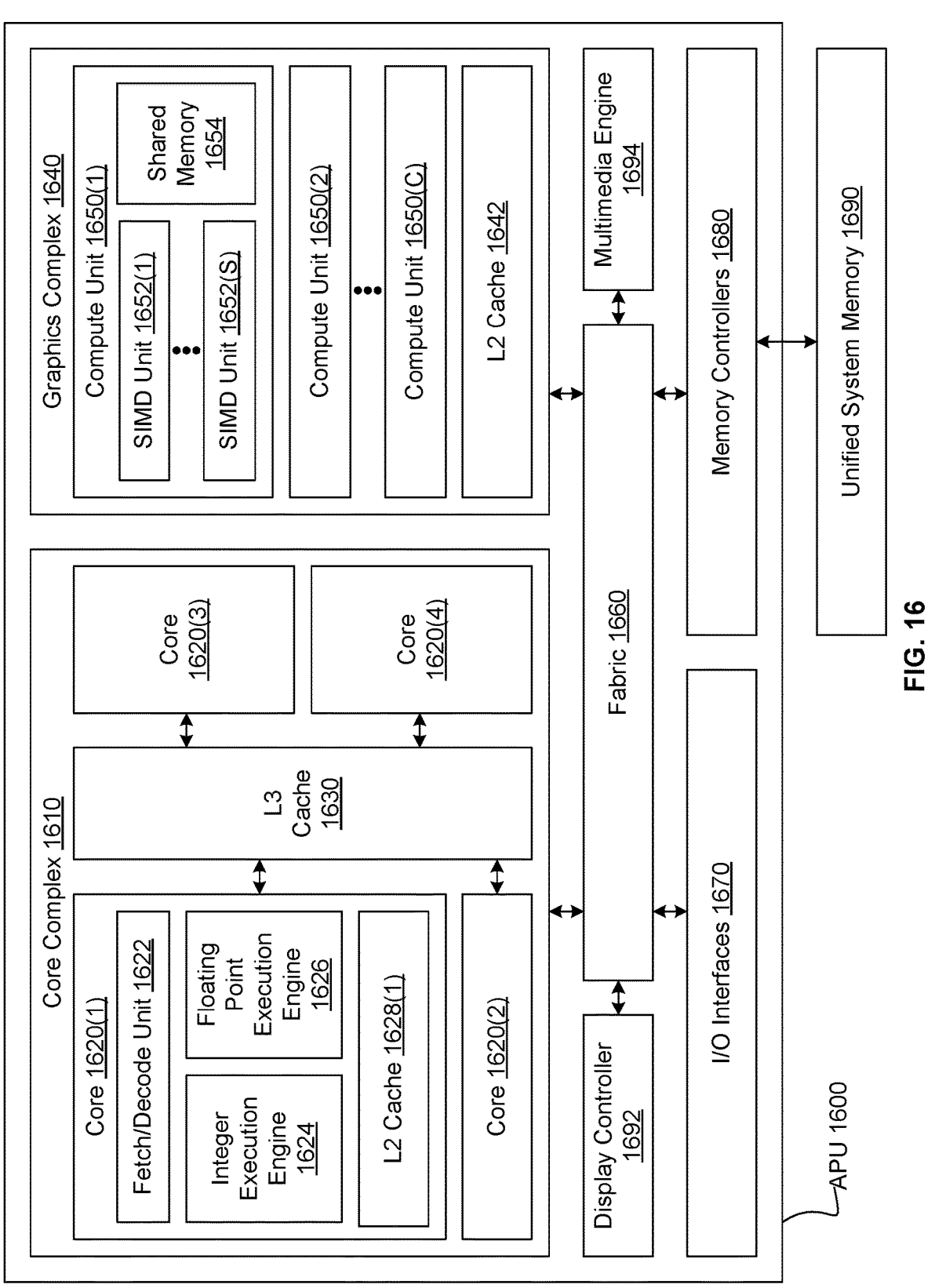
FIG. 16 illustrates an APU, in accordance with at least one embodiment.

FIG. 16 illustrates an accelerated processing unit ("APU") 1600, in accordance with at least one embodiment. In at least one embodiment, APU 1600 is developed by AMD Corporation of Santa Clara, CA. In at least one embodiment, APU 1600 can be configured to execute an application program, such as a CUDA program. In at least one embodiment, APU 1600 includes, without limitation, a core complex 1610, a graphics complex 1640, fabric 1660, I/O interfaces 1670, memory controllers 1680, a display controller 1692, and a multimedia engine 1694. In at least one embodiment, APU 1600 may include, without limitation, any number of core complexes 1610, any number of graphics complexes 1650, any number of display controllers 1692, and any number of multimedia engines 1694 in any combination. For explanatory purposes, multiple instances of like objects are denoted herein with reference numbers identifying the object and parenthetical numbers identifying the instance where needed.

In at least one embodiment, core complex 1610 is a CPU, graphics complex 1640 is a GPU, and APU 1600 is a processing unit that integrates, without limitation, 1610 and 1640 onto a single chip. In at least one embodiment, some tasks may be assigned to core complex 1610 and other tasks may be assigned to graphics complex 1640. In at least one embodiment, core complex 1610 is configured to execute main control software associated with APU 1600, such as an operating system. In at least one embodiment, core complex 1610 is the master processor of APU 1600, controlling and coordinating operations of other processors. In at least one embodiment, core complex 1610 issues commands that control the operation of graphics complex 1640. In at least one embodiment, core complex 1610 can be configured to execute host executable code derived from CUDA source code, and graphics complex 1640 can be configured to execute device executable code derived from CUDA source code.

In at least one embodiment, core complex 1610 includes, without limitation, cores 1620(1)-1620(4) and an L3 cache 1630. In at least one embodiment, core complex 1610 may include, without limitation, any number of cores 1620 and any number and type of caches in any combination. In at least one embodiment, cores 1620 are configured to execute instructions of a particular instruction set architecture ("ISA"). In at least one embodiment, each core 1620 is a CPU core.

In at least one embodiment, each core 1620 includes, without limitation, a fetch/decode unit 1622, an integer execution engine 1624, a floating point execution engine 1626, and an L2 cache 1628. In at least one embodiment, fetch/decode unit 1622 fetches instructions, decodes such instructions, generates micro-operations, and dispatches separate micro-instructions to integer execution engine 1624 and floating point execution engine 1626. In at least one embodiment, fetch/decode unit 1622 can concurrently dispatch one micro-instruction to integer execution engine 1624 and another micro-instruction to floating point execution engine 1626. In at least one embodiment, integer execution engine 1624 executes, without limitation, integer and memory operations. In at least one embodiment, floating point engine 1626 executes, without limitation, floating point and vector operations. In at least one embodiment, fetch-decode unit 1622 dispatches micro-instructions to a single execution engine that replaces both integer execution engine 1624 and floating point execution engine 1626.

In at least one embodiment, each core 1620 (*i*), where i is an integer representing a particular instance of core 1620, may access L2 cache 1628 (*i*) included in core 1620 (*i*). In at least one embodiment, each core 1620 included in core complex 1610(*j*), where j is an integer representing a particular instance of core complex 1610, is connected to other cores 1620 included in core complex 1610(*j*) via L3 cache 1630 (*j*) included in core complex 1610(*j*). In at least one embodiment, cores 1620 included in core complex 1610(*j*), where j is an integer representing a particular instance of core complex 1610, can access all of L3 cache 1630 (*j*) included in core complex 1610(*j*). In at least one embodiment, L3 cache 1630 may include, without limitation, any number of slices.

In at least one embodiment, graphics complex 1640 can be configured to perform compute operations in a highly-parallel fashion. In at least one embodiment, graphics complex 1640 is configured to execute graphics pipeline operations such as draw commands, pixel operations, geometric computations, and other operations associated with rendering an image to a display. In at least one embodiment, graphics complex 1640 is configured to execute operations unrelated to graphics. In at least one embodiment, graphics complex 1640 is configured to execute both operations related to graphics and operations unrelated to graphics.

In at least one embodiment, graphics complex 1640 includes, without limitation, any number of compute units 1650 and an L2 cache 1642. In at least one embodiment, compute units 1650 share L2 cache 1642. In at least one embodiment, L2 cache 1642 is partitioned. In at least one embodiment, graphics complex 1640 includes, without limitation, any number of compute units 1650 and any number (including zero) and type of caches. In at least one embodiment, graphics complex 1640 includes, without limitation, any amount of dedicated graphics hardware.

In at least one embodiment, each compute unit 1650 includes, without limitation, any number of SIMD units 1652 and a shared memory 1654. In at least one embodiment, each SIMD unit 1652 implements a SIMD architecture and is configured to perform operations in parallel. In at least one embodiment, each compute unit 1650 may execute any number of thread blocks, but each thread block executes on a single compute unit 1650. In at least one embodiment, a thread block includes, without limitation, any number of threads of execution. In at least one embodiment, a workgroup is a thread block. In at least one embodiment, each SIMD unit 1652 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 1654.

In at least one embodiment, fabric 1660 is a system interconnect that facilitates data and control transmissions across core complex 1610, graphics complex 1640, I/O interfaces 1670, memory controllers 1680, display controller 1692, and multimedia engine 1694. In at least one embodiment, APU 1600 may include, without limitation, any amount and type of system interconnect in addition to or instead of fabric 1660 that facilitates data and control transmissions across any number and type of directly or indirectly linked components that may be internal or external to APU 1600. In at least one embodiment, I/O interfaces 1670 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 1670 In at least one embodiment, peripheral devices that are coupled to I/O interfaces 1670 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 1694 includes, without limitation, any amount and type of circuitry that is related to multimedia, such as a video decoder, a video encoder, an image signal processor, etc. In at least one embodiment, memory controllers 1680 facilitate data transfers between APU 1600 and a unified system memory 1690. In at least one embodiment, core complex 1610 and graphics complex 1640 share unified system memory 1690.

In at least one embodiment, APU 1600 implements a memory subsystem that includes, without limitation, any amount and type of memory controllers 1680 and memory devices (e.g., shared memory 1654) that may be dedicated to one component or shared among multiple components. In at least one embodiment, APU 1600 implements a cache subsystem that includes, without limitation, one or more cache memories (e.g., L2 caches 1728, L3 cache 1630, and L2 cache 1642) that may each be private to or shared between any number of components (e.g., cores 1620, core complex 1610, SIMD units 1652, compute units 1650, and graphics complex 1640).

Figure 17:
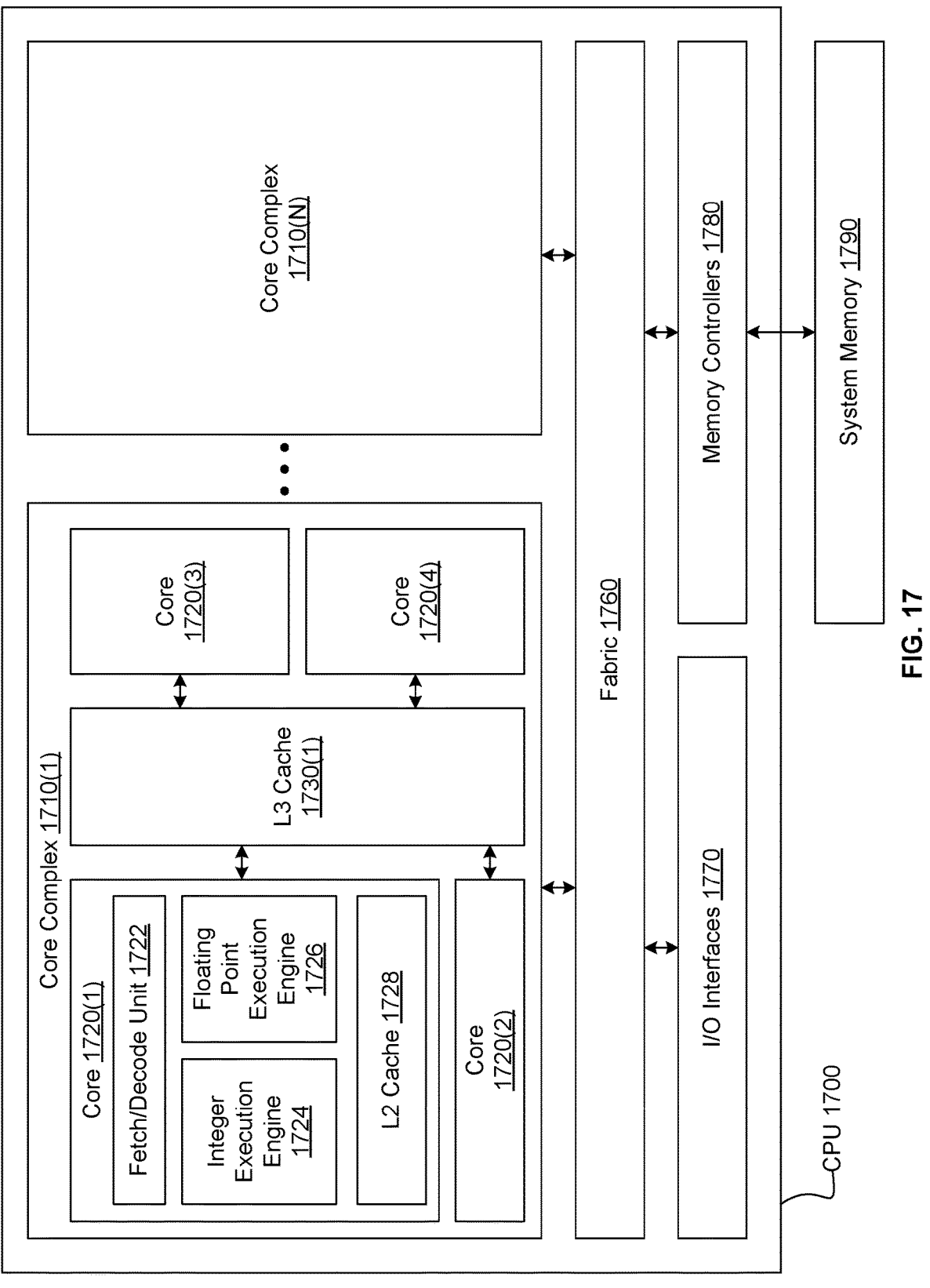
FIG. 17 illustrates a CPU, in accordance with at least one embodiment.

FIG. 17 illustrates a CPU 1700, in accordance with at least one embodiment. In at least one embodiment, CPU 1700 is developed by AMD Corporation of Santa Clara, CA. In at least one embodiment, CPU 1700 can be configured to execute an application program. In at least one embodiment, CPU 1700 is configured to execute main control software, such as an operating system. In at least one embodiment, CPU 1700 issues commands that control the operation of an external GPU (not shown). In at least one embodiment, CPU 1700 can be configured to execute host executable code derived from CUDA source code, and an external GPU can be configured to execute device executable code derived from such CUDA source code. In at least one embodiment, CPU 1700 includes, without limitation, any number of core complexes 1710, fabric 1760, I/O interfaces 1770, and memory controllers 1780.

In at least one embodiment, core complex 1710 includes, without limitation, cores 1720(1)-1720(4) and an L3 cache 1730. In at least one embodiment, core complex 1710 may include, without limitation, any number of cores 1720 and any number and type of caches in any combination. In at least one embodiment, cores 1720 are configured to execute instructions of a particular ISA. In at least one embodiment, each core 1720 is a CPU core.

In at least one embodiment, each core 1720 includes, without limitation, a fetch/decode unit 1722, an integer execution engine 1724, a floating point execution engine 1726, and an L2 cache 1728. In at least one embodiment, fetch/decode unit 1722 fetches instructions, decodes such instructions, generates micro-operations, and dispatches separate micro-instructions to integer execution engine 1724 and floating point execution engine 1726. In at least one embodiment, fetch/decode unit 1722 can concurrently dispatch one micro-instruction to integer execution engine 1724 and another micro-instruction to floating point execution engine 1726. In at least one embodiment, integer execution engine 1724 executes, without limitation, integer and memory operations. In at least one embodiment, floating point engine 1726 executes, without limitation, floating point and vector operations. In at least one embodiment, fetch-decode unit 1722 dispatches micro-instructions to a single execution engine that replaces both integer execution engine 1724 and floating point execution engine 1726.

In at least one embodiment, each core 1720 (*i*), where i is an integer representing a particular instance of core 1720, may access L2 cache 1728 (*i*) included in core 1720 (*i*). In at least one embodiment, each core 1720 included in core complex 1710(*j*), where j is an integer representing a particular instance of core complex 1710, is connected to other cores 1720 in core complex 1710(*j*) via L3 cache 1730 (*j*) included in core complex 1710(*j*). In at least one embodiment, cores 1720 included in core complex 1710(*j*), where j is an integer representing a particular instance of core complex 1710, can access all of L3 cache 1730 (*j*) included in core complex 1710(*j*). In at least one embodiment, L3 cache 1730 may include, without limitation, any number of slices.

In at least one embodiment, fabric 1760 is a system interconnect that facilitates data and control transmissions across core complexes 1710(1)-1710(N) (where N is an integer greater than zero), I/O interfaces 1770, and memory controllers 1780. In at least one embodiment, CPU 1700 may include, without limitation, any amount and type of system interconnect in addition to or instead of fabric 1760 that facilitates data and control transmissions across any number and type of directly or indirectly linked components that may be internal or external to CPU 1700. In at least one embodiment, I/O interfaces 1770 are representative of any number and type of I/O interfaces (e.g., PCI, PCI-X, PCIe, GBE, USB, etc.). In at least one embodiment, various types of peripheral devices are coupled to I/O interfaces 1770 In at least one embodiment, peripheral devices that are coupled to I/O interfaces 1770 may include, without limitation, displays, keyboards, mice, printers, scanners, joysticks or other types of game controllers, media recording devices, external storage devices, network interface cards, and so forth.

In at least one embodiment, memory controllers 1780 facilitate data transfers between CPU 1700 and a system memory 1790. In at least one embodiment, core complex 1710 and graphics complex 1740 share system memory 1790. In at least one embodiment, CPU 1700 implements a memory subsystem that includes, without limitation, any amount and type of memory controllers 1780 and memory devices that may be dedicated to one component or shared among multiple components. In at least one embodiment, CPU 1700 implements a cache subsystem that includes, without limitation, one or more cache memories (e.g., L2 caches 1728 and L3 caches 1730) that may each be private to or shared between any number of components (e.g., cores 1720 and core complexes 1710).

Figure 18:
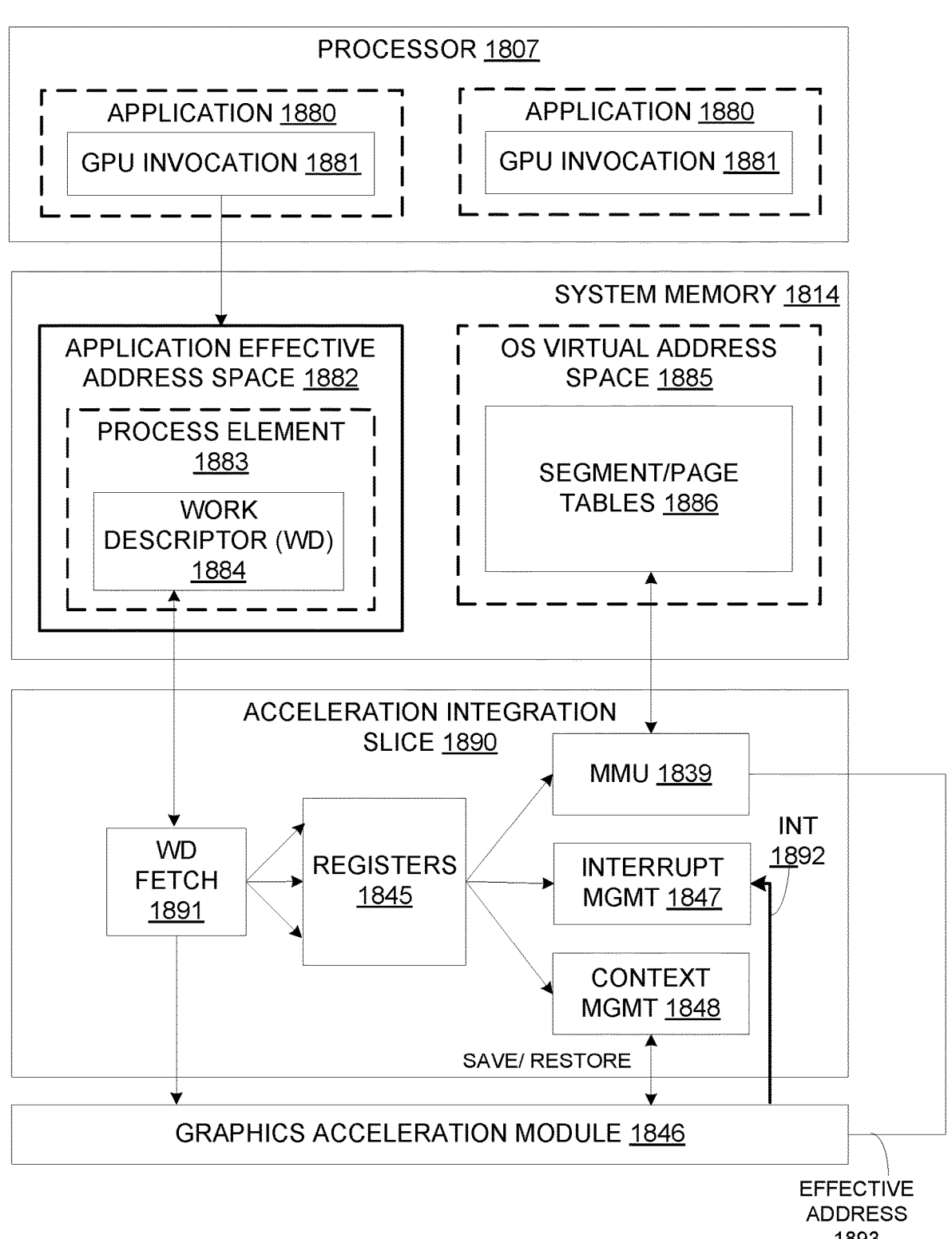
FIG. 18 illustrates an exemplary accelerator integration slice, in accordance with at least one embodiment.

FIG. 18 illustrates an exemplary accelerator integration slice 1890, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 1882 within system memory 1814 stores process elements 1883. In one embodiment, process elements 1883 are stored in response to GPU invocations 1881 from applications 1880 executed on processor 1807. A process element 1883 contains process state for corresponding application 1880. A work descriptor ("WD") 1884 contained in process element 1883 can be a single job requested by an application or may contain a pointer to a queue of jobs. In at least one embodiment, WD 1884 is a pointer to a job request queue in application effective address space 1882.

Graphics acceleration module 1846 and/or individual graphics processing engines can be shared by all or a subset of processes in a system. In at least one embodiment, an infrastructure for setting up process state and sending WD 1884 to graphics acceleration module 1846 to start a job in a virtualized environment may be included.

In at least one embodiment, a dedicated-process programming model is implementation-specific. In this model, a single process owns graphics acceleration module 1846 or an individual graphics processing engine. Because graphics acceleration module 1846 is owned by a single process, a hypervisor initializes an accelerator integration circuit for an owning partition and an operating system initializes accelerator integration circuit for an owning process when graphics acceleration module 1846 is assigned.

In operation, a WD fetch unit 1891 in accelerator integration slice 1890 fetches next WD 1884 which includes an indication of work to be done by one or more graphics processing engines of graphics acceleration module 1846. Data from WD 1884 may be stored in registers 1845 and used by a memory management unit ("MMU") 1839, interrupt management circuit 1847 and/or context management circuit 1848 as illustrated. For example, one embodiment of MMU 1839 includes segment/page walk circuitry for accessing segment/page tables 1886 within OS virtual address space 1885. Interrupt management circuit 1847 may process interrupt events ("INT") 1892 received from graphics acceleration module 1846. When performing graphics operations, an effective address 1893 generated by a graphics processing engine is translated to a real address by MMU 1839.

In one embodiment, a same set of registers 1845 are duplicated for each graphics processing engine and/or graphics acceleration module 1846 and may be initialized by a hypervisor or operating system. Each of these duplicated registers may be included in accelerator integration slice 1890. Exemplary registers that may be initialized by a hypervisor are shown in Table 1.

TABLE 1

| Hypervisor Initialized Registers | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| Operating System Initialized Registers | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 1884 is specific to a particular graphics acceleration module 1846 and/or a particular graphics processing engine. It contains all information required by a graphics processing engine to do work or it can be a pointer to a memory location where an application has set up a command queue of work to be completed.

Figure 19A:
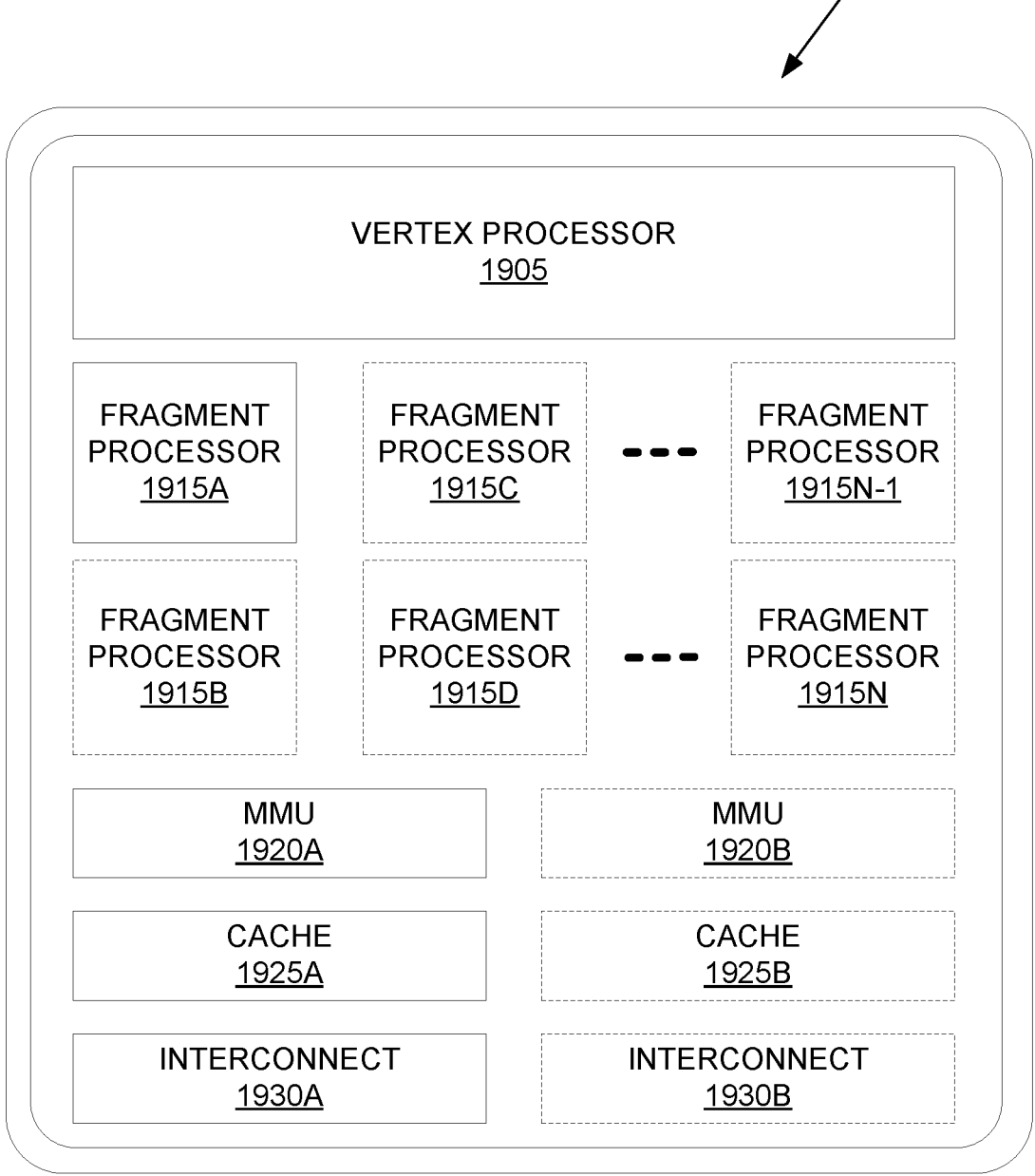
FIGS. 19A-19B illustrate exemplary graphics processors, in accordance with at least one embodiment.
Figure 19B:
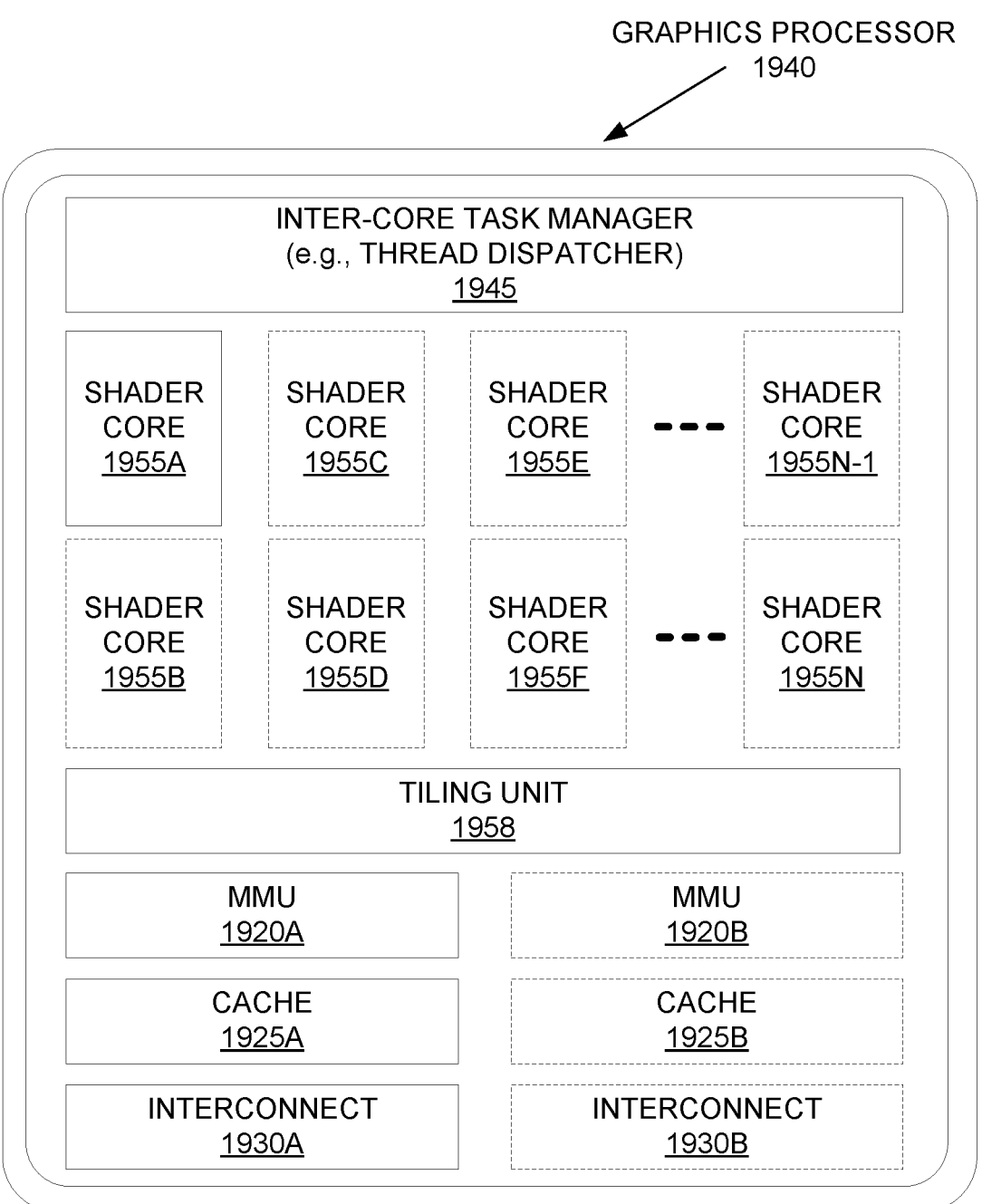

FIGS. 19A-19B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 19A illustrates an exemplary graphics processor 1910 of an SoC integrated circuit that may be fabricated using one or more IP cores, in accordance with at least one embodiment. FIG. 19B illustrates an additional exemplary graphics processor 1940 of an SoC integrated circuit that may be fabricated using one or more IP cores, in accordance with at least one embodiment. In at least one embodiment, graphics processor 1910 of FIG. 19A is a low power graphics processor core. In at least one embodiment, graphics processor 1940 of FIG. 19B is a higher performance graphics processor core. In at least one embodiment, each of graphics processors 1910, 1940 can be variants of graphics processor 1410 of FIG. 14.

In at least one embodiment, graphics processor 1910 includes a vertex processor 1905 and one or more fragment processor(s) 1915A-1915N (e.g., 1915A, 1915B, 1915C, 1915D, through 1915N-1, and 1915N). In at least one embodiment, graphics processor 1910 can execute different shader programs via separate logic, such that vertex processor 1905 is optimized to execute operations for vertex shader programs, while one or more fragment processor(s) 1915A-1915N execute fragment (e.g., pixel) shading operations for fragment or pixel shader programs. In at least one embodiment, vertex processor 1905 performs a vertex processing stage of a 3D graphics pipeline and generates primitives and vertex data. In at least one embodiment, fragment processor(s) 1915A-1915N use primitive and vertex data generated by vertex processor 1905 to produce a framebuffer that is displayed on a display device. In at least one embodiment, fragment processor(s) 1915A-1915N are optimized to execute fragment shader programs as provided for in an OpenGL API, which may be used to perform similar operations as a pixel shader program as provided for in a Direct 3D API.

In at least one embodiment, graphics processor 1910 additionally includes one or more MMU(s) 1920A-1920B, cache(s) 1925A-1925B, and circuit interconnect(s) 1930A-1930B. In at least one embodiment, one or more MMU(s) 1920A-1920B provide for virtual to physical address mapping for graphics processor 1910, including for vertex processor 1905 and/or fragment processor(s) 1915A-1915N, which may reference vertex or image/texture data stored in memory, in addition to vertex or image/texture data stored in one or more cache(s) 1925A-1925B. In at least one embodiment, one or more MMU(s) 1920A-1920B may be synchronized with other MMUs within a system, including one or more MMUs associated with one or more application processor(s) 1405, image processors 1415, and/or video processors 1420 of FIG. 14, such that each processor 1405-1420 can participate in a shared or unified virtual memory system. In at least one embodiment, one or more circuit interconnect (s) 1930A-1930B enable graphics processor 1910 to interface with other IP cores within an SoC, either via an internal bus of the SoC or via a direct connection.

In at least one embodiment, graphics processor 1940 includes one or more MMU(s) 1920A-1920B, caches 1925A-1925B, and circuit interconnects 1930A-1930B of graphics processor 1910 of FIG. 19A. In at least one embodiment, graphics processor 1940 includes one or more shader core(s) 1955A-1955N (e.g., 1955A, 1955B, 1955C, 1955D, 1955E, 1955F, through 1955N-1, and 1955N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1940 includes an inter-core task manager 1945, which acts as a thread dispatcher to dispatch execution threads to one or more shader cores 1955A-1955N and a tiling unit 1958 to accelerate tiling operations for tile-based rendering, in which rendering operations for a scene are subdivided in image space, for example to exploit local spatial coherence within a scene or to optimize use of internal caches.

Figure 20A:
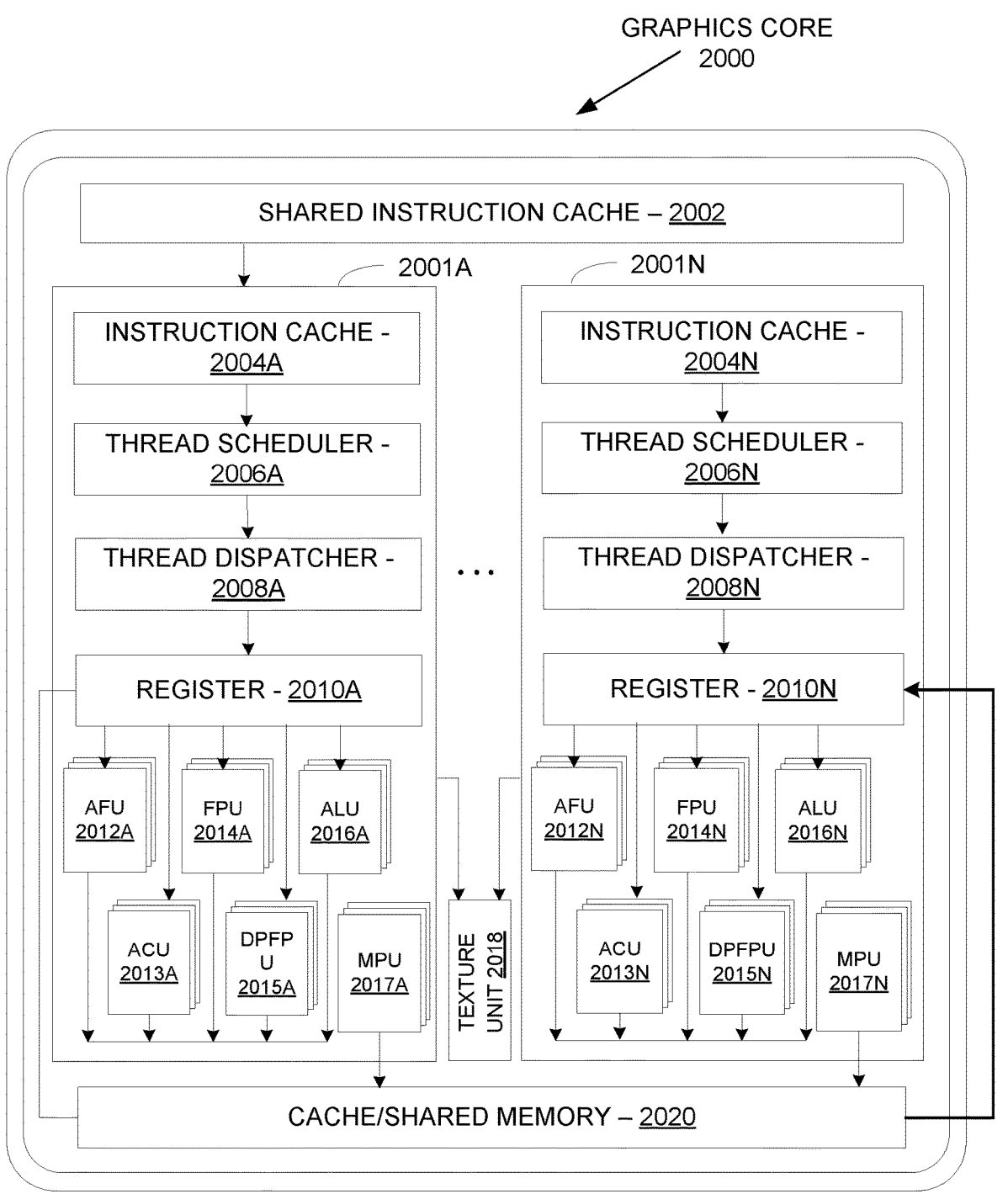
FIG. 20A illustrates a graphics core, in accordance with at least one embodiment.

FIG. 20A illustrates a graphics core 2000, in accordance with at least one embodiment. In at least one embodiment, graphics core 2000 may be included within graphics processor 1410 of FIG. 14. In at least one embodiment, graphics core 2000 may be a unified shader core 1955A-1955N as in FIG. 19B. In at least one embodiment, graphics core 2000 includes a shared instruction cache 2002, a texture unit 2018, and a cache/shared memory 2020 that are common to execution resources within graphics core 2000. In at least one embodiment, graphics core 2000 can include multiple slices 2001A-2001N or partition for each core, and a graphics processor can include multiple instances of graphics core 2000. Slices 2001A-2001N can include support logic including a local instruction cache 2004A-2004N, a thread scheduler 2006A-2006N, a thread dispatcher 2008A-2008N, and a set of registers 2010A-2010N. In at least one embodiment, slices 2001A-2001N can include a set of additional function units ("AFUs") 2012A-2012N, floating-point units ("FPUs") 2014A-2014N, integer arithmetic logic units ("ALUs") 2016-2016N, address computational units ("ACUs") 2013A-2013N, double-precision floating-point units ("DPFPUs") 2015A-2015N, and matrix processing units ("MPUs") 2017A-2017N.

In at least one embodiment, FPUs 2014A-2014N can perform single-precision (32-bit) and half-precision (16-bit) floating point operations, while DPFPUs 2015A-2015N perform double precision (64-bit) floating point operations. In at least one embodiment, ALUs 2016A-2016N can perform variable precision integer operations at 8-bit, 16-bit, and 32-bit precision, and can be configured for mixed precision operations. In at least one embodiment, MPUs 2017A-2017N can also be configured for mixed precision matrix operations, including half-precision floating point and 8-bit integer operations. In at least one embodiment, MPUs 2017-2017N can perform a variety of matrix operations to accelerate CUDA programs, including enabling support for accelerated general matrix to matrix multiplication ("GEMM"). In at least one embodiment, AFUs 2012A-2012N can perform additional logic operations not supported by floating-point or integer units, including trigonometric operations (e.g., Sine, Cosine, etc.).

Figure 20B:
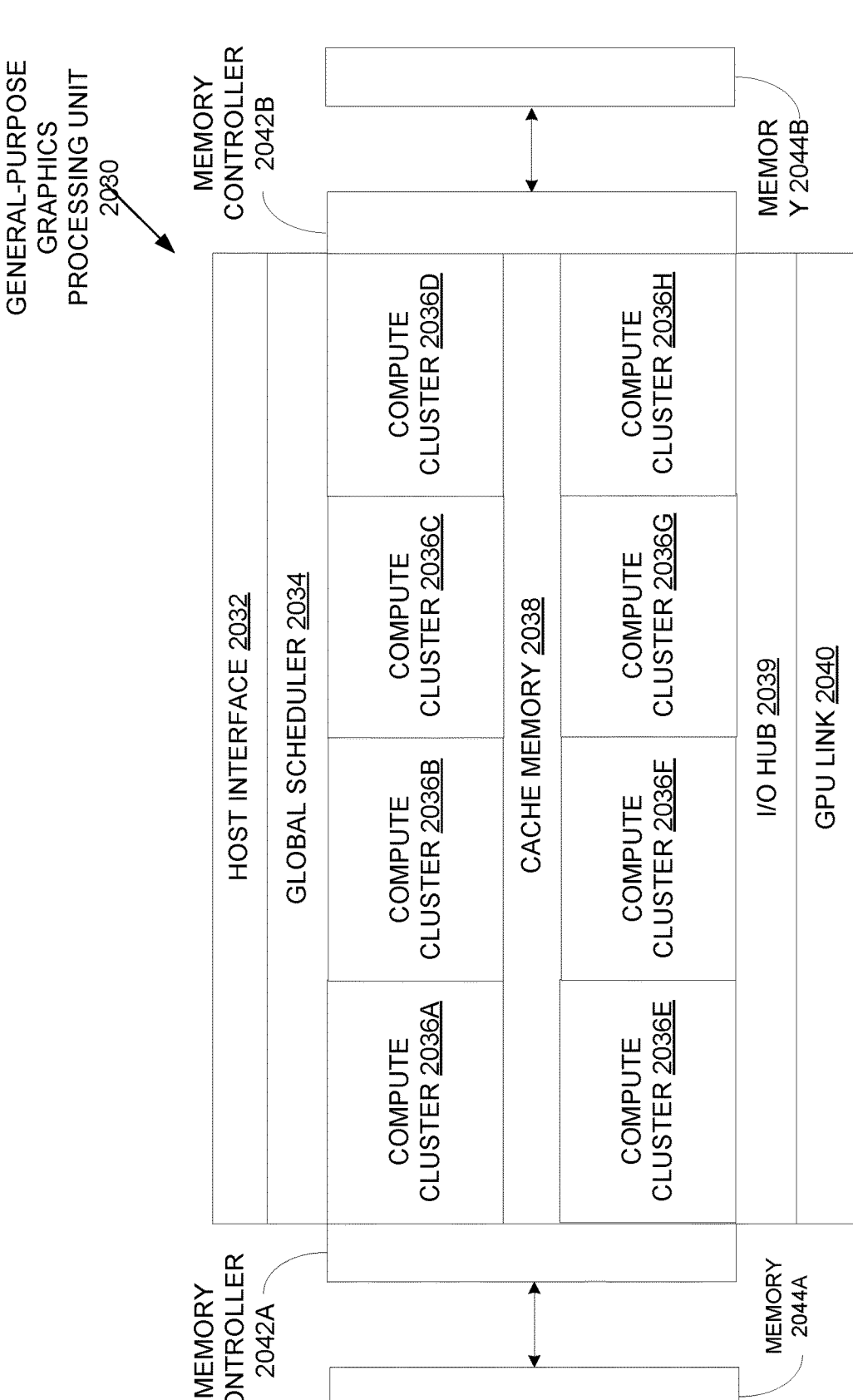
FIG. 20B illustrates a GPGPU, in accordance with at least one embodiment.

FIG. 20B illustrates a general-purpose graphics processing unit ("GPGPU") 2030, in accordance with at least one embodiment. In at least one embodiment, GPGPU 2030 is highly-parallel and suitable for deployment on a multi-chip module. In at least one embodiment, GPGPU 2030 can be configured to enable highly-parallel compute operations to be performed by an array of GPUs. In at least one embodiment, GPGPU 2030 can be linked directly to other instances of GPGPU 2030 to create a multi-GPU cluster to improve execution time for CUDA programs. In at least one embodiment, GPGPU 2030 includes a host interface 2032 to enable a connection with a host processor. In at least one embodiment, host interface 2032 is a PCIe interface. In at least one embodiment, host interface 2032 can be a vendor specific communications interface or communications fabric. In at least one embodiment, GPGPU 2030 receives commands from a host processor and uses a global scheduler 2034 to distribute execution threads associated with those commands to a set of compute clusters 2036A-2036H. In at least one embodiment, compute clusters 2036A-2036H share a cache memory 2038. In at least one embodiment, cache memory 2038 can serve as a higher-level cache for cache memories within compute clusters 2036A-2036H.

In at least one embodiment, GPGPU 2030 includes memory 2044A-2044B coupled with compute clusters 2036A-2036H via a set of memory controllers 2042A-2042B. In at least one embodiment, memory 2044A-2044B can include various types of memory devices including DRAM or graphics random access memory, such as synchronous graphics random access memory ("SGRAM"), including graphics double data rate ("GDDR") memory.

In at least one embodiment, compute clusters 2036A-2036H each include a set of graphics cores, such as graphics core 2000 of FIG. 20A, which can include multiple types of integer and floating point logic units that can perform computational operations at a range of precisions including suited for computations associated with CUDA programs. For example, in at least one embodiment, at least a subset of floating point units in each of compute clusters 2036A-2036H can be configured to perform 16-bit or 32-bit floating point operations, while a different subset of floating point units can be configured to perform 64-bit floating point operations.

In at least one embodiment, multiple instances of GPGPU 2030 can be configured to operate as a compute cluster. Compute clusters 2036A-2036H may implement any technically feasible communication techniques for synchronization and data exchange. In at least one embodiment, multiple instances of GPGPU 2030 communicate over host interface 2032. In at least one embodiment, GPGPU 2030 includes an I/O hub 2039 that couples GPGPU 2030 with a GPU link 2040 that enables a direct connection to other instances of GPGPU 2030. In at least one embodiment, GPU link 2040 is coupled to a dedicated GPU-to-GPU bridge that enables communication and synchronization between multiple instances of GPGPU 2030. In at least one embodiment GPU link 2040 couples with a high speed interconnect to transmit and receive data to other GPGPUs 2030 or parallel processors. In at least one embodiment, multiple instances of GPGPU 2030 are located in separate data processing systems and communicate via a network device that is accessible via host interface 2032. In at least one embodiment GPU link 2040 can be configured to enable a connection to a host processor in addition to or as an alternative to host interface 2032. In at least one embodiment, GPGPU 2030 can be configured to execute a CUDA program.

Figure 21A:
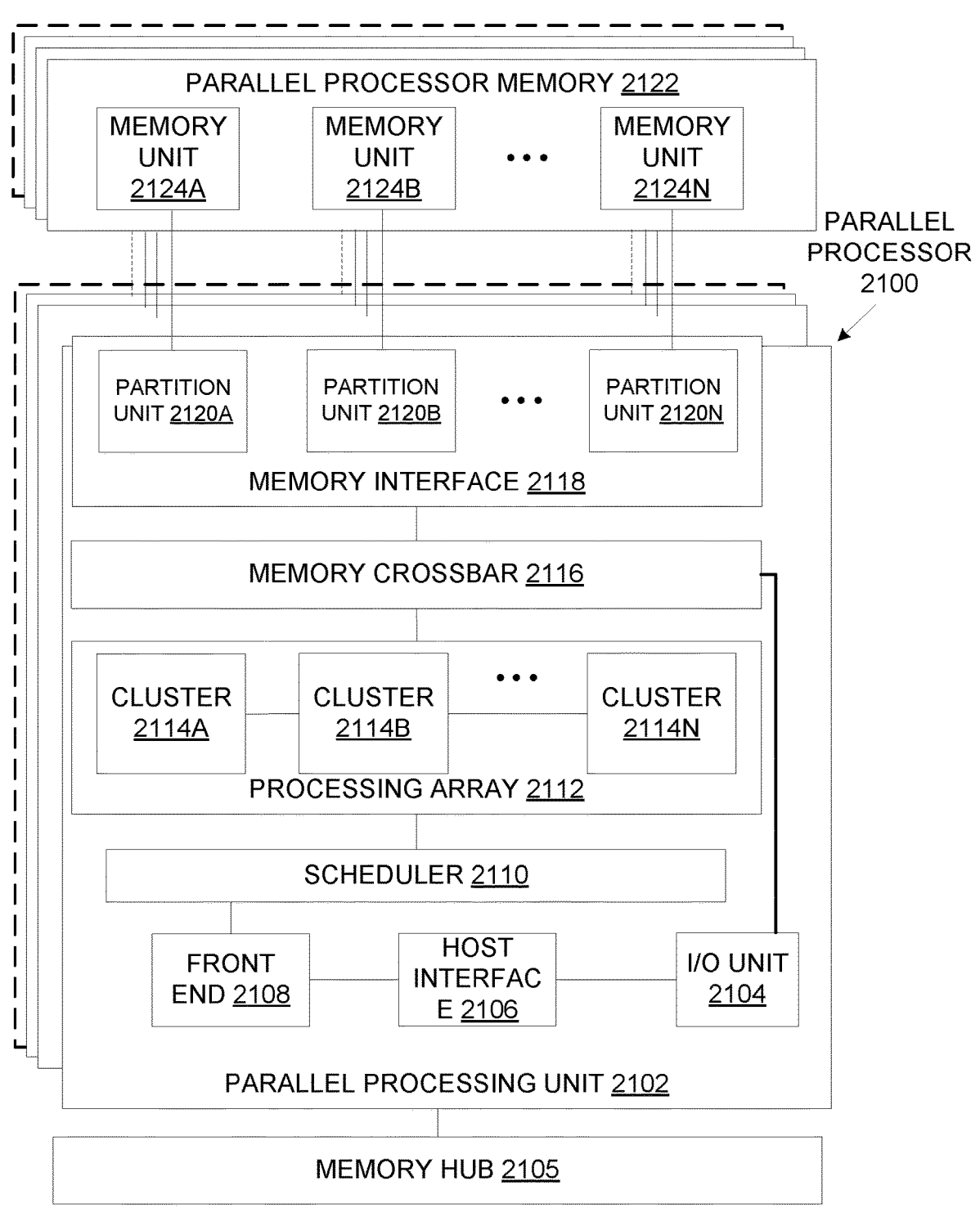
FIG. 21A illustrates a parallel processor, in accordance with at least one embodiment.

FIG. 21A illustrates a parallel processor 2100, in accordance with at least one embodiment. In at least one embodiment, various components of parallel processor 2100 may be implemented using one or more integrated circuit devices, such as programmable processors, application specific integrated circuits ("ASICs"), or FPGAs.

In at least one embodiment, parallel processor 2100 includes a parallel processing unit 2102. In at least one embodiment, parallel processing unit 2102 includes an I/O unit 2104 that enables communication with other devices, including other instances of parallel processing unit 2102. In at least one embodiment, I/O unit 2104 may be directly connected to other devices. In at least one embodiment, I/O unit 2104 connects with other devices via use of a hub or switch interface, such as memory hub 2105. In at least one embodiment, connections between memory hub 2105 and I/O unit 2104 form a communication link. In at least one embodiment, I/O unit 2104 connects with a host interface 2106 and a memory crossbar 2116, where host interface 2106 receives commands directed to performing processing operations and memory crossbar 2116 receives commands directed to performing memory operations.

In at least one embodiment, when host interface 2106 receives a command buffer via I/O unit 2104, host interface 2106 can direct work operations to perform those commands to a front end 2108. In at least one embodiment, front end 2108 couples with a scheduler 2110, which is configured to distribute commands or other work items to a processing array 2112. In at least one embodiment, scheduler 2110 ensures that processing array 2112 is properly configured and in a valid state before tasks are distributed to processing array 2112. In at least one embodiment, scheduler 2110 is implemented via firmware logic executing on a microcontroller. In at least one embodiment, microcontroller implemented scheduler 2110 is configurable to perform complex scheduling and work distribution operations at coarse and fine granularity, enabling rapid preemption and context switching of threads executing on processing array 2112. In at least one embodiment, host software can prove workloads for scheduling on processing array 2112 via one of multiple graphics processing doorbells. In at least one embodiment, workloads can then be automatically distributed across processing array 2112 by scheduler 2110 logic within a microcontroller including scheduler 2110.

In at least one embodiment, processing array 2112 can include up to "N" clusters (e.g., cluster 2114A, cluster 2114B, through cluster 2114N). In at least one embodiment, each cluster 2114A-2114N of processing array 2112 can execute a large number of concurrent threads. In at least one embodiment, scheduler 2110 can allocate work to clusters 2114A-2114N of processing array 2112 using various scheduling and/or work distribution algorithms, which may vary depending on the workload arising for each type of program or computation. In at least one embodiment, scheduling can be handled dynamically by scheduler 2110, or can be assisted in part by compiler logic during compilation of program logic configured for execution by processing array 2112. In at least one embodiment, different clusters 2114A-

2114N of processing array 2112 can be allocated for processing different types of programs or for performing different types of computations.

In at least one embodiment, processing array 2112 can be configured to perform various types of parallel processing operations. In at least one embodiment, processing array 2112 is configured to perform general-purpose parallel compute operations. For example, in at least one embodiment, processing array 2112 can include logic to execute processing tasks including filtering of video and/or audio data, performing modeling operations, including physics operations, and performing data transformations.

In at least one embodiment, processing array 2112 is configured to perform parallel graphics processing operations. In at least one embodiment, processing array 2112 can include additional logic to support execution of such graphics processing operations, including, but not limited to texture sampling logic to perform texture operations, as well as tessellation logic and other vertex processing logic. In at least one embodiment, processing array 2112 can be configured to execute graphics processing related shader programs such as, but not limited to vertex shaders, tessellation shaders, geometry shaders, and pixel shaders. In at least one embodiment, parallel processing unit 2102 can transfer data from system memory via I/O unit 2104 for processing. In at least one embodiment, during processing, transferred data can be stored to on-chip memory (e.g., a parallel processor memory 2122) during processing, then written back to system memory.

In at least one embodiment, when parallel processing unit 2102 is used to perform graphics processing, scheduler 2110 can be configured to divide a processing workload into approximately equal sized tasks, to better enable distribution of graphics processing operations to multiple clusters 2114A-2114N of processing array 2112. In at least one embodiment, portions of processing array 2112 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2114A-2114N may be stored in buffers to allow intermediate data to be transmitted between clusters 2114A-2114N for further processing.

In at least one embodiment, processing array 2112 can receive processing tasks to be executed via scheduler 2110, which receives commands defining processing tasks from front end 2108. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2110 may be configured to fetch indices corresponding to tasks or may receive indices from front end 2108. In at least one embodiment, front end 2108 can be configured to ensure processing array 2112 is configured to a valid state before a workload specified by incoming command buffers (e.g., batch-buffers, push buffers, etc.) is initiated.

In at least one embodiment, each of one or more instances of parallel processing unit 2102 can couple with parallel processor memory 2122. In at least one embodiment, parallel processor memory 2122 can be accessed via memory crossbar 2116, which can receive memory requests from processing array 2112 as well as I/O unit 2104. In at least one embodiment, memory crossbar 2116 can access parallel processor memory 2122 via a memory interface 2118. In at least one embodiment, memory interface 2118 can include multiple partition units (e.g., a partition unit 2120A, partition unit 2120B, through partition unit 2120N) that can each couple to a portion (e.g., memory unit) of parallel processor memory 2122. In at least one embodiment, a number of partition units 2120A-2120N is configured to be equal to a number of memory units, such that a first partition unit 2120A has a corresponding first memory unit 2124A, a second partition unit 2120B has a corresponding memory unit 2124B, and an Nth partition unit 2120N has a corresponding Nth memory unit 2124N. In at least one embodiment, a number of partition units 2120A-2120N may not be equal to a number of memory devices.

In at least one embodiment, memory units 2124A-2124N can include various types of memory devices, including DRAM or graphics random access memory, such as SGRAM, including GDDR memory. In at least one embodiment, memory units 2124A-2124N may also include 3D stacked memory, including but not limited to high bandwidth memory ("HBM"). In at least one embodiment, render targets, such as frame buffers or texture maps may be stored across memory units 2124A-2124N, allowing partition units 2120A-2120N to write portions of each render target in parallel to efficiently use available bandwidth of parallel processor memory 2122. In at least one embodiment, a local instance of parallel processor memory 2122 may be excluded in favor of a unified memory design that utilizes system memory in conjunction with local cache memory.

In at least one embodiment, any one of clusters 2114A-2114N of processing array 2112 can process data that will be written to any of memory units 2124A-2124N within parallel processor memory 2122. In at least one embodiment, memory crossbar 2116 can be configured to transfer an output of each cluster 2114A-2114N to any partition unit 2120A-2120N or to another cluster 2114A-2114N, which can perform additional processing operations on an output. In at least one embodiment, each cluster 2114A-2114N can communicate with memory interface 2118 through memory crossbar 2116 to read from or write to various external memory devices. In at least one embodiment, memory crossbar 2116 has a connection to memory interface 2118 to communicate with I/O unit 2104, as well as a connection to a local instance of parallel processor memory 2122, enabling processing units within different clusters 2114A-2114N to communicate with system memory or other memory that is not local to parallel processing unit 2102. In at least one embodiment, memory crossbar 2116 can use virtual channels to separate traffic streams between clusters 2114A-2114N and partition units 2120A-2120N.

In at least one embodiment, multiple instances of parallel processing unit 2102 can be provided on a single add-in card, or multiple add-in cards can be interconnected. In at least one embodiment, different instances of parallel processing unit 2102 can be configured to inter-operate even if different instances have different numbers of processing cores, different amounts of local parallel processor memory, and/or other configuration differences. For example, in at least one embodiment, some instances of parallel processing unit 2102 can include higher precision floating point units relative to other instances. In at least one embodiment, systems incorporating one or more instances of parallel processing unit 2102 or parallel processor 2100 can be implemented in a variety of configurations and form factors, including but not limited to desktop, laptop, or handheld personal computers, servers, workstations, game consoles, and/or embedded systems.

Figure 21B:
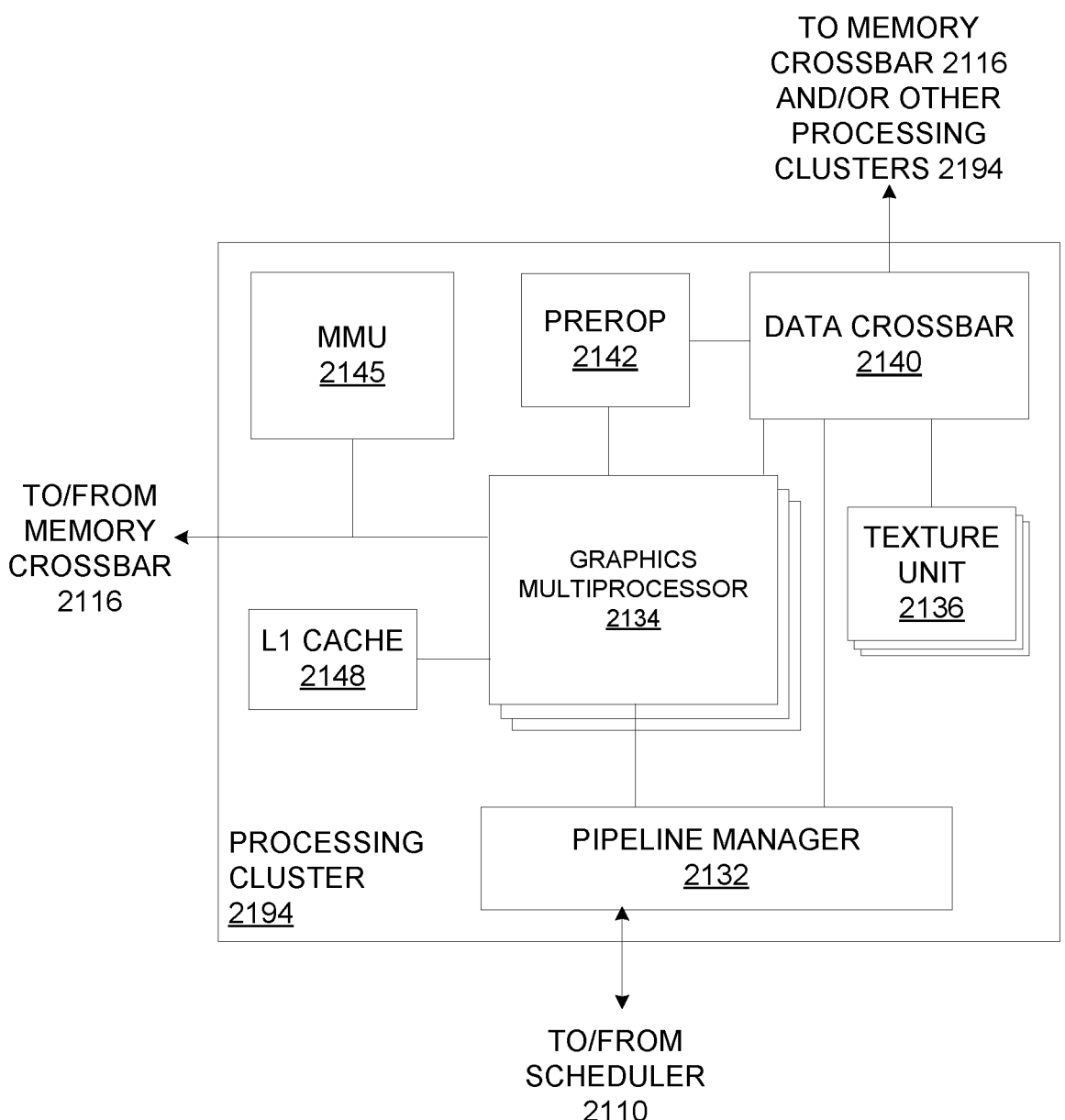
FIG. 21B illustrates a processing cluster, in accordance with at least one embodiment.

FIG. 21B illustrates a processing cluster 2194, in accordance with at least one embodiment. In at least one embodiment, processing cluster 2194 is included within a parallel processing unit. In at least one embodiment, processing cluster 2194 is one of processing clusters 2114A-2114N of FIG. 21. In at least one embodiment, processing cluster 2194 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 2194.

In at least one embodiment, operation of processing cluster 2194 can be controlled via a pipeline manager 2132 that distributes processing tasks to SIMT parallel processors. In at least one embodiment, pipeline manager 2132 receives instructions from scheduler 2110 of FIG. 21 and manages execution of those instructions via a graphics multiprocessor 2134 and/or a texture unit 2136. In at least one embodiment, graphics multiprocessor 2134 is an exemplary instance of a SIMT parallel processor. However, in at least one embodiment, various types of SIMT parallel processors of differing architectures may be included within processing cluster 2194. In at least one embodiment, one or more instances of graphics multiprocessor 2134 can be included within processing cluster 2194. In at least one embodiment, graphics multiprocessor 2134 can process data and a data crossbar 2140 can be used to distribute processed data to one of multiple possible destinations, including other shader units. In at least one embodiment, pipeline manager 2132 can facilitate distribution of processed data by specifying destinations for processed data to be distributed via data crossbar 2140.

In at least one embodiment, each graphics multiprocessor 2134 within processing cluster 2194 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2194 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 2134. In at least one embodiment, a thread group may include fewer threads than a number of processing engines within graphics multiprocessor 2134. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 2134. In at least one embodiment, when a thread group includes more threads than the number of processing engines within graphics multiprocessor 2134, processing can be performed over consecutive clock cycles. In at least one embodiment, multiple thread groups can be executed concurrently on graphics multiprocessor 2134.

In at least one embodiment, graphics multiprocessor 2134 includes an internal cache memory to perform load and store operations. In at least one embodiment, graphics multiprocessor 2134 can forego an internal cache and use a cache memory (e.g., L1 cache 2148) within processing cluster 2194. In at least one embodiment, each graphics multiprocessor 2134 also has access to Level 2 ("L2") caches within partition units (e.g., partition units 2120A-2120N of FIG. 21A) that are shared among all processing clusters 2194 and may be used to transfer data between threads. In at least one embodiment, graphics multiprocessor 2134 may also access off-chip global memory, which can include one or more of local parallel processor memory and/or system memory. In at least one embodiment, any memory external to parallel processing unit 2102 may be used as global memory. In at least one embodiment, processing cluster 2194 includes multiple instances of graphics multiprocessor 2134 that can share common instructions and data, which may be stored in L1 cache 2148.

In at least one embodiment, each processing cluster 2194 may include an MMU 2145 that is configured to map virtual addresses into physical addresses. In at least one embodiment, one or more instances of MMU 2145 may reside within memory interface 2118 of FIG. 21. In at least one embodiment, MMU 2145 includes a set of page table entries ("PTEs") used to map a virtual address to a physical address of a tile and optionally a cache line index. In at least one embodiment, MMU 2145 may include address translation lookaside buffers ("TLBs") or caches that may reside within graphics multiprocessor 2134 or L1 cache 2148 or processing cluster 2194. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 2194 may be configured such that each graphics multiprocessor 2134 is coupled to a texture unit 2136 for performing texture mapping operations, e.g., determining texture sample positions, reading texture data, and filtering texture data. In at least one embodiment, texture data is read from an internal texture L1 cache (not shown) or from an L1 cache within graphics multiprocessor 2134 and is fetched from an L2 cache, local parallel processor memory, or system memory, as needed. In at least one embodiment, each graphics multiprocessor 2134 outputs a processed task to data crossbar 2140 to provide the processed task to another processing cluster 2194 for further processing or to store the processed task in an L2 cache, a local parallel processor memory, or a system memory via memory crossbar 2116. In at least one embodiment, a pre-raster operations unit ("preROP") 2142 is configured to receive data from graphics multiprocessor 2134, direct data to ROP units, which may be located with partition units as described herein (e.g., partition units

2120A-2120N of FIG. 21). In at least one embodiment, PreROP 2142 can perform optimizations for color blending, organize pixel color data, and perform address translations.

Figure 21C:
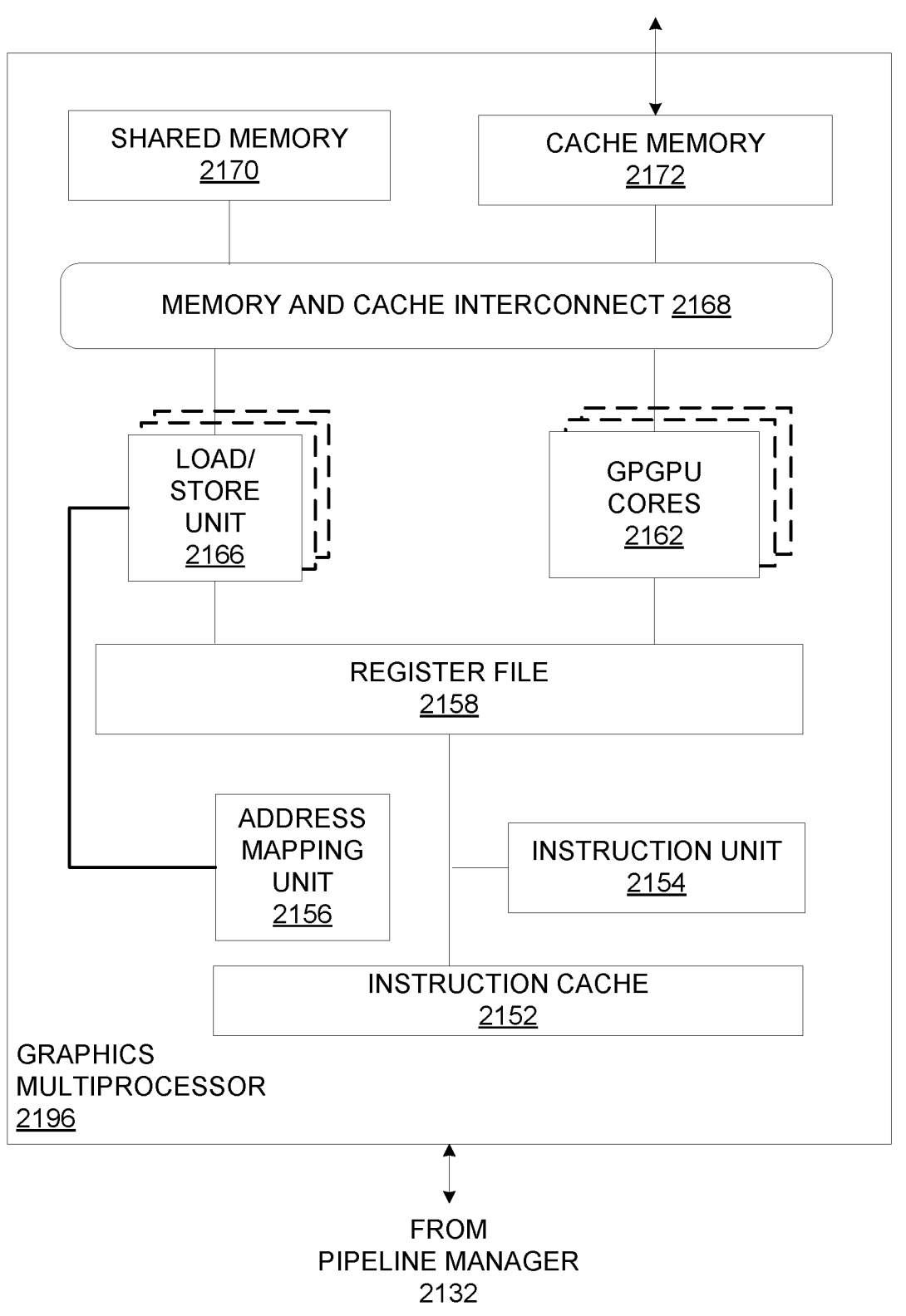
FIG. 21C illustrates a graphics multiprocessor, in accordance with at least one embodiment.

FIG. 21C illustrates a graphics multiprocessor 2196, in accordance with at least one embodiment. In at least one embodiment, graphics multiprocessor 2196 is graphics multiprocessor 2134 of FIG. 21B. In at least one embodiment, graphics multiprocessor 2196 couples with pipeline manager 2132 of processing cluster 2194. In at least one embodiment, graphics multiprocessor 2196 has an execution pipeline including but not limited to an instruction cache 2152, an instruction unit 2154, an address mapping unit 2156, a register file 2158, one or more GPGPU cores 2162, and one or more LSUs 2166. GPGPU cores 2162 and LSUs 2166 are coupled with cache memory 2172 and shared memory 2170 via a memory and cache interconnect 2168.

In at least one embodiment, instruction cache 2152 receives a stream of instructions to execute from pipeline manager 2132. In at least one embodiment, instructions are cached in instruction cache 2152 and dispatched for execution by instruction unit 2154. In at least one embodiment, instruction unit 2154 can dispatch instructions as thread groups (e.g., warps), with each thread of a thread group assigned to a different execution unit within GPGPU core 2162. In at least one embodiment, an instruction can access any of a local, shared, or global address space by specifying an address within a unified address space. In at least one embodiment, address mapping unit 2156 can be used to translate addresses in a unified address space into a distinct memory address that can be accessed by LSUs 2166.

In at least one embodiment, register file 2158 provides a set of registers for functional units of graphics multiprocessor 2196. In at least one embodiment, register file 2158 provides temporary storage for operands connected to data paths of functional units (e.g., GPGPU cores 2162, LSUs 2166) of graphics multiprocessor 2196. In at least one embodiment, register file 2158 is divided between each of functional units such that each functional unit is allocated a dedicated portion of register file 2158. In at least one embodiment, register file 2158 is divided between different thread groups being executed by graphics multiprocessor 2196.

In at least one embodiment, GPGPU cores 2162 can each include FPUs and/or integer ALUs that are used to execute instructions of graphics multiprocessor 2196. GPGPU cores 2162 can be similar in architecture or can differ in architecture. In at least one embodiment, a first portion of GPGPU cores 2162 include a single precision FPU and an integer ALU while a second portion of GPGPU cores 2162 include a double precision FPU. In at least one embodiment, FPUs can implement IEEE 754-2008 standard for floating point arithmetic or enable variable precision floating point arithmetic. In at least one embodiment, graphics multiprocessor 2196 can additionally include one or more fixed function or special function units to perform specific functions such as copy rectangle or pixel blending operations. In at least one embodiment one or more of GPGPU cores 2162 can also include fixed or special function logic.

In at least one embodiment, GPGPU cores 2162 include SIMD logic capable of performing a single instruction on multiple sets of data. In at least one embodiment GPGPU cores 2162 can physically execute SIMD4, SIMD8, and SIMD16 instructions and logically execute SIMD1, SIMD2, and SIMD32 instructions. In at least one embodiment, SIMD instructions for GPGPU cores 2162 can be generated at compile time by a shader compiler or automatically generated when executing programs written and compiled for single program multiple data ("SPMD") or SIMT architectures. In at least one embodiment, multiple threads of a program configured for an SIMT execution model can be executed via a single SIMD instruction. For example, in at least one embodiment, eight SIMT threads that perform the same or similar operations can be executed in parallel via a single SIMD8 logic unit.

In at least one embodiment, memory and cache interconnect 2168 is an interconnect network that connects each functional unit of graphics multiprocessor 2196 to register file 2158 and to shared memory 2170. In at least one embodiment, memory and cache interconnect 2168 is a crossbar interconnect that allows LSU 2166 to implement load and store operations between shared memory 2170 and register file 2158. In at least one embodiment, register file 2158 can operate at a same frequency as GPGPU cores 2162, thus data transfer between GPGPU cores 2162 and register file 2158 is very low latency. In at least one embodiment, shared memory 2170 can be used to enable communication between threads that execute on functional units within graphics multiprocessor 2196. In at least one embodiment, cache memory 2172 can be used as a data cache for example, to cache texture data communicated between functional units and texture unit 2136. In at least one embodiment, shared memory 2170 can also be used as a program managed cached. In at least one embodiment, threads executing on GPGPU cores 2162 can programmatically store data within shared memory in addition to automatically cached data that is stored within cache memory 2172.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 22:
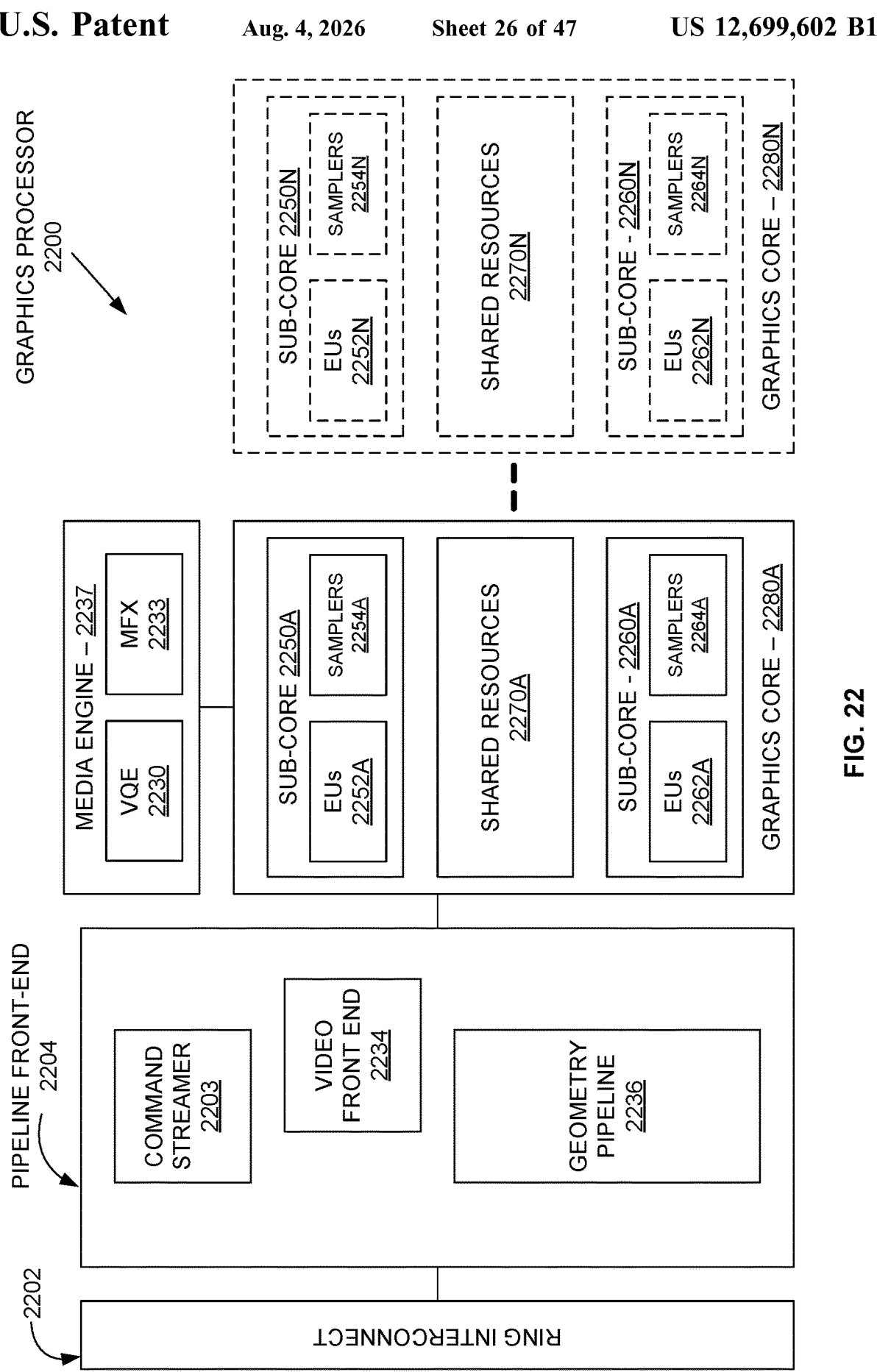
FIG. 22 illustrates a graphics processor, in accordance with at least one embodiment.

FIG. 22 illustrates a graphics processor 2200, in accordance with at least one embodiment. In at least one embodiment, graphics processor 2200 includes a ring interconnect 2202, a pipeline front-end 2204, a media engine 2237, and graphics cores 2280A-2280N. In at least one embodiment, ring interconnect 2202 couples graphics processor 2200 to other processing units, including other graphics processors or one or more general-purpose processor cores. In at least one embodiment, graphics processor 2200 is one of many processors integrated within a multi-core processing system.

In at least one embodiment, graphics processor 2200 receives batches of commands via ring interconnect 2202. In at least one embodiment, incoming commands are interpreted by a command streamer 2203 in pipeline front-end 2204. In at least one embodiment, graphics processor 2200 includes scalable execution logic to perform 3D geometry processing and media processing via graphics core(s) 2280A-2280N. In at least one embodiment, for 3D geometry processing commands, command streamer 2203 supplies commands to geometry pipeline 2236. In at least one embodiment, for at least some media processing commands, command streamer 2203 supplies commands to a video front end 2234, which couples with a media engine 2237. In at least one embodiment, media engine 2237 includes a Video Quality Engine ("VQE") 2230 for video and image post-processing and a multi-format encode/decode ("MFX") engine 2233 to provide hardware-accelerated media data encode and decode. In at least one embodiment, geometry pipeline 2236 and media engine 2237 each generate execution threads for thread execution resources provided by at least one graphics core 2280A.

In at least one embodiment, graphics processor 2200 includes scalable thread execution resources featuring modular graphics cores 2280A-2280N (sometimes referred to as core slices), each having multiple sub-cores 2250A-550N, 2260A-2260N (sometimes referred to as core sub-slices). In at least one embodiment, graphics processor 2200 can have any number of graphics cores 2280A through 2280N. In at least one embodiment, graphics processor 2200 includes a graphics core 2280A having at least a first sub-core 2250A and a second sub-core 2260A. In at least one embodiment, graphics processor 2200 is a low power processor with a single sub-core (e.g., sub-core 2250A). In at least one embodiment, graphics processor 2200 includes multiple graphics cores 2280A-2280N, each including a set of first sub-cores 2250A-2250N and a set of second sub-cores 2260A-2260N. In at least one embodiment, each sub-core in first sub-cores 2250A-2250N includes at least a first set of execution units ("EUs") 2252A-2252N and media/texture samplers 2254A-2254N. In at least one embodiment, each sub-core in second sub-cores 2260A-2260N includes at least a second set of execution units 2262A-2262N and samplers 2264A-2264N. In at least one embodiment, each sub-core 2250A-2250N, 2260A-2260N shares a set of shared resources 2270A-2270N. In at least one embodiment, shared resources 2270 include shared cache memory and pixel operation logic.

Figure 23:
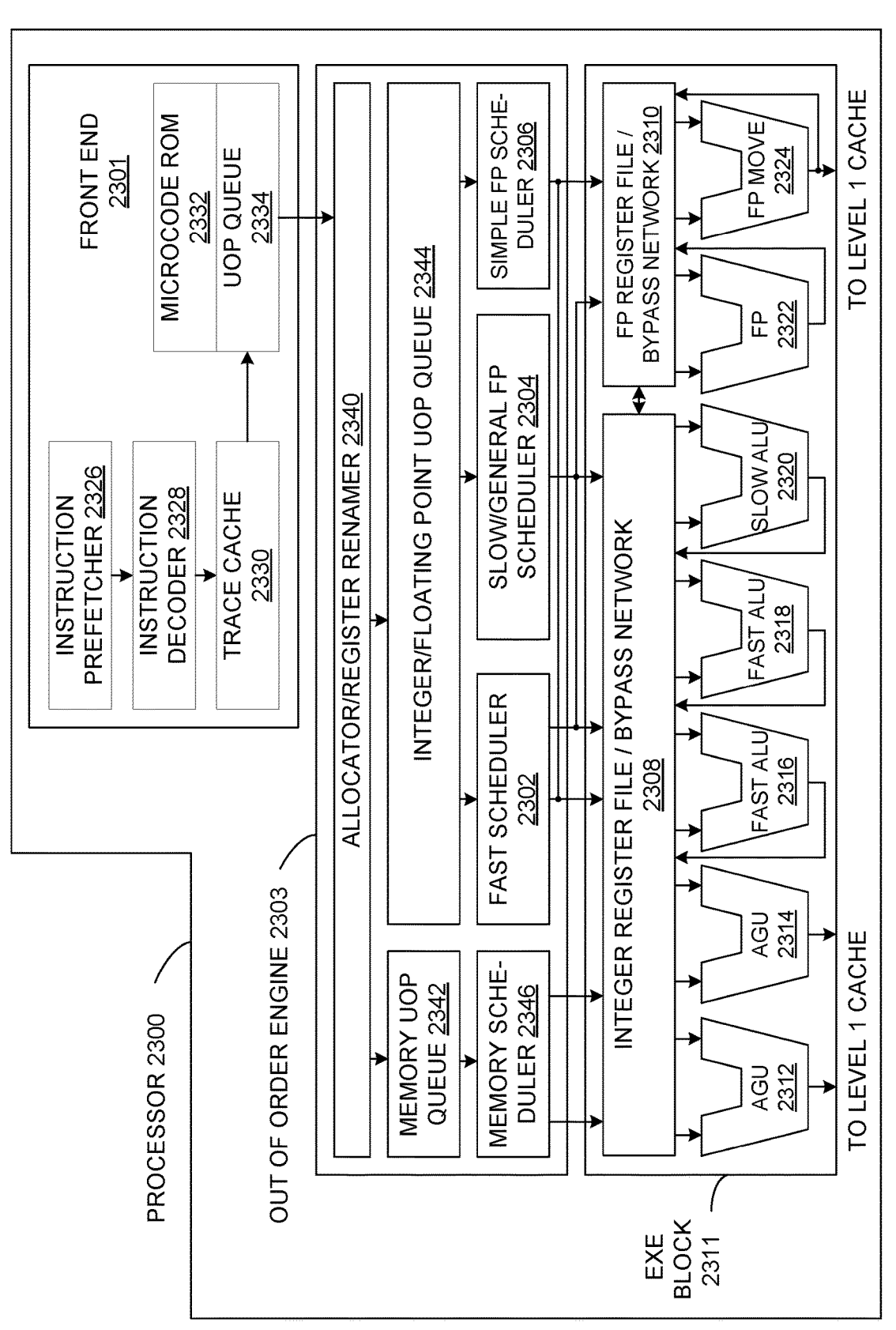
FIG. 23 illustrates a processor, in accordance with at least one embodiment.

FIG. 23 illustrates a processor 2300, in accordance with at least one embodiment. In at least one embodiment, processor 2300 may include, without limitation, logic circuits to perform instructions. In at least one embodiment, processor 2300 may perform instructions, including x86 instructions, ARM instructions, specialized instructions for ASICs, etc. In at least one embodiment, processor 2310 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2310 may perform instructions to accelerate CUDA programs.

In at least one embodiment, processor 2300 includes an in-order front end ("front end") 2301 to fetch instructions to be executed and prepare instructions to be used later in processor pipeline. In at least one embodiment, front end 2301 may include several units. In at least one embodiment, an instruction prefetcher 2326 fetches instructions from memory and feeds instructions to an instruction decoder 2328 which in turn decodes or interprets instructions.

For example, in at least one embodiment, instruction decoder 2328 decodes a received instruction into one or more operations called "micro-instructions" or "micro-operations" (also called "micro ops" or "uops") for execution. In at least one embodiment, instruction decoder 2328 parses instruction into an opcode and corresponding data and control fields that may be used by micro-architecture to perform operations. In at least one embodiment, a trace cache 2330 may assemble decoded uops into program ordered sequences or traces in a uop queue 2334 for execution. In at least one embodiment, when trace cache 2330 encounters a complex instruction, a microcode ROM 2332 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 2328 may access microcode ROM 2332 to perform instruction. In at least one embodiment, an instruction may be decoded into a small number of micro-ops for processing at instruction decoder 2328. In at least one embodiment, an instruction may be stored within microcode ROM 2332 should a number of micro-ops be needed to accomplish operation. In at least one embodiment, trace cache 2330 refers to an entry point programmable logic array ("PLA") to determine a correct micro-instruction pointer for reading microcode sequences to complete one or more instructions from microcode ROM 2332. In at least one embodiment, after microcode ROM 2332 finishes sequencing micro-ops for an instruction, front end 2301 of machine may resume fetching micro-ops from trace cache 2330.

In at least one embodiment, out-of-order execution engine ("out of order engine") 2303 may prepare instructions for execution. In at least one embodiment, out-of-order execution logic has a number of buffers to smooth out and re-order the flow of instructions to optimize performance as they go down a pipeline and get scheduled for execution. Out-of-order execution engine 2303 includes, without limitation, an allocator/register renamer 2340, a memory uop queue 2342, an integer/floating point uop queue 2344, a memory scheduler 2346, a fast scheduler 2302, a slow/general floating point scheduler ("slow/general FP scheduler") 2304, and a simple floating point scheduler ("simple FP scheduler") 2306. In at least one embodiment, fast schedule 2302, slow/general floating point scheduler 2304, and simple floating point scheduler 2306 are also collectively referred to herein as "uop schedulers 2302, 2304, 2306." Allocator/register renamer 2340 allocates machine buffers and resources that each uop needs in order to execute. In at least one embodiment, allocator/register renamer 2340 renames logic registers onto entries in a register file. In at least one embodiment, allocator/register renamer 2340 also allocates an entry for each uop in one of two uop queues, memory uop queue 2342 for memory operations and integer/floating point uop queue 2344 for non-memory operations, in front of memory scheduler 2346 and uop schedulers 2302, 2304, 2306. In at least one embodiment, uop schedulers 2302, 2304, 2306, determine when a uop is ready to execute based on readiness of their dependent input register operand sources and availability of execution resources uops need to complete their operation. In at least one embodiment, fast scheduler 2302 of at least one embodiment may schedule on each half of main clock cycle while slow/general floating point scheduler 2304 and simple floating point scheduler 2306 may schedule once per main processor clock cycle. In at least one embodiment, uop schedulers 2302, 2304, 2306 arbitrate for dispatch ports to schedule uops for execution.

In at least one embodiment, execution block 2311 includes, without limitation, an integer register file/bypass network 2308, a floating point register file/bypass network ("FP register file/bypass network") 2310, address generation units ("AGUs") 2312 and 2314, fast ALUs 2316 and 2318, a slow ALU 2320, a floating point ALU ("FP") 2322, and a floating point move unit ("FP move") 2324. In at least one embodiment, integer register file/bypass network 2308 and floating point register file/bypass network 2310 are also referred to herein as "register files 2308, 2310." In at least one embodiment, AGUSs 2312 and 2314, fast ALUs 2316 and 2318, slow ALU 2320, floating point ALU 2322, and floating point move unit 2324 are also referred to herein as "execution units 2312, 2314, 2316, 2318, 2320, 2322, and 2324." In at least one embodiment, an execution block may include, without limitation, any number (including zero) and type of register files, bypass networks, address generation units, and execution units, in any combination.

In at least one embodiment, register files 2308, 2310 may be arranged between uop schedulers 2302, 2304, 2306, and execution units 2312, 2314, 2316, 2318, 2320, 2322, and 2324. In at least one embodiment, integer register file/bypass network 2308 performs integer operations. In at least one embodiment, floating point register file/bypass network 2310 performs floating point operations. In at least one embodiment, each of register files 2308, 2310 may include, without limitation, a bypass network that may bypass or forward just completed results that have not yet been written into register file to new dependent uops. In at least one embodiment, register files 2308, 2310 may communicate data with each other. In at least one embodiment, integer register file/bypass network 2308 may include, without limitation, two separate register files, one register file for low-order thirty-two bits of data and a second register file for high order thirty-two bits of data. In at least one embodiment, floating point register file/bypass network 2310 may include, without limitation, 128-bit wide entries because floating point instructions typically have operands from 64 to 128 bits in width.

In at least one embodiment, execution units 2312, 2314, 2316, 2318, 2320, 2322, 2324 may execute instructions. In at least one embodiment, register files 2308, 2310 store integer and floating point data operand values that micro-instructions need to execute. In at least one embodiment, processor 2300 may include, without limitation, any number and combination of execution units 2312, 2314, 2316, 2318, 2320, 2322, 2324. In at least one embodiment, floating point ALU 2322 and floating point move unit 2324 may execute floating point, MMX, SIMD, AVX and SSE, or other operations. In at least one embodiment, floating point ALU 2322 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2316, 2318. In at least one embodiment, fast ALUS 2316, 2318 may execute fast operations with an effective latency of half a clock cycle. In at least one embodiment, most complex integer operations go to slow ALU 2320 as slow ALU 2320 may include, without limitation, integer execution hardware for long-latency type of operations, such as a multiplier, shifts, flag logic, and branch processing. In at least one embodiment, memory load/store operations may be executed by AGUs 2312, 2314. In at least one embodiment, fast ALU 2316, fast ALU 2318, and slow ALU 2320 may perform integer operations on 64-bit data operands. In at least one embodiment, fast ALU 2316, fast ALU 2318, and slow ALU 2320 may be implemented to support a variety of data bit sizes including sixteen, thirty-two, 128, 256, etc. In at least one embodiment, floating point ALU 2322 and floating point move unit 2324 may be implemented to support a range of operands having bits of various widths. In at least one embodiment, floating point ALU 2322 and floating point move unit 2324 may operate on 128-bit wide packed data operands in conjunction with SIMD and multimedia instructions.

In at least one embodiment, uop schedulers 2302, 2304, 2306 dispatch dependent operations before parent load has finished executing. In at least one embodiment, as uops may be speculatively scheduled and executed in processor 2300, processor 2300 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 24:
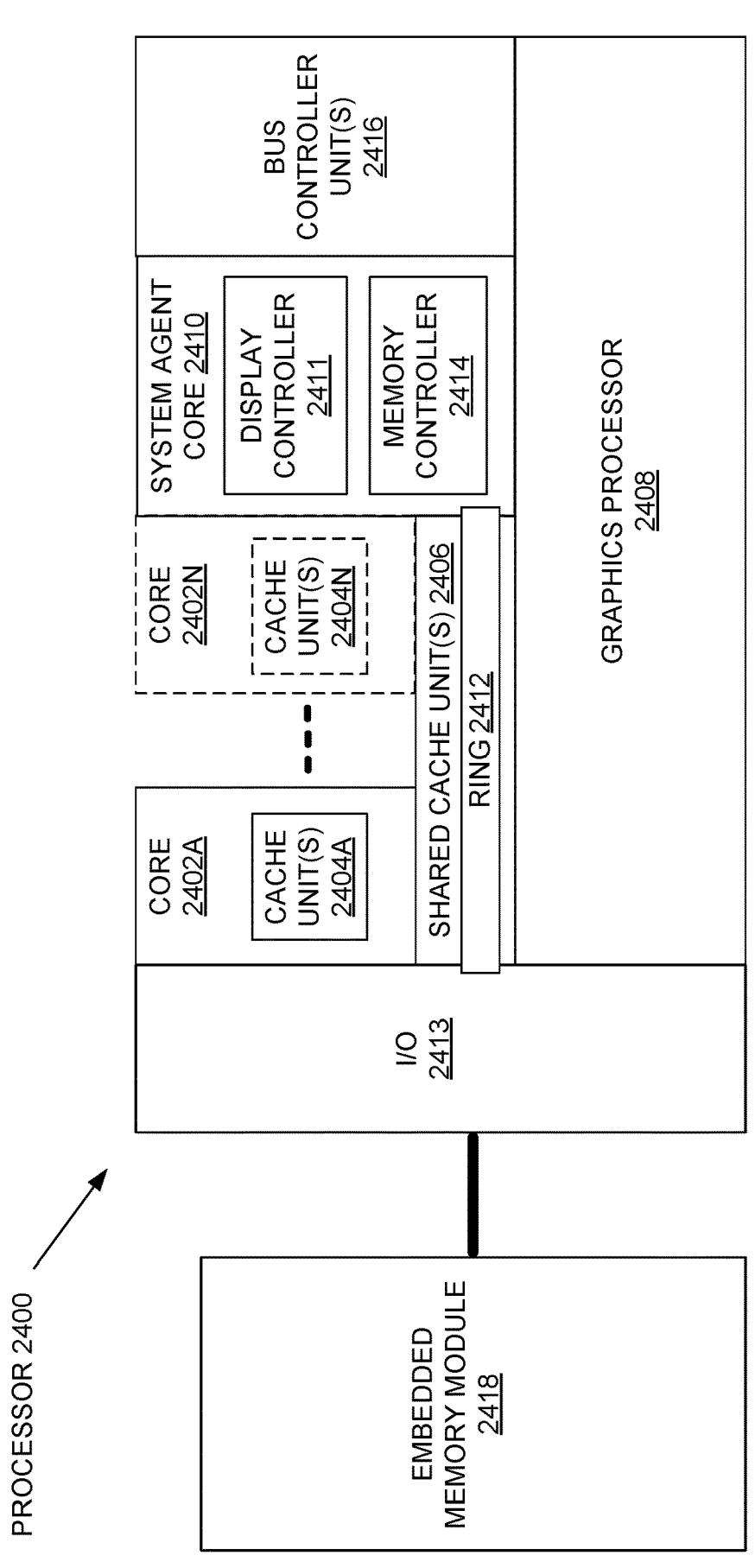
FIG. 24 illustrates a processor, in accordance with at least one embodiment.

FIG. 24 illustrates a processor 2400, in accordance with at least one embodiment. In at least one embodiment, processor 2400 includes, without limitation, one or more processor cores ("cores") 2402A-2402N, an integrated memory controller 2414, and an integrated graphics processor 2408. In at least one embodiment, processor 2400 can include additional cores up to and including additional processor core 2402N represented by dashed lined boxes. In at least one embodiment, each of processor cores 2402A-2402N includes one or more internal cache units 2404A-2404N. In at least one embodiment, each processor core also has access to one or more shared cached units 2406.

In at least one embodiment, internal cache units 2404A-2404N and shared cache units 2406 represent a cache memory hierarchy within processor 2400. In at least one embodiment, cache memory units 2404A-2404N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 2406 and 2404A-2404N.

In at least one embodiment, processor 2400 may also include a set of one or more bus controller units 2416 and a system agent core 2410. In at least one embodiment, one or more bus controller units 2416 manage a set of peripheral buses, such as one or more PCI or PCI express buses. In at least one embodiment, system agent core 2410 provides management functionality for various processor components. In at least one embodiment, system agent core 2410 includes one or more integrated memory controllers 2414 to manage access to various external memory devices (not shown).

In at least one embodiment, one or more of processor cores 2402A-2402N include support for simultaneous multi-threading. In at least one embodiment, system agent core 2410 includes components for coordinating and operating processor cores 2402A-2402N during multi-threaded processing. In at least one embodiment, system agent core 2410 may additionally include a power control unit ("PCU"), which includes logic and components to regulate one or more power states of processor cores 2402A-2402N and graphics processor 2408.

In at least one embodiment, processor 2400 additionally includes graphics processor 2408 to execute graphics processing operations. In at least one embodiment, graphics processor 2408 couples with shared cache units 2406, and system agent core 2410, including one or more integrated memory controllers 2414. In at least one embodiment, system agent core 2410 also includes a display controller 2411 to drive graphics processor output to one or more coupled displays. In at least one embodiment, display controller 2411 may also be a separate module coupled with graphics processor 2408 via at least one interconnect, or may be integrated within graphics processor 2408.

In at least one embodiment, a ring based interconnect unit 2412 is used to couple internal components of processor 2400. In at least one embodiment, an alternative interconnect unit may be used, such as a point-to-point interconnect, a switched interconnect, or other techniques. In at least one embodiment, graphics processor 2408 couples with ring interconnect 2412 via an I/O link 2413.

In at least one embodiment, I/O link 2413 represents at least one of multiple varieties of I/O interconnects, including an on package I/O interconnect which facilitates communication between various processor components and a high-performance embedded memory module 2418, such as an eDRAM module. In at least one embodiment, each of processor cores 2402A-2402N and graphics processor 2408 use embedded memory modules 2418 as a shared LLC.

In at least one embodiment, processor cores 2402A-2402N are homogeneous cores executing a common instruction set architecture. In at least one embodiment, processor cores 2402A-2402N are heterogeneous in terms of ISA, where one or more of processor cores 2402A-2402N execute a common instruction set, while one or more other cores of processor cores 2402A-24-02N executes a subset of a common instruction set or a different instruction set. In at least one embodiment, processor cores 2402A-2402N are heterogeneous in terms of microarchitecture, where one or more cores having a relatively higher power consumption couple with one or more cores having a lower power consumption. In at least one embodiment, processor 2400 can be implemented on one or more chips or as an SoC integrated circuit.

Figure 25:
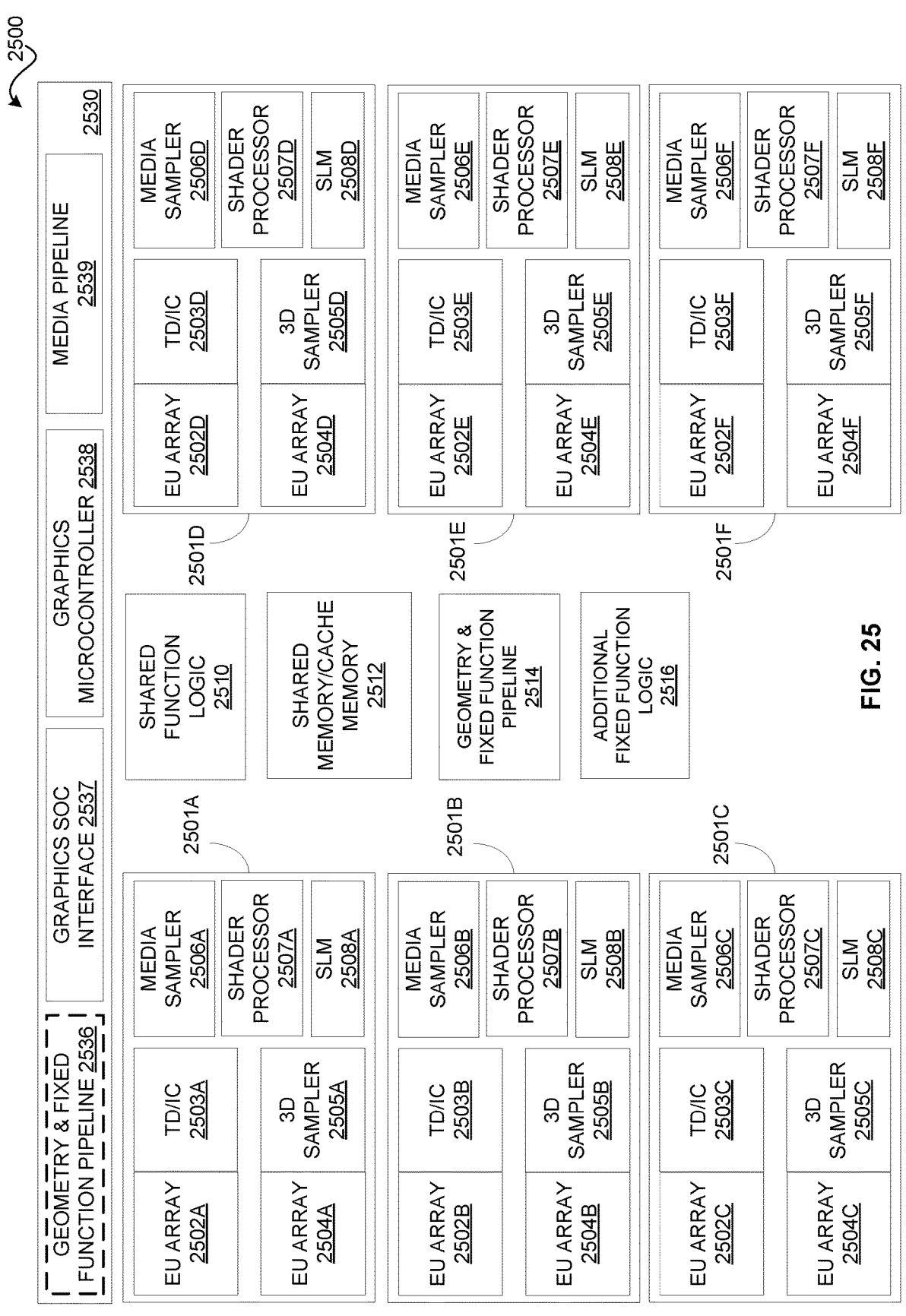
FIG. 25 illustrates a graphics processor core, in accordance with at least one embodiment.

FIG. 25 illustrates a graphics processor core 2500, in accordance with at least one embodiment described. In at least one embodiment, graphics processor core 2500 is included within a graphics core array. In at least one embodiment, graphics processor core 2500, sometimes referred to as a core slice, can be one or multiple graphics cores within a modular graphics processor. In at least one embodiment, graphics processor core 2500 is exemplary of one graphics core slice, and a graphics processor as described herein may include multiple graphics core slices based on target power and performance envelopes. In at least one embodiment, each graphics core 2500 can include a fixed function block 2530 coupled with multiple sub-cores 2501A-2501F, also referred to as sub-slices, that include modular blocks of general-purpose and fixed function logic.

In at least one embodiment, fixed function block 2530 includes a geometry/fixed function pipeline 2536 that can be shared by all sub-cores in graphics processor 2500, for example, in lower performance and/or lower power graphics processor implementations. In at least one embodiment, geometry/fixed function pipeline 2536 includes a 3D fixed function pipeline, a video front-end unit, a thread spawner and thread dispatcher, and a unified return buffer manager, which manages unified return buffers.

In at least one embodiment, fixed function block 2530 also includes a graphics SoC interface 2537, a graphics microcontroller 2538, and a media pipeline 2539. Graphics SoC interface 2537 provides an interface between graphics core 2500 and other processor cores within an SoC integrated circuit. In at least one embodiment, graphics microcontroller 2538 is a programmable sub-processor that is configurable to manage various functions of graphics processor 2500, including thread dispatch, scheduling, and pre-emption. In at least one embodiment, media pipeline 2539 includes logic to facilitate decoding, encoding, pre-processing, and/or post-processing of multimedia data, including image and video data. In at least one embodiment, media pipeline 2539 implements media operations via requests to compute or sampling logic within sub-cores 2501-2501F.

In at least one embodiment, SoC interface 2537 enables graphics core 2500 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 2537 can also enable communication with fixed function devices within an SoC, such as camera imaging pipelines, and enables use of and/or implements global memory atomics that may be shared between graphics core 2500 and CPUs within an SoC. In at least one embodiment, SoC interface 2537 can also implement power management controls for graphics core 2500 and enable an interface between a clock domain of graphic core 2500 and other clock domains within an SoC. In at least one embodiment, SoC interface 2537 enables receipt of command buffers from a command streamer and global thread dispatcher that are configured to provide commands and instructions to each of one or more graphics cores within a graphics processor. In at least one embodiment, commands and instructions can be dispatched to media pipeline 2539, when media operations are to be performed, or a geometry and fixed function pipeline (e.g., geometry and fixed function pipeline 2536, geometry and fixed function pipeline 2514) when graphics processing operations are to be performed.

In at least one embodiment, graphics microcontroller 2538 can be configured to perform various scheduling and management tasks for graphics core 2500. In at least one embodiment, graphics microcontroller 2538 can perform graphics and/or compute workload scheduling on various graphics parallel engines within execution unit (EU) arrays 2502A-2502F, 2504A-2504F within sub-cores 2501A-2501F. In at least one embodiment, host software executing on a CPU core of an SoC including graphics core 2500 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 2538 can also facilitate low-power or idle states for graphics core 2500, providing graphics core 2500 with an ability to save and restore registers within graphics core 2500 across low-power state transitions independently from an operating system and/or graphics driver software on a system.

In at least one embodiment, graphics core 2500 may have greater than or fewer than illustrated sub-cores 2501A-2501F, up to N modular sub-cores. For each set of N sub-cores, in at least one embodiment, graphics core 2500 can also include shared function logic 2510, shared and/or cache memory 2512, a geometry/fixed function pipeline 2514, as well as additional fixed function logic 2516 to accelerate various graphics and compute processing operations. In at least one embodiment, shared function logic 2510 can include logic units (e.g., sampler, math, and/or inter-thread communication logic) that can be shared by each N sub-cores within graphics core 2500. Shared and/or cache memory 2512 can be an LLC for N sub-cores 2501A-2501F within graphics core 2500 and can also serve as shared memory that is accessible by multiple sub-cores. In at least one embodiment, geometry/fixed function pipeline 2514 can be included instead of geometry/fixed function pipeline 2536 within fixed function block 2530 and can include same or similar logic units.

In at least one embodiment, graphics core 2500 includes additional fixed function logic 2516 that can include various fixed function acceleration logic for use by graphics core 2500. In at least one embodiment, additional fixed function logic 2516 includes an additional geometry pipeline for use in position only shading. In position-only shading, at least two geometry pipelines exist, whereas in a full geometry pipeline within geometry/fixed function pipeline 2516, 2536, and a cull pipeline, which is an additional geometry pipeline which may be included within additional fixed function logic 2516. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 2516 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 2516 can also include general purpose processing acceleration logic, such as fixed function matrix multiplication logic, for accelerating CUDA programs.

In at least one embodiment, each graphics sub-core 2501A-2501F includes a set of execution resources that may be used to perform graphics, media, and compute operations in response to requests by graphics pipeline, media pipeline, or shader programs. In at least one embodiment, graphics sub-cores 2501A-2501F include multiple EU arrays 2502A-2502F, 2504A-2504F, thread dispatch and inter-thread communication ("TD/IC") logic 2503A-2503F, a 3D (e.g., texture) sampler 2505A-2505F, a media sampler 2506A-2506F, a shader processor 2507A-2507F, and shared local memory ("SLM") 2508A-2508F. EU arrays 2502A-2502F, 2504A-2504F each include multiple execution units, which are GPGPUs capable of performing floating-point and integer/fixed-point logic operations in service of a graphics, media, or compute operation, including graphics, media, or compute shader programs. In at least one embodiment, TD/IC logic 2503A-2503F performs local thread dispatch and thread control operations for execution units within a sub-core and facilitate communication between threads executing on execution units of a sub-core. In at least one embodiment, 3D sampler 2505A-2505F can read texture or other 3D graphics related data into memory. In at least one embodiment, 3D sampler can read texture data differently based on a configured sample state and texture format associated with a given texture. In at least one embodiment, media sampler 2506A-2506F can perform similar read operations based on a type and format associated with media data. In at least one embodiment, each graphics sub-core 2501A-2501F can alternately include a unified 3D and media sampler. In at least one embodiment, threads executing on execution units within each of sub-cores 2501A-2501F can make use of shared local memory 2508A-2508F within each sub-core, to enable threads executing within a thread group to execute using a common pool of on-chip memory.

Figure 26:
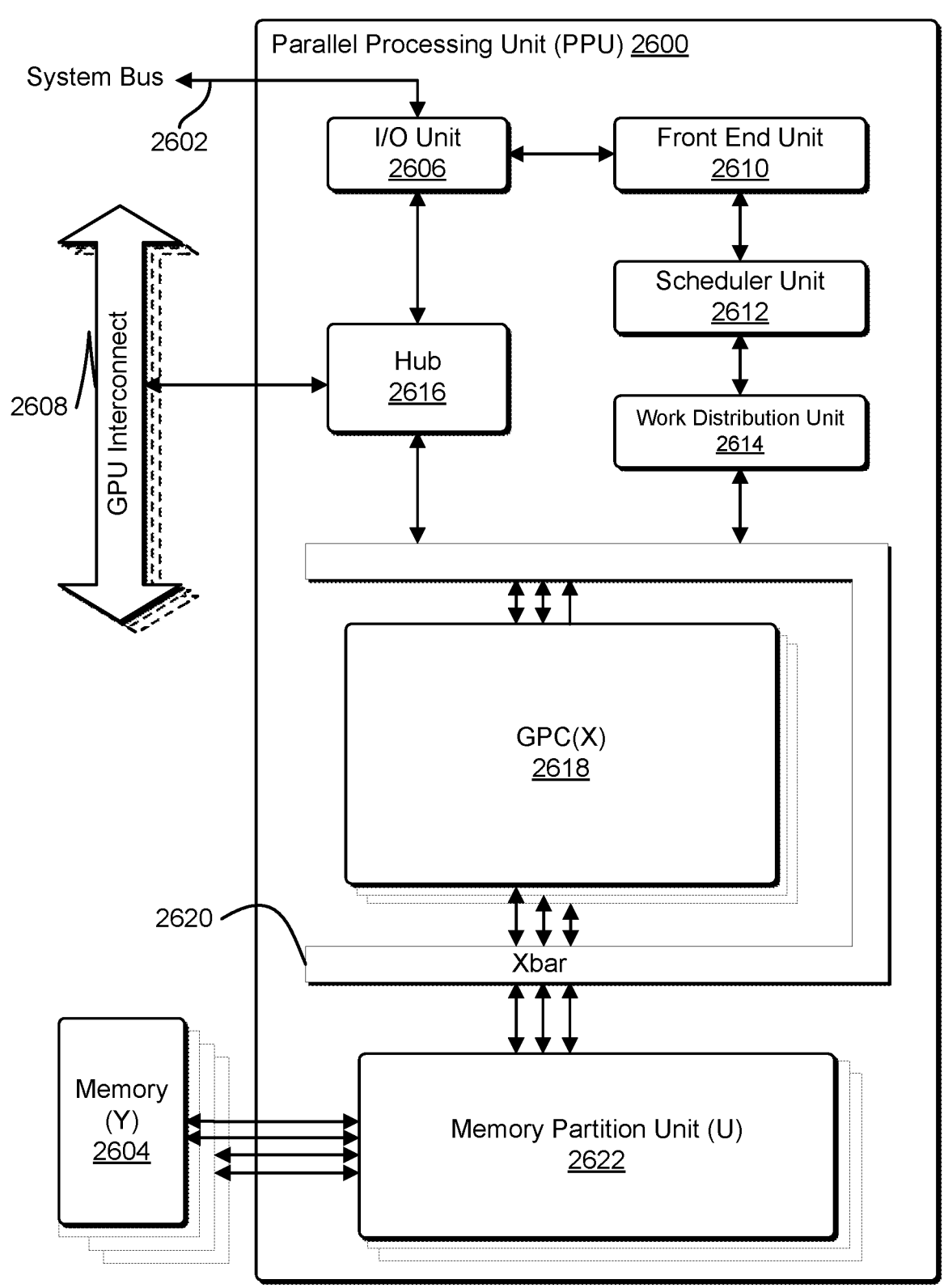
FIG. 26 illustrates a PPU, in accordance with at least one embodiment.

FIG. 26 illustrates a parallel processing unit ("PPU") 2600, in accordance with at least one embodiment. In at least one embodiment, PPU 2600 is configured with machine-readable code that, if executed by PPU 2600, causes PPU 2600 to perform some or all of processes and techniques described herein. In at least one embodiment, PPU 2600 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 2600. In at least one embodiment, PPU 2600 is a GPU configured to implement a graphics rendering pipeline for processing three-dimensional ("3D") graphics data in order to generate two-dimensional ("2D") image data for display on a display device such as an LCD device. In at least one embodiment, PPU 2600 is utilized to perform computations such as linear algebra operations and machine-learning operations. FIG. 26 illustrates an example parallel processor for illustrative purposes only and should be construed as a non-limiting example of a processor architecture that may be implemented in at least one embodiment.

In at least one embodiment, one or more PPUs 2600 are configured to accelerate High Performance Computing ("HPC"), data center, and machine learning applications. In at least one embodiment, one or more PPUs 2600 are configured to accelerate CUDA programs. In at least one embodiment, PPU 2600 includes, without limitation, an I/O unit 2606, a front-end unit 2610, a scheduler unit 2612, a work distribution unit 2614, a hub 2616, a crossbar ("Xbar") 2620, one or more general processing clusters ("GPCs") 2618, and one or more partition units ("memory partition units") 2622. In at least one embodiment, PPU 2600 is connected to a host processor or other PPUs 2600 via one or more high-speed GPU interconnects ("GPU interconnects") 2608. In at least one embodiment, PPU 2600 is connected to a host processor or other peripheral devices via a system bus or interconnect 2602. In at least one embodiment, PPU 2600 is connected to a local memory comprising one or more memory devices ("memory") 2604. In at least one embodiment, memory devices 2604 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 2608 may refer to a wire-based multi-lane communications link that is used by systems to scale and include one or more PPUs 2600 combined with one or more CPUs, supports cache coherence between PPUs 2600 and CPUs, and CPU mastering. In at least one embodiment, data and/or commands are transmitted by high-speed GPU interconnect 2608 through hub 2616 to/from other units of PPU 2600 such as one or more copy engines, video encoders, video decoders, power management units, and other components which may not be explicitly illustrated in FIG. 26.

In at least one embodiment, I/O unit 2606 is configured to transmit and receive communications (e.g., commands, data) from a host processor (not illustrated in FIG. 26) over system bus 2602. In at least one embodiment, I/O unit 2606 communicates with host processor directly via system bus 2602 or through one or more intermediate devices such as a memory bridge. In at least one embodiment, I/O unit 2606 may communicate with one or more other processors, such as one or more of PPUs 2600 via system bus 2602. In at least one embodiment, I/O unit 2606 implements a PCIe interface for communications over a PCIe bus. In at least one embodiment, I/O unit 2606 implements interfaces for communicating with external devices.

In at least one embodiment, I/O unit 2606 decodes packets received via system bus 2602. In at least one embodiment, at least some packets represent commands configured to cause PPU 2600 to perform various operations. In at least one embodiment, I/O unit 2606 transmits decoded commands to various other units of PPU 2600 as specified by commands. In at least one embodiment, commands are transmitted to front-end unit 2610 and/or transmitted to hub 2616 or other units of PPU 2600 such as one or more copy engines, a video encoder, a video decoder, a power management unit, etc. (not explicitly illustrated in FIG. 26). In at least one embodiment, I/O unit 2606 is configured to route communications between and among various logical units of PPU 2600.

In at least one embodiment, a program executed by host processor encodes a command stream in a buffer that provides workloads to PPU 2600 for processing. In at least one embodiment, a workload comprises instructions and data to be processed by those instructions. In at least one embodiment, buffer is a region in a memory that is accessible (e.g., read/write) by both a host processor and PPU 2600—a host interface unit may be configured to access buffer in a system memory connected to system bus 2602 via memory requests transmitted over system bus 2602 by I/O unit 2606. In at least one embodiment, a host processor writes a command stream to a buffer and then transmits a pointer to the start of the command stream to PPU 2600 such that front-end unit 2610 receives pointers to one or more command streams and manages one or more command streams, reading commands from command streams and forwarding commands to various units of PPU 2600.

In at least one embodiment, front-end unit 2610 is coupled to scheduler unit 2612 that configures various GPCs 2618 to process tasks defined by one or more command streams. In at least one embodiment, scheduler unit 2612 is configured to track state information related to various tasks managed by scheduler unit 2612 where state information may indicate which of GPCs 2618 a task is assigned to, whether task is active or inactive, a priority level associated with task, and so forth. In at least one embodiment, scheduler unit 2612 manages execution of a plurality of tasks on one or more of GPCs 2618.

In at least one embodiment, scheduler unit 2612 is coupled to work distribution unit 2614 that is configured to dispatch tasks for execution on GPCs 2618. In at least one embodiment, work distribution unit 2614 tracks a number of scheduled tasks received from scheduler unit 2612 and work distribution unit 2614 manages a pending task pool and an active task pool for each of GPCs 2618. In at least one embodiment, pending task pool comprises a number of slots (e.g., 32 slots) that contain tasks assigned to be processed by a particular GPC 2618; active task pool may comprise a number of slots (e.g., 4 slots) for tasks that are actively being processed by GPCs 2618 such that as one of GPCs 2618 completes execution of a task, that task is evicted from active task pool for GPC 2618 and one of other tasks from pending task pool is selected and scheduled for execution on GPC 2618. In at least one embodiment, if an active task is idle on GPC 2618, such as while waiting for a data dependency to be resolved, then the active task is evicted from GPC 2618 and returned to a pending task pool while another task in the pending task pool is selected and scheduled for execution on GPC 2618.

In at least one embodiment, work distribution unit 2614 communicates with one or more GPCs 2618 via XBar 2620. In at least one embodiment, XBar 2620 is an interconnect network that couples many units of PPU 2600 to other units of PPU 2600 and can be configured to couple work distribution unit 2614 to a particular GPC 2618. In at least one embodiment, one or more other units of PPU 2600 may also be connected to XBar 2620 via hub 2616.

In at least one embodiment, tasks are managed by scheduler unit 2612 and dispatched to one of GPCs 2618 by work distribution unit 2614. GPC 2618 is configured to process task and generate results. In at least one embodiment, results may be consumed by other tasks within GPC 2618, routed to a different GPC 2618 via XBar 2620, or stored in memory 2604. In at least one embodiment, results can be written to memory 2604 via partition units 2622, which implement a memory interface for reading and writing data to/from memory 2604. In at least one embodiment, results can be transmitted to another PPU 2604 or CPU via high-speed GPU interconnect 2608. In at least one embodiment, PPU 2600 includes, without limitation, a number U of partition units 2622 that is equal to number of separate and distinct memory devices 2604 coupled to PPU 2600.

In at least one embodiment, a host processor executes a driver kernel that implements an application programming interface ("API") that enables one or more applications executing on host processor to schedule operations for execution on PPU 2600. In at least one embodiment, multiple compute applications are simultaneously executed by PPU 2600 and PPU 2600 provides isolation, quality of service ("QoS"), and independent address spaces for multiple compute applications. In at least one embodiment, an application generates instructions (e.g., in the form of API calls) that cause a driver kernel to generate one or more tasks for execution by PPU 2600 and the driver kernel outputs tasks to one or more streams being processed by PPU 2600. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

Figure 27:
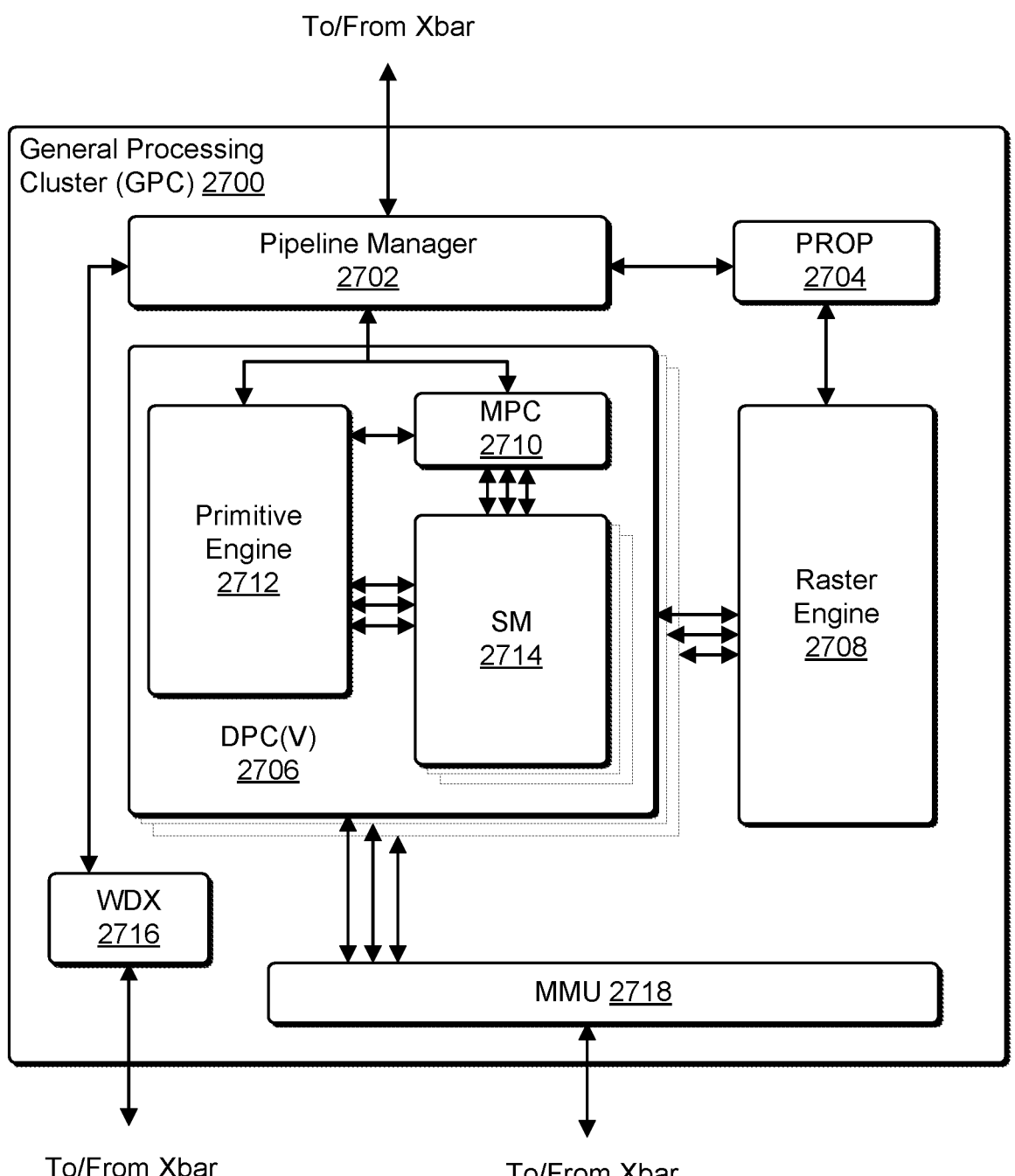
FIG. 27 illustrates a GPC, in accordance with at least one embodiment.

FIG. 27 illustrates a GPC 2700, in accordance with at least one embodiment. In at least one embodiment, GPC 2700 is GPC 2618 of FIG. 26. In at least one embodiment, each GPC 2700 includes, without limitation, a number of hardware units for processing tasks and each GPC 2700 includes, without limitation, a pipeline manager 2702, a pre-raster operations unit ("PROP") 2704, a raster engine 2708, a work distribution crossbar ("WDX") 2716, an MMU 2718, one or more Data Processing Clusters ("DPCs") 2706, and any suitable combination of parts.

In at least one embodiment, operation of GPC 2700 is controlled by pipeline manager 2702. In at least one embodiment, pipeline manager 2702 manages configuration of one or more DPCs 2706 for processing tasks allocated to GPC 2700. In at least one embodiment, pipeline manager 2702 configures at least one of one or more DPCs 2706 to implement at least a portion of a graphics rendering pipeline. In at least one embodiment, DPC 2706 is configured to execute a vertex shader program on a programmable streaming multiprocessor ("SM") 2714. In at least one embodiment, pipeline manager 2702 is configured to route packets received from a work distribution unit to appropriate logical units within GPC 2700 and, in at least one embodiment, some packets may be routed to fixed function hardware units in PROP 2704 and/or raster engine 2708 while other packets may be routed to DPCs 2706 for processing by a primitive engine 2712 or SM 2714. In at least one embodiment, pipeline manager 2702 configures at least one of DPCs 2706 to implement a computing pipeline. In at least one embodiment, pipeline manager 2702 configures at least one of DPCs 2706 to execute at least a portion of a CUDA program.

In at least one embodiment, PROP unit 2704 is configured to route data generated by raster engine 2708 and DPCs 2706 to a Raster Operations ("ROP") unit in a partition unit, such as memory partition unit 2622 described in more detail above in conjunction with FIG. 26. In at least one embodiment, PROP unit 2704 is configured to perform optimizations for color blending, organize pixel data, perform address translations, and more. In at least one embodiment, raster engine 2708 includes, without limitation, a number of fixed function hardware units configured to perform various raster operations and, in at least one embodiment, raster engine 2708 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 2708 comprises fragments to be processed by any suitable entity such as by a fragment shader implemented within DPC 2706.

In at least one embodiment, each DPC 2706 included in GPC 2700 comprise, without limitation, an M-Pipe Controller ("MPC") 2710; primitive engine 2712; one or more SMs 2714; and any suitable combination thereof. In at least one embodiment, MPC 2710 controls operation of DPC 2706, routing packets received from pipeline manager 2702 to appropriate units in DPC 2706. In at least one embodiment, packets associated with a vertex are routed to primitive engine 2712, which is configured to fetch vertex attributes associated with vertex from memory; in contrast, packets associated with a shader program may be transmitted to SM 2714.

In at least one embodiment, SM 2714 comprises, without limitation, a programmable streaming processor that is configured to process tasks represented by a number of threads. In at least one embodiment, SM 2714 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 2714 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 2714 is described in more detail in conjunction with FIG. 28.

In at least one embodiment, MMU 2718 provides an interface between GPC 2700 and a memory partition unit (e.g., partition unit 2622 of FIG. 26) and MMU 2718 provides translation of virtual addresses into physical addresses, memory protection, and arbitration of memory requests. In at least one embodiment, MMU 2718 provides one or more translation lookaside buffers (TLBs) for performing translation of virtual addresses into physical addresses in memory.

Figure 28:
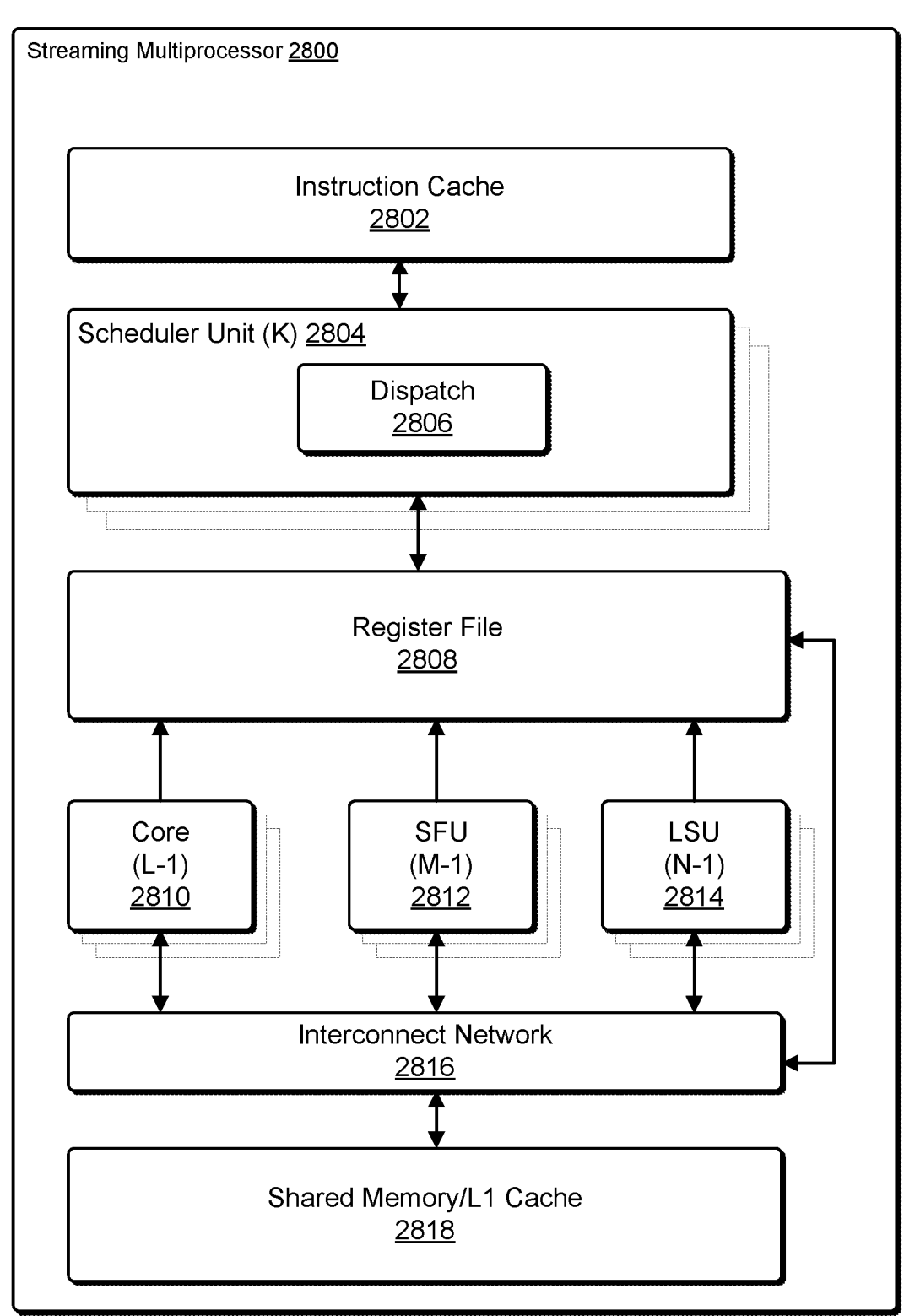
FIG. 28 illustrates a streaming multiprocessor, in accordance with at least one embodiment.

FIG. 28 illustrates a streaming multiprocessor ("SM") 2800, in accordance with at least one embodiment. In at least one embodiment, SM 2800 is SM 2714 of FIG. 27. In at least one embodiment, SM 2800 includes, without limitation, an instruction cache 2802; one or more scheduler units 2804; a register file 2808; one or more processing cores ("cores") 2810; one or more special function units ("SFUs") 2812; one or more LSUs 2814; an interconnect network 2816; a shared memory/L1 cache 2818; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 2800. In at least one embodiment, scheduler unit 2804 receives tasks from a work distribution unit and manages instruction scheduling for one or more thread blocks assigned to SM 2800. In at least one embodiment, scheduler unit 2804 schedules thread blocks for execution as warps of parallel threads, wherein each thread block is allocated at least one warp. In at least one embodiment, each warp executes threads. In at least one embodiment, scheduler unit 2804 manages a plurality of different thread blocks, allocating warps to different thread blocks and then dispatching instructions from a plurality of different cooperative groups to various functional units (e.g., processing cores 2810, SFUs 2812, and LSUs 2814) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 2806 is configured to transmit instructions to one or more of functional units and scheduler unit 2804 includes, without limitation, two dispatch units 2806 that enable two different instructions from same warp to be dispatched during each clock cycle. In at least one embodiment, each scheduler unit 2804 includes a single dispatch unit 2806 or additional dispatch units 2806.

In at least one embodiment, each SM 2800, in at least one embodiment, includes, without limitation, register file 2808 that provides a set of registers for functional units of SM 2800. In at least one embodiment, register file 2808 is divided between each of the functional units such that each functional unit is allocated a dedicated portion of register file 2808. In at least one embodiment, register file 2808 is divided between different warps being executed by SM 2800 and register file 2808 provides temporary storage for operands connected to data paths of functional units. In at least one embodiment, each SM 2800 comprises, without limitation, a plurality of L processing cores 2810. In at least one embodiment, SM 2800 includes, without limitation, a large number (e.g., 128 or more) of distinct processing cores 2810. In at least one embodiment, each processing core 2810 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 2810 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 2810. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point a28ition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 2800 comprises, without limitation, M SFUs 2812 that perform special functions (e.g., attribute evaluation, reciprocal square root, and like). In at least one embodiment, SFUs 2812 include, without limitation, a tree traversal unit configured to traverse a hierarchical tree data structure. In at least one embodiment, SFUs 2812 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 2800. In at least one embodiment, texture maps are stored in shared memory/L1 cache 2818. In at least one embodiment, texture units implement texture operations such as filtering operations using mip-maps (e.g., texture maps of varying levels of detail). In at least one embodiment, each SM 2800 includes, without limitation, two texture units.

In at least one embodiment, each SM 2800 comprises, without limitation, N LSUs 2814 that implement load and store operations between shared memory/L1 cache 2818 and register file 2808. In at least one embodiment, each SM 2800 includes, without limitation, interconnect network 2816 that connects each of the functional units to register file 2808 and LSU 2814 to register file 2808 and shared memory/L1 cache 2818. In at least one embodiment, interconnect network 2816 is a crossbar that can be configured to connect any of the functional units to any of the registers in register file 2808 and connect LSUs 2814 to register file 2808 and memory locations in shared memory/L1 cache 2818.

In at least one embodiment, shared memory/L1 cache 2818 is an array of on-chip memory that allows for data storage and communication between SM 2800 and a primitive engine and between threads in SM 2800. In at least one embodiment, shared memory/L1 cache 2818 comprises, without limitation, 128 KB of storage capacity and is in a path from SM 2800 to a partition unit. In at least one embodiment, shared memory/L1 cache 2818 is used to cache reads and writes. In at least one embodiment, one or more of shared memory/L1 cache 2818, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 2818 enables shared memory/L1 cache 2818 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 2800 to execute a program and perform calculations, shared memory/L1 cache 2818 to communicate between threads, and LSU 2814 to read and write global memory through shared memory/L1 cache 2818 and a memory partition unit. In at least one embodiment, when configured for general purpose parallel computation, SM 2800 writes commands that scheduler unit 2804 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructions for General-Purpose Computing

The following figures set forth, without limitation, exemplary software constructs for implementing at least one embodiment.

In at least one embodiment, techniques described above may be implemented on a computing service as described below such as software stack 2900 or programming platform 3304. In at least one embodiment, an application run in a computer system can be divided into dependent threads which are run in parallel on a plurality of processors. In at least one embodiment, processors may include any processor type described below including GPU 3792. In at least one embodiment, one or more circuits cause two or more dependent threads to be performed in parallel using two or more separate multithreaded processor cores. In at least one embodiment, a processor core can be a core in a multi-core CPU, an SMP core in a GPU, or other circuit capable of executing storable instructions. In at least one embodiment, one or more circuits to cause a first group of threads to be organized in two or more subgroups of threads to be performed in parallel using two or more processor cores. In at least one embodiment, groups of threads can be cooperative group that runs in parallel. In at least one embodiment, a cooperative group includes a plurality of kernel threads arranged in a warp on a GPU. In at least one embodiment, synchronization operations between threads can be enabled through the use of a barrier. In at least one embodiment one or more circuits perform a memory barrier operation to cause accesses to memory by a plurality of groups of threads to occur in an order indicated by the memory barrier operation. In at least one embodiment, a barrier operation can be an atomic operation such as a bitwise logical operation (AND, OR, XOR, for example) or a mathematical operation such as an atomic addition or subtraction.

Figure 29:
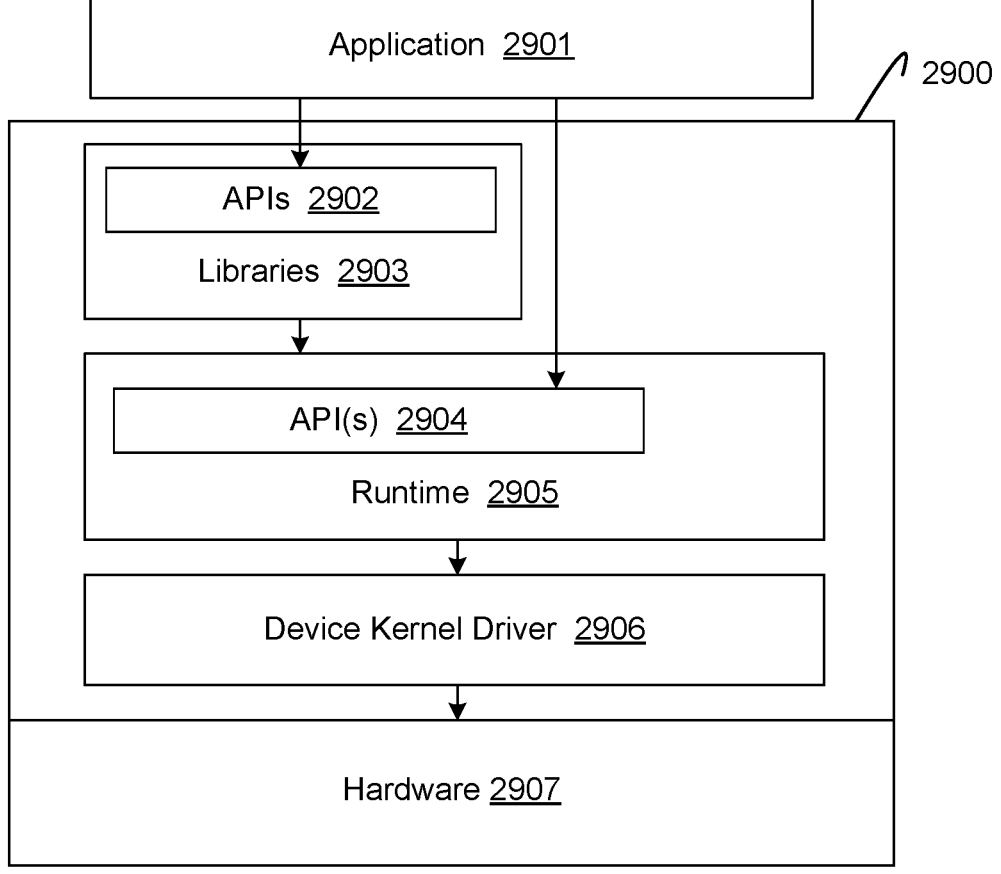
FIG. 29 illustrates a software stack of a programming platform, in accordance with at least one embodiment.

FIG. 29 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 2900 of a programming platform provides an execution environment for an application 2901. In at least one embodiment, application 2901 may include any computer software capable of being launched on software stack 2900. In at least one embodiment, application 2901 may include, but is not limited to, an artificial intelligence ("AI")/machine learning ("ML") application, a high performance computing ("HPC") application, a virtual desktop infrastructure ("VDI"), or a data center workload.

In at least one embodiment, application 2901 and software stack 2900 run on hardware 2907. Hardware 2907 may include one or more GPUs, CPUs, FPGAs, AI engines, and/or other types of compute devices that support a programming platform, in at least one embodiment. In at least one embodiment, such as with CUDA, software stack 2900 may be vendor specific and compatible with only devices from particular vendor(s). In at least one embodiment, such as in with OpenCL, software stack 2900 may be used with devices from different vendors. In at least one embodiment, hardware 2907 includes a host connected to one or more devices that can be accessed to perform computational tasks via application programming interface ("API") calls. A device within hardware 2907 may include, but is not limited to, a GPU, FPGA, AI engine, or other compute device (but may also include a CPU) and its memory, as opposed to a host within hardware 2907 that may include, but is not limited to, a CPU (but may also include a compute device) and its memory, in at least one embodiment.

In at least one embodiment, software stack 2900 of a programming platform includes, without limitation, a number of libraries 2903, a runtime 2905, and a device kernel driver 2906. Each of libraries 2903 may include data and programming code that can be used by computer programs and leveraged during software development, in at least one embodiment. In at least one embodiment, libraries 2903 may include, but are not limited to, pre-written code and subroutines, classes, values, type specifications, configuration data, documentation, help data, and/or message templates. In at least one embodiment, libraries 2903 include functions that are optimized for execution on one or more types of devices. In at least one embodiment, libraries 2903 may include, but are not limited to, functions for performing mathematical, deep learning, and/or other types of operations on devices. In at least one embodiment, libraries 2903 are associated with corresponding APIs 2902, which may include one or more APIs, that expose functions implemented in libraries 2903.

In at least one embodiment, application 2901 is written as source code that is compiled into executable code, as discussed in greater detail below in conjunction with FIGS. 34-36. Executable code of application 2901 may run, at least in part, on an execution environment provided by software stack 2900, in at least one embodiment. In at least one embodiment, during execution of application 2901, code may be reached that needs to run on a device, as opposed to a host. In such a case, runtime 2905 may be called to load and launch requisite code on the device, in at least one embodiment. In at least one embodiment, runtime 2905 may include any technically feasible runtime system that is able to support execution of application S01.

In at least one embodiment, runtime 2905 is implemented as one or more runtime libraries associated with corresponding APIs, which are shown as API(s) 2904. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 2904 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 2906 is configured to facilitate communication with an underlying device. In at least one embodiment, device kernel driver 2906 may provide low-level functionalities upon which APIs, such as API(s) 2904, and/or other software relies. In at least one embodiment, device kernel driver 2906 may be configured to compile intermediate representation ("IR") code into binary code at runtime. For CUDA, device kernel driver 2906 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 2906 to compile IR code at runtime.

Figure 30:
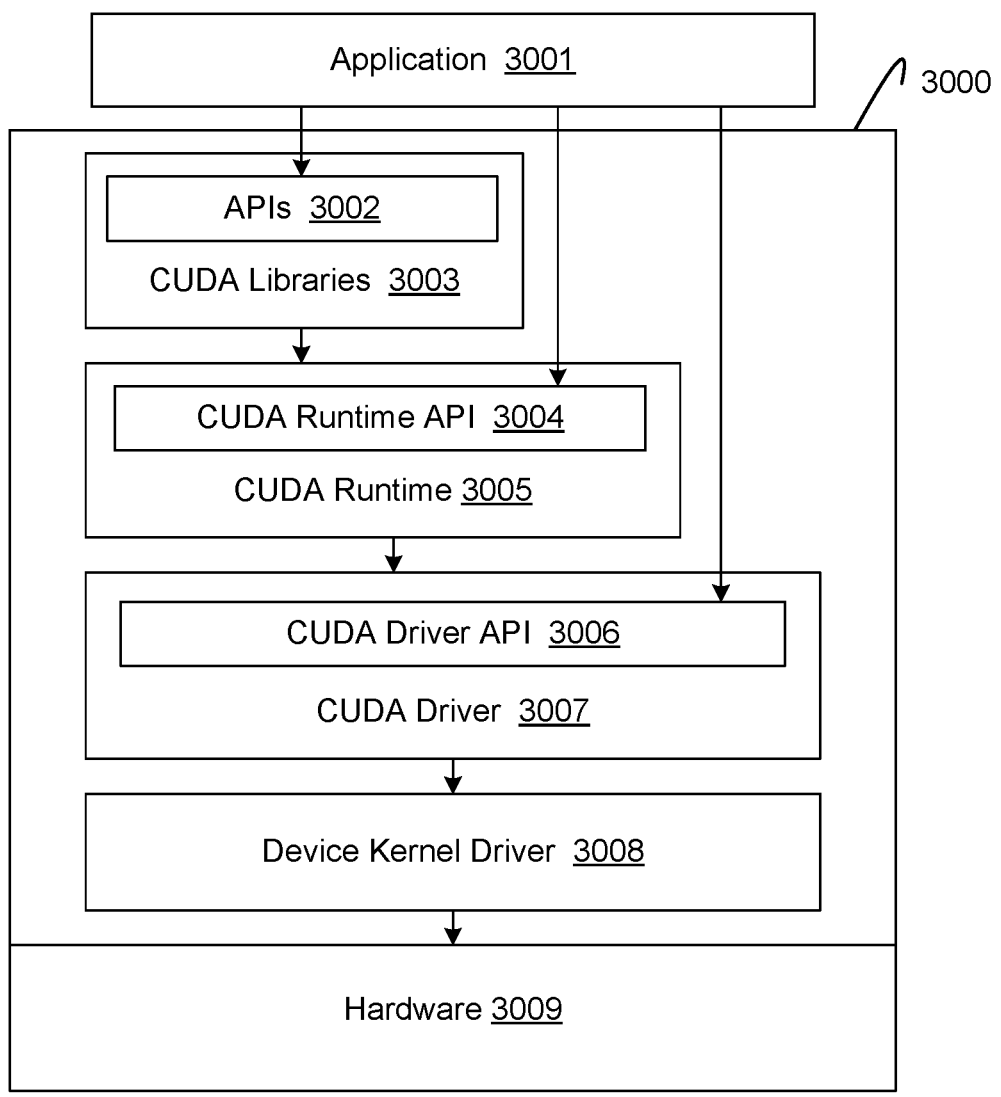
FIG. 30 illustrates a CUDA implementation of a software stack of FIG. 29, in accordance with at least one embodiment.

FIG. 30 illustrates a CUDA implementation of software stack 2900 of FIG. 29, in accordance with at least one embodiment. In at least one embodiment, a CUDA software stack 3000, on which an application 3001 may be launched, includes CUDA libraries 3003, a CUDA runtime 3005, a CUDA driver 3007, and a device kernel driver 3008. In at least one embodiment, CUDA software stack 3000 executes on hardware 3009, which may include a GPU that supports CUDA and is developed by NVIDIA Corporation of Santa Clara, CA.

In at least one embodiment, application 3001, CUDA runtime 3005, and device kernel driver 3008 may perform similar functionalities as application 2901, runtime 2905, and device kernel driver 2906, respectively, which are described above in conjunction with FIG. 29. In at least one embodiment, CUDA driver 3007 includes a library (libcuda.so) that implements a CUDA driver API 3006. Similar to a CUDA runtime API 3004 implemented by a CUDA runtime library (cudart), CUDA driver API 3006 may, without limitation, expose functions for memory management, execution control, device management, error handling, synchronization, and/or graphics interoperability, among other things, in at least one embodiment. In at least one embodiment, CUDA driver API 3006 differs from CUDA runtime API 3004 in that CUDA runtime API 3004 simplifies device code management by providing implicit initialization, context (analogous to a process) management, and module (analogous to dynamically loaded libraries) management. In contrast to high-level CUDA runtime API 3004, CUDA driver API 3006 is a low-level API providing more fine-grained control of the device, particularly with respect to contexts and module loading, in at least one embodiment. In at least one embodiment, CUDA driver API 3006 may expose functions for context management that are not exposed by CUDA runtime API 3004. In at least one embodiment, CUDA driver API 3006 is also language-independent and supports, e.g., OpenCL in addition to CUDA runtime API 3004. Further, in at least one embodiment, development libraries, including CUDA runtime 3005, may be considered as separate from driver components, including user-mode CUDA driver 3007 and kernel-mode device driver 3008 (also sometimes referred to as a "display" driver).

In at least one embodiment, CUDA libraries 3003 may include, but are not limited to, mathematical libraries, deep learning libraries, parallel algorithm libraries, and/or signal/image/video processing libraries, which parallel computing applications such as application 3001 may utilize. In at least one embodiment, CUDA libraries 3003 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 3003 may include deep learning libraries such as a cuDNN library of primitives for deep neural networks and a TensorRT platform for high-performance deep learning inference, among others.

Figure 31:
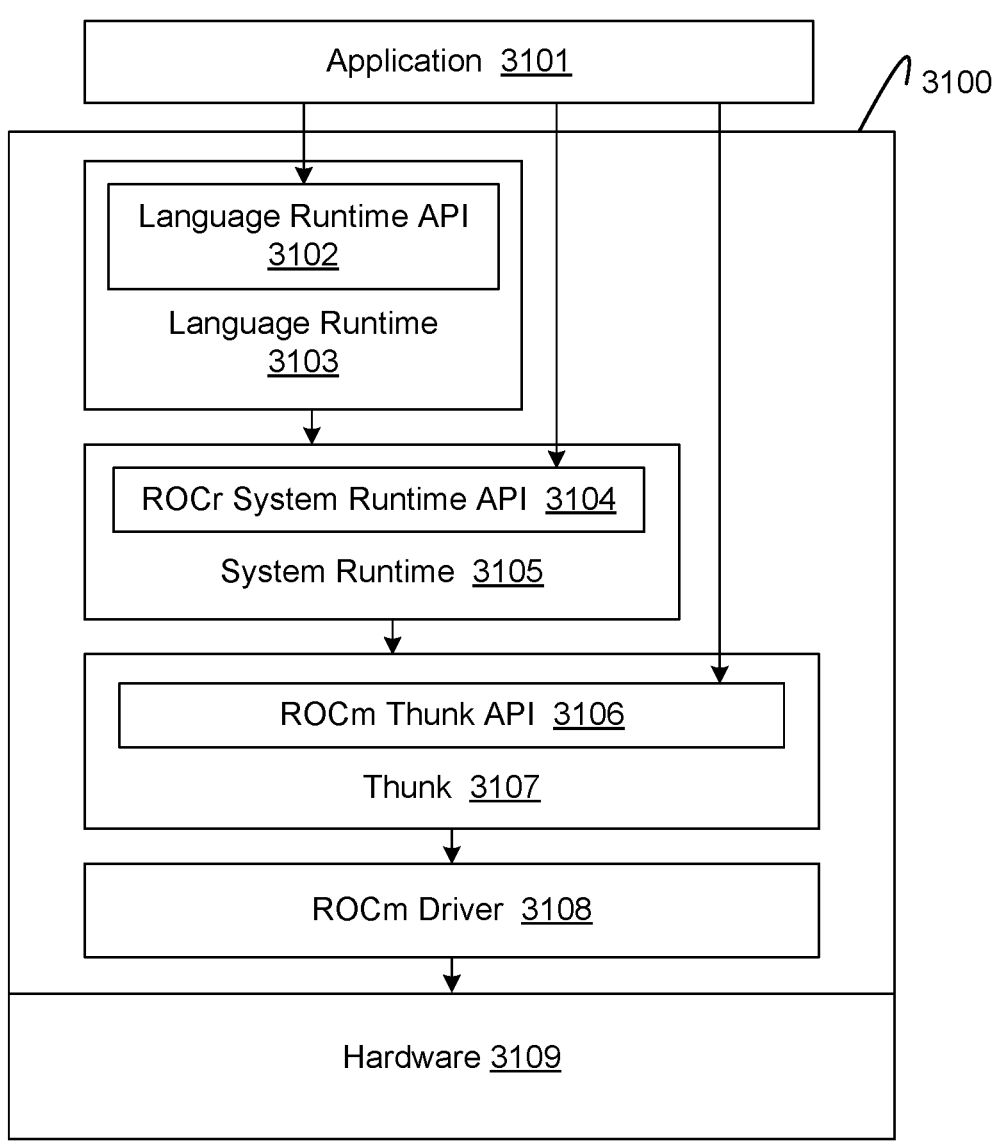
FIG. 31 illustrates a ROCm implementation of a software stack of FIG. 29, in accordance with at least one embodiment.

FIG. 31 illustrates a ROCm implementation of software stack 2900 of FIG. 29, in accordance with at least one embodiment. In at least one embodiment, a ROCm software stack 3100, on which an application 3101 may be launched, includes a language runtime 3103, a system runtime 3105, a thunk 3107, and a ROCm kernel driver 3108. In at least one embodiment, ROCm software stack 3100 executes on hardware 3109, which may include a GPU that supports ROCm and is developed by AMD Corporation of Santa Clara, CA.

In at least one embodiment, application 3101 may perform similar functionalities as application 2901 discussed above in conjunction with FIG. 29. In addition, language runtime 3103 and system runtime 3105 may perform similar functionalities as runtime 2905 discussed above in conjunction with FIG. 29, in at least one embodiment. In at least one embodiment, language runtime 3103 and system runtime 3105 differ in that system runtime 3105 is a language-independent runtime that implements a ROCr system runtime API 3104 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 3105, language runtime 3103 is an implementation of a language-specific runtime API 3102 layered on top of ROCr system runtime API 3104, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 3004 discussed above in conjunction with FIG. 30, such as functions for memory management, execution control, device management, error handling, and synchronization, among other things.

In at least one embodiment, thunk (ROCt) 3107 is an interface 3106 that can be used to interact with underlying ROCm driver 3108. In at least one embodiment, ROCm driver 3108 is a ROCK driver, which is a combination of an AMDGPU driver and a HSA kernel driver (amdkfd). In at least one embodiment, AMDGPU driver is a device kernel driver for GPUs developed by AMD that performs similar functionalities as device kernel driver 2906 discussed above in conjunction with FIG. 29. In at least one embodiment, HSA kernel driver is a driver permitting different types of processors to share system resources more effectively via hardware features.

In at least one embodiment, various libraries (not shown) may be included in ROCm software stack 3100 above language runtime 3103 and provide functionality similarity to CUDA libraries 3003, discussed above in conjunction with FIG. 30. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 32:
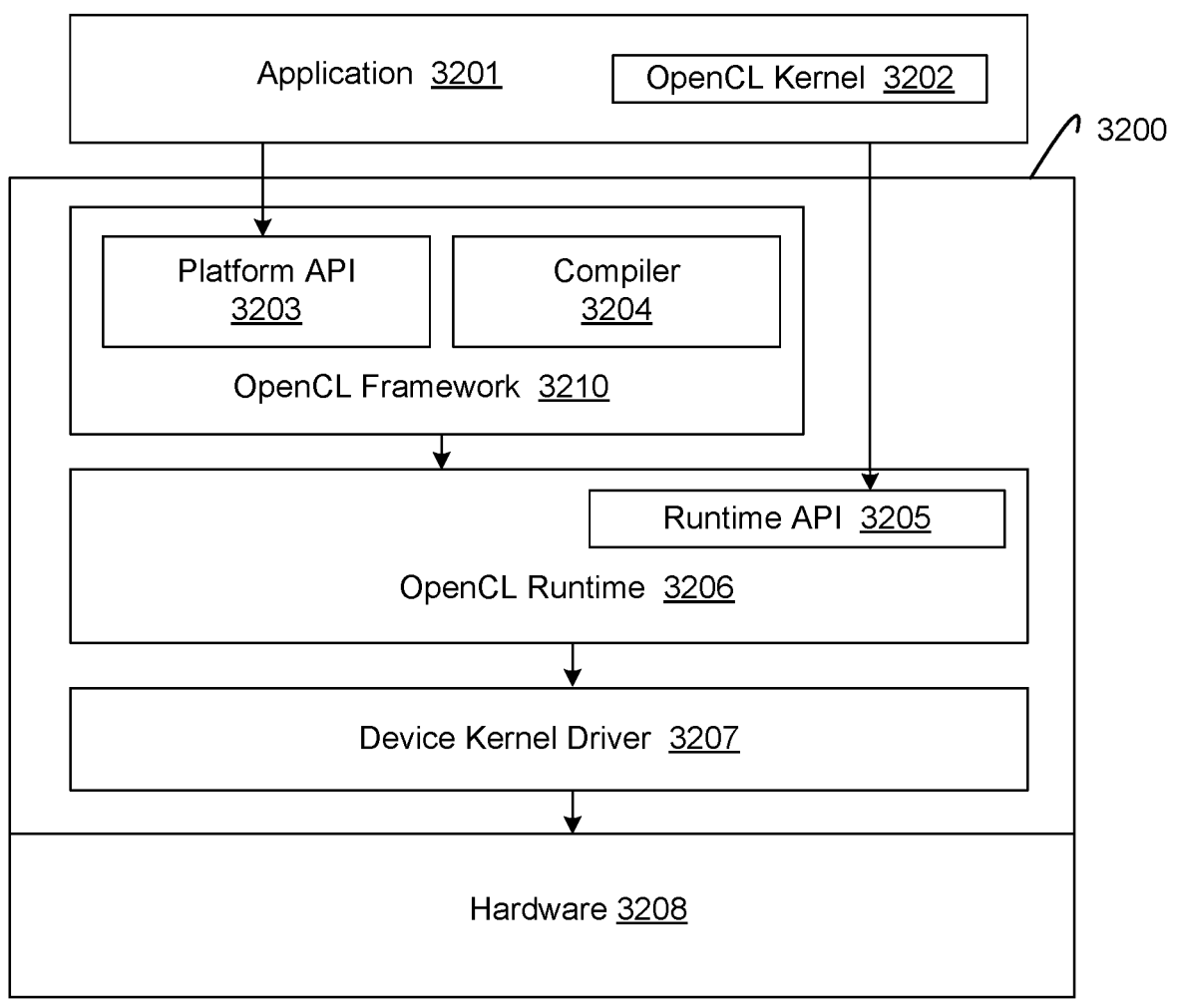
FIG. 32 illustrates an OpenCL implementation of a software stack of FIG. 29, in accordance with at least one embodiment.

FIG. 32 illustrates an OpenCL implementation of software stack 2900 of FIG. 29, in accordance with at least one embodiment. In at least one embodiment, an OpenCL software stack 3200, on which an application 3201 may be launched, includes an OpenCL framework 3210, an OpenCL runtime 3206, and a driver 3207. In at least one embodiment, OpenCL software stack 3200 executes on hardware 3009 that is not vendor-specific. As OpenCL is supported by devices developed by different vendors, specific OpenCL drivers may be required to interoperate with hardware from such vendors, in at least one embodiment.

In at least one embodiment, application 3201, OpenCL runtime 3206, device kernel driver 3207, and hardware 3208 may perform similar functionalities as application 2901, runtime 2905, device kernel driver 2906, and hardware 2907, respectively, that are discussed above in conjunction with FIG. 29. In at least one embodiment, application 3201 further includes an OpenCL kernel 3202 with code that is to be executed on a device.

In at least one embodiment, OpenCL defines a "platform" that allows a host to control devices connected to the host. In at least one embodiment, an OpenCL framework provides a platform layer API and a runtime API, shown as platform API 3203 and runtime API 3205. In at least one embodiment, runtime API 3205 uses contexts to manage execution of kernels on devices. In at least one embodiment, each identified device may be associated with a respective context, which runtime API 3205 may use to manage command queues, program objects, and kernel objects, share memory objects, among other things, for that device. In at least one embodiment, platform API 3203 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 3204 is also included in OpenCL frame-work 3210. Source code may be compiled offline prior to executing an application or online during execution of an application, in at least one embodiment. In contrast to CUDA and ROCm, OpenCL applications in at least one embodiment may be compiled online by compiler 3204, which is included to be representative of any number of compilers that may be used to compile source code and/or IR code, such as Standard Portable Intermediate Representation ("SPIR-V") code, into binary code. Alternatively, in at least one embodiment, OpenCL ap-plications may be compiled offline, prior to execution of such applications.

Figure 33:
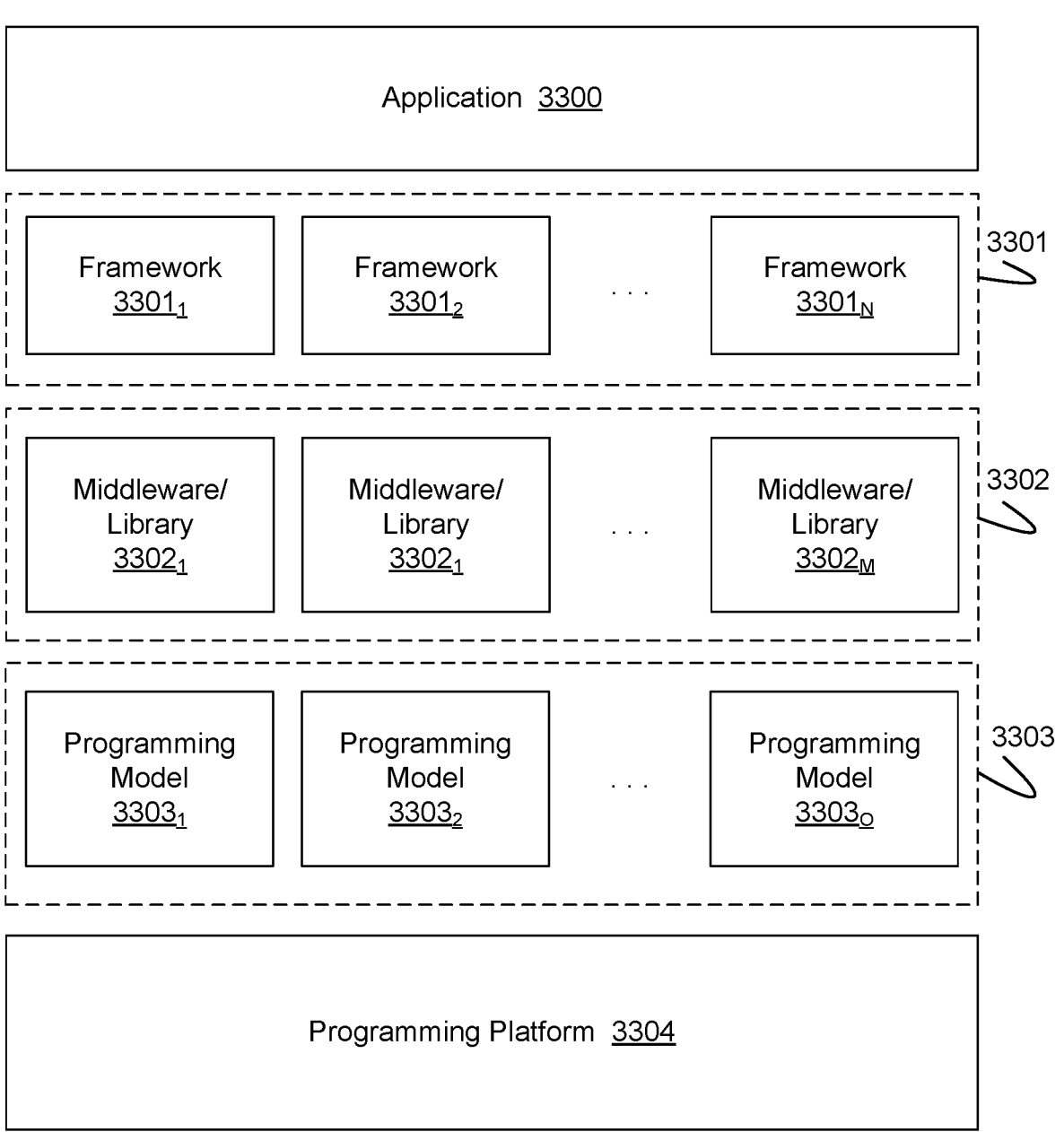
FIG. 33 illustrates software that is supported by a programming platform, in accordance with at least one embodiment.

FIG. 33 illustrates software that is supported by a pro-gramming platform, in accordance with at least one embodi-ment. In at least one embodiment, a programming platform 3304 is configured to support various programming models 3303, middlewares and/or libraries 3302, and frameworks 3301 that an application 3300 may rely upon. In at least one embodiment, application 3300 may be an AI/ML application implemented using, for example, a deep learning framework such as MXNet, PyTorch, or TensorFlow, which may rely on libraries such as cuDNN, NVIDIA Collective Communica-tions Library ("NCCL"), and/or NVIDA Developer Data Loading Library ("DALI") CUDA libraries to provide accel-erated computing on underlying hardware.

In at least one embodiment, programming platform 3304 may be one of a CUDA, ROCm, or OpenCL platform described above in conjunction with FIG. 30, FIG. 31, and FIG. 32, respectively. In at least one embodiment, program-ming platform 3304 supports multiple programming models 3303, which are abstractions of an underlying computing system permitting expressions of algorithms and data struc-tures. Programming models 3303 may expose features of underlying hardware in order to improve performance, in at least one embodiment. In at least one embodiment, program-ming models 3303 may include, but are not limited to, CUDA, HIP, OpenCL, C++ Accelerated Massive Parallel-ism ("C++ AMP"), Open Multi-Processing ("OpenMP"), Open Accelerators ("OpenACC"), and/or Vulcan Compute.

In at least one embodiment, libraries and/or middlewares 3302 provide implementations of abstractions of program-ming models 3304. In at least one embodiment, such librar-ies include data and programming code that may be used by computer programs and leveraged during software develop-ment. In at least one embodiment, such middlewares include software that provides services to applications beyond those available from programming platform 3304. In at least one embodiment, libraries and/or middlewares 3302 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 3302 may include NCCL and ROCm Communication Collectives Library ("RCCL") libraries providing communication rou-tines for GPUs, a MIOpen library for deep learning accel-eration, and/or an Eigen library for linear algebra, matrix and vector operations, geometrical transformations, numeri-cal solvers, and related algorithms.

In at least one embodiment, application frameworks 3301 depend on libraries and/or middlewares 3302. In at least one embodiment, each of application frameworks 3301 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

Figure 34:
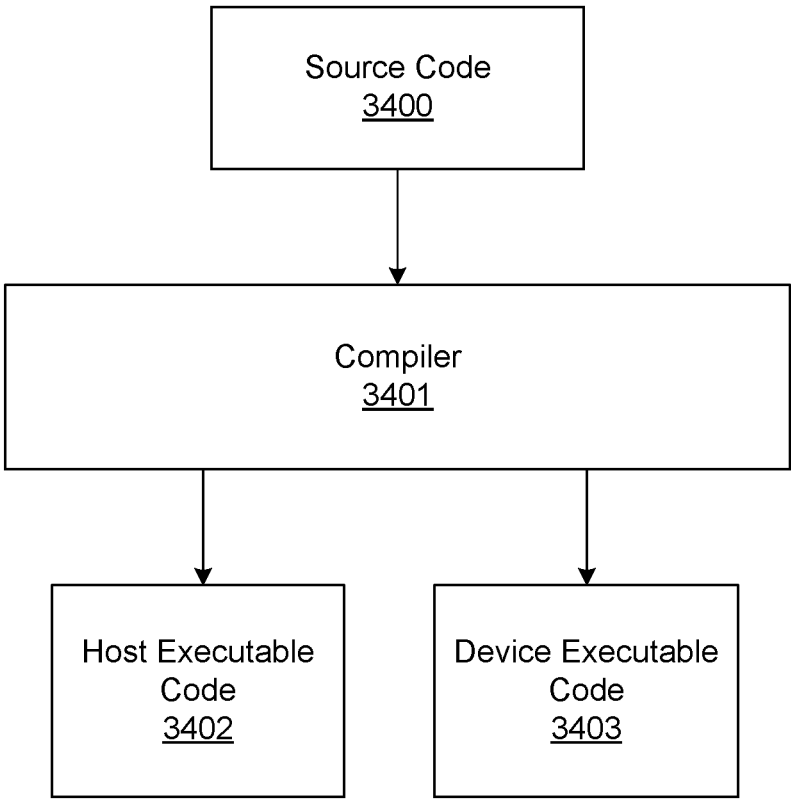
FIG. 34 illustrates compiling code to execute on programming platforms of FIGS. 29-32, in accordance with at least one embodiment.

FIG. 34 illustrates compiling code to execute on one of programming platforms of FIGS. 29-32, in accordance with at least one embodiment. In at least one embodiment, a compiler 3401 receives source code 3400 that includes both host code as well as device code. In at least one embodiment, complier 3401 is configured to convert source code 3400 into host executable code 3402 for execution on a host and device executable code 3403 for execution on a device. In at least one embodiment, source code 3400 may either be compiled offline prior to execution of an application, or online during execution of an application.

In at least one embodiment, source code 3400 may include code in any programming language supported by compiler 3401, such as C++, C, Fortran, etc. In at least one embodiment, source code 3400 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 3400 may include multiple source code files, rather than a single-source file, into which host code and device code are separated.

In at least one embodiment, compiler 3401 is configured to compile source code 3400 into host executable code 3402 for execution on a host and device executable code 3403 for execution on a device. In at least one embodiment, compiler 3401 performs operations including parsing source code 3400 into an abstract system tree (AST), performing optimizations, and generating executable code. In at least one embodiment in which source code 3400 includes a single-source file, compiler 3401 may separate device code from host code in such a single-source file, compile device code and host code into device executable code 3403 and host executable code 3402, respectively, and link device executable code 3403 and host executable code 3402 together in a single file, as discussed in greater detail below with respect to FIG. 35.

In at least one embodiment, host executable code 3402 and device executable code 3403 may be in any suitable format, such as binary code and/or IR code. In the case of CUDA, host executable code 3402 may include native object code and device executable code 3403 may include code in PTX intermediate representation, in at least one embodiment. In the case of ROCm, both host executable code 3402 and device executable code 3403 may include target binary code, in at least one embodiment.

Figure 35:
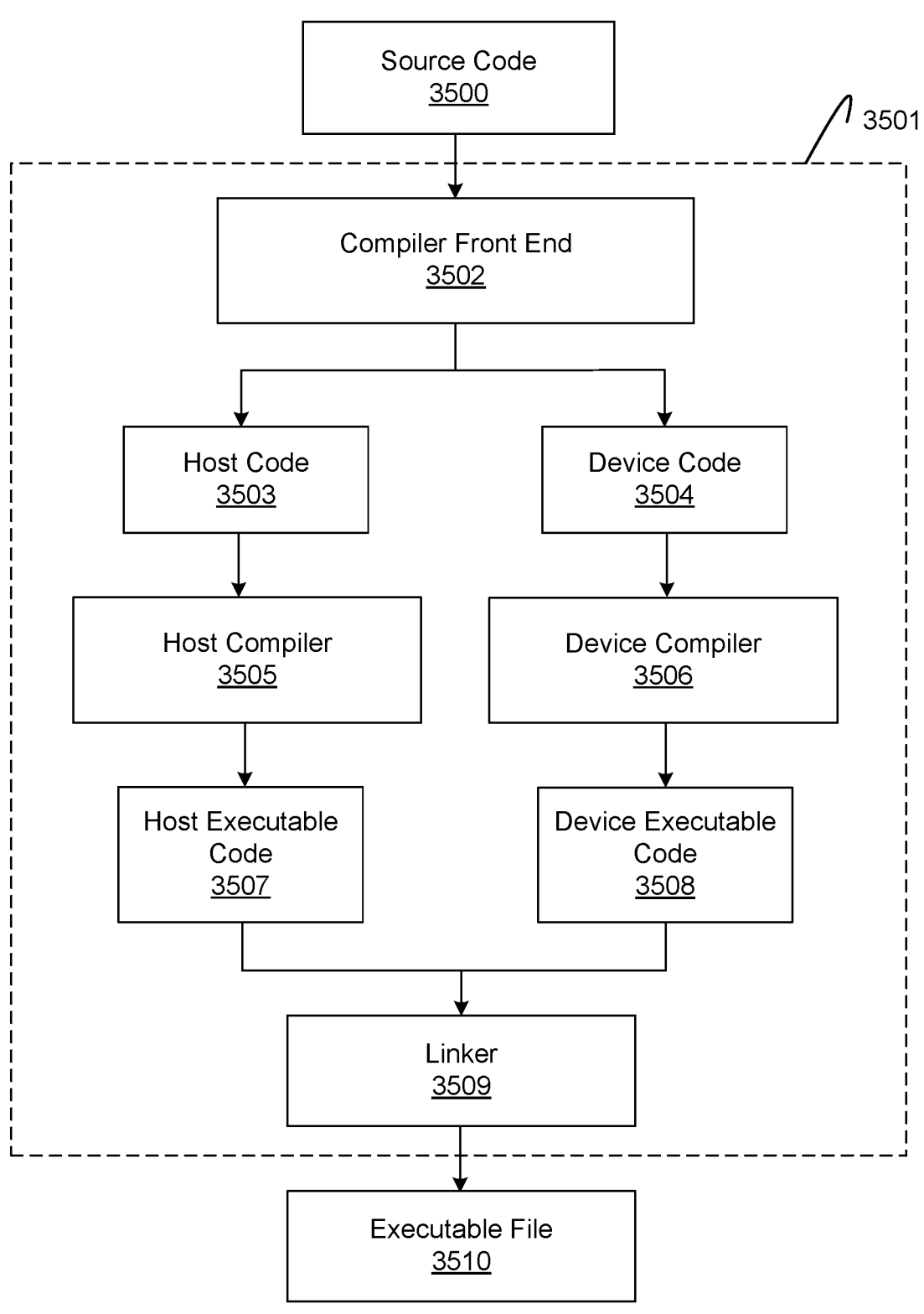
FIG. 35 illustrates in greater detail compiling code to execute on programming platforms of FIGS. 29-32, in accordance with at least one embodiment.

FIG. 35 is a more detailed illustration of compiling code to execute on one of programming platforms of FIGS. 29-32, in accordance with at least one embodiment. In at least one embodiment, a compiler 3501 is configured to receive source code 3500, compile source code 3500, and output an executable file 3510. In at least one embodiment, source code 3500 is a single-source file, such as a .cu file, a .hip.cpp file, or a file in another format, that includes both host and device code. In at least one embodiment, compiler 3501 may be, but is not limited to, an NVIDIA CUDA compiler ("NVCC") for compiling CUDA code in .cu files, or a HCC compiler for compiling HIP code in .hip.cpp files.

In at least one embodiment, compiler 3501 includes a compiler front end 3502, a host compiler 3505, a device compiler 3506, and a linker 3509. In at least one embodiment, compiler front end 3502 is configured to separate device code 3504 from host code 3503 in source code 3500. Device code 3504 is compiled by device compiler 3506 into device executable code 3508, which as described may include binary code or IR code, in at least one embodiment. Separately, host code 3503 is compiled by host compiler 3505 into host executable code 3507, in at least one embodiment. For NVCC, host compiler 3505 may be, but is not limited to, a general purpose C/C++ compiler that outputs native object code, while device compiler 3506 may be, but is not limited to, a Low Level Virtual Machine ("LLVM")-based compiler that forks a LLVM compiler infrastructure and outputs PTX code or binary code, in at least one embodiment. For HCC, both host compiler 3505 and device compiler 3506 may be, but are not limited to, LLVM-based compilers that output target binary code, in at least one embodiment.

Subsequent to compiling source code 3500 into host executable code 3507 and device executable code 3508, linker 3509 links host and device executable code 3507 and 3508 together in executable file 3510, in at least one embodiment. In at least one embodiment, native object code for a host and PTX or binary code for a device may be linked together in an Executable and Linkable Format ("ELF") file, which is a container format used to store object code.

Figure 36:
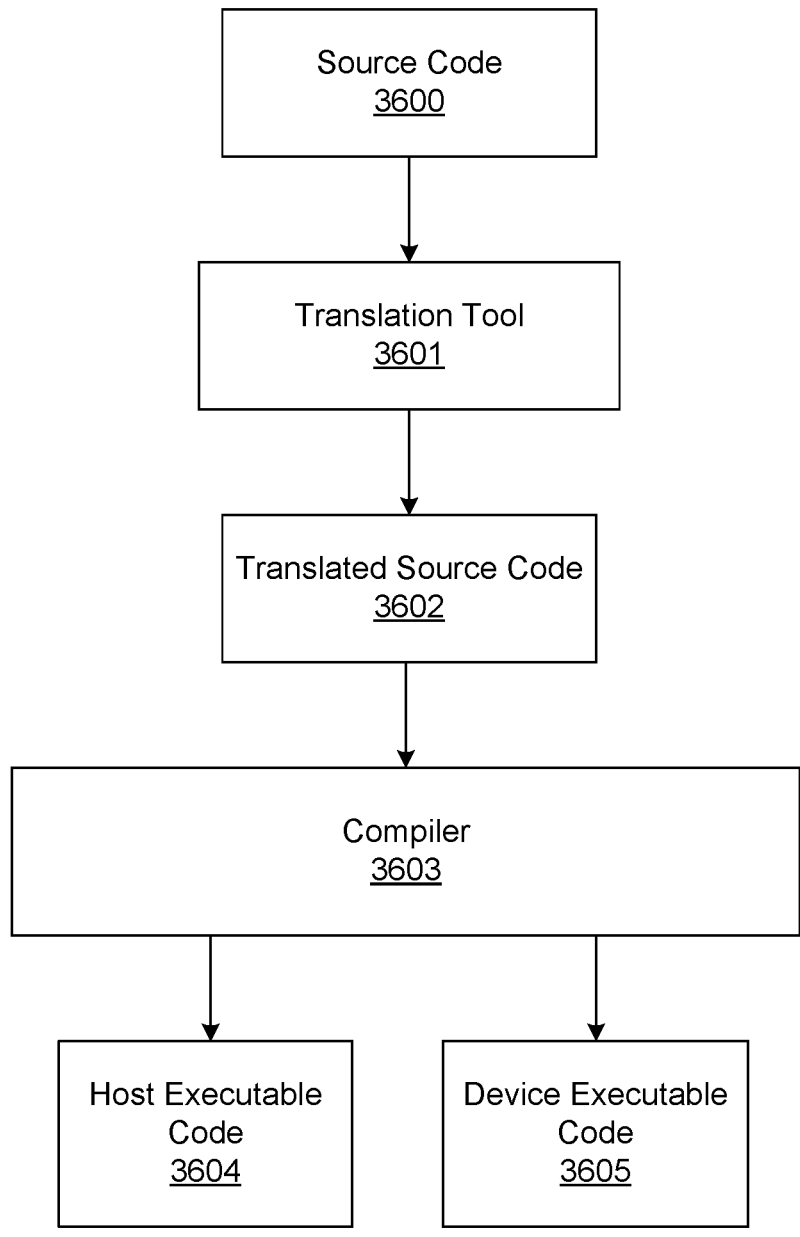
FIG. 36 illustrates translating source code prior to compiling source code, in accordance with at least one embodiment.

FIG. 36 illustrates translating source code prior to compiling source code, in accordance with at least one embodiment. In at least one embodiment, source code 3600 is passed through a translation tool 3601, which translates source code 3600 into translated source code 3602. In at least one embodiment, a compiler 3603 is used to compile translated source code 3602 into host executable code 3604 and device executable code 3605 in a process that is similar to compilation of source code 3400 by compiler 3401 into host executable code 3402 and device executable 3403, as discussed above in conjunction with FIG. 34.

In at least one embodiment, a translation performed by translation tool 3601 is used to port source 3600 for execution in a different environment than that in which it was originally intended to run. In at least one embodiment, translation tool 3601 may include, but is not limited to, a HIP translator that is used to "hipify" CUDA code intended for a CUDA platform into HIP code that can be compiled and executed on a ROCm platform. In at least one embodiment, translation of source code 3600 may include parsing source code 3600 and converting calls to API(s) provided by one programming model (e.g., CUDA) into corresponding calls to API(s) provided by another programming model (e.g., HIP), as discussed in greater detail below in conjunction with FIGS. 37A-38. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 3601 may sometimes be incomplete, requiring additional, manual effort to fully port source code 3600.

Configuring GPUS for General-Purpose Computing

The following figures set forth, without limitation, exemplary architectures for compiling and executing compute source code, in accordance with at least one embodiment.

Figure 37A:
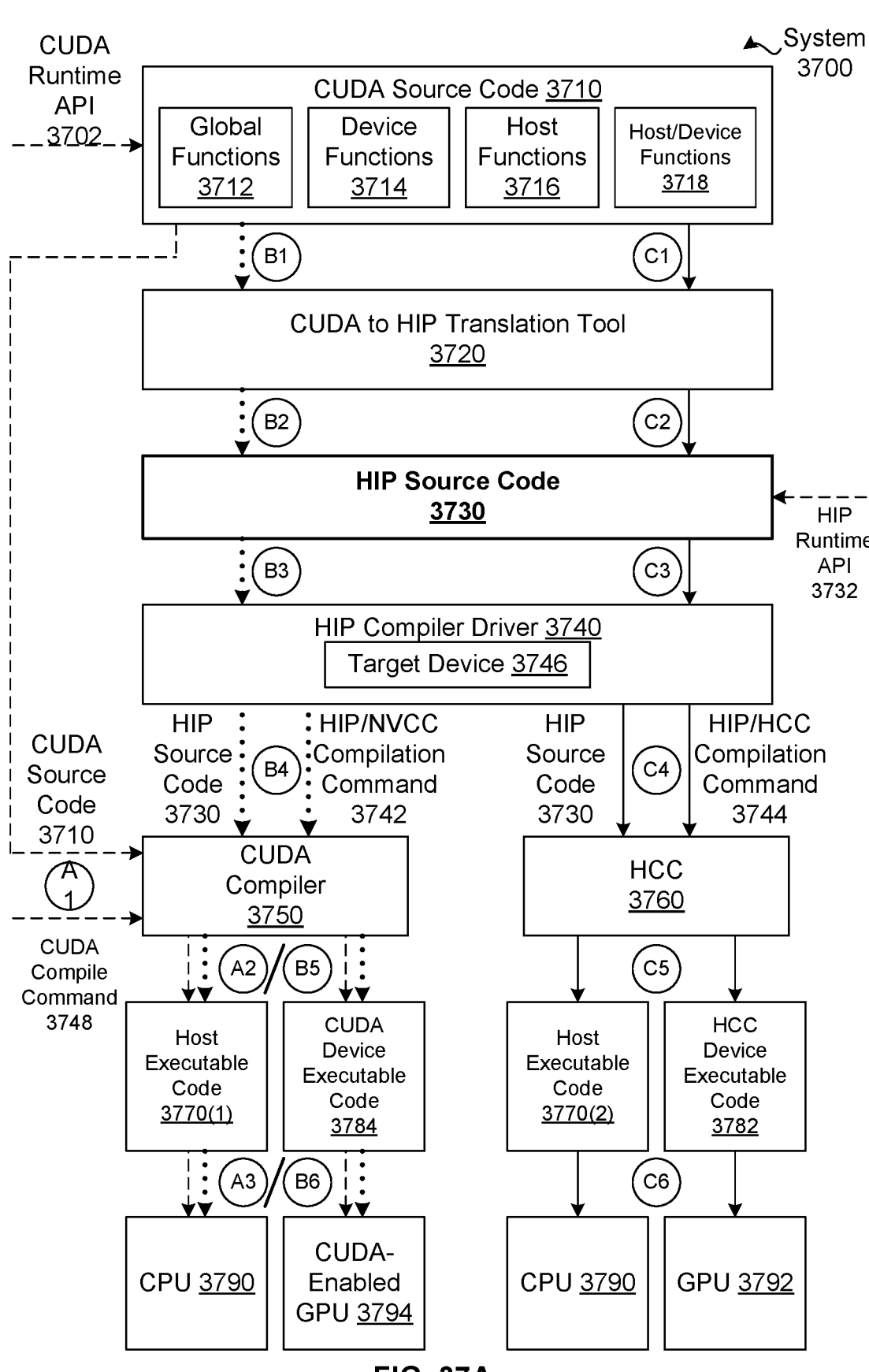
FIG. 37A illustrates a system configured to compile and execute CUDA source code using different types of processing units, in accordance with at least one embodiment.

FIG. 37A illustrates a system 37A00 configured to compile and execute CUDA source code 3710 using different types of processing units, in accordance with at least one embodiment. In at least one embodiment, system 37A00 includes, without limitation, CUDA source code 3710, a CUDA compiler 3750, host executable code 3770(1), host executable code 3770(2), CUDA device executable code 3784, a CPU 3790, a CUDA-enabled GPU 3794, a GPU 3792, a CUDA to HIP translation tool 3720, HIP source code 3730, a HIP compiler driver 3740, an HCC 3760, and HCC device executable code 3782.

In at least one embodiment, CUDA source code 3710 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 3790, GPU 37192, or another GPGPU, etc. In at least one embodiment, host code is source code that, after compilation, is executable on a host. In at least one embodiment, a host is a processor that is optimized for sequential instruction processing, such as CPU 3790.

In at least one embodiment, CUDA source code 3710 includes, without limitation, any number (including zero) of global functions 3712, any number (including zero) of device functions 3714, any number (including zero) of host functions 3716, and any number (including zero) of host/ device functions 3718. In at least one embodiment, global functions 3712, device functions 3714, host functions 3716, and host/device functions 3718 may be mixed in CUDA source code 3710. In at least one embodiment, each of global functions 3712 is executable on a device and callable from a host. In at least one embodiment, one or more of global functions 3712 may therefore act as entry points to a device. In at least one embodiment, each of global functions 3712 is a kernel. In at least one embodiment and in a technique known as dynamic parallelism, one or more of global functions 3712 defines a kernel that is executable on a device and callable from such a device. In at least one embodiment, a kernel is executed N (where N is any positive integer) times in parallel by N different threads on a device during execution.

In at least one embodiment, each of device functions 3714 is executed on a device and callable from such a device only. In at least one embodiment, each of host functions 3716 is executed on a host and callable from such a host only. In at least one embodiment, each of host/device functions 3716 defines both a host version of a function that is executable on a host and callable from such a host only and a device version of the function that is executable on a device and callable from such a device only.

In at least one embodiment, CUDA source code 3710 may also include, without limitation, any number of calls to any number of functions that are defined via a CUDA runtime API 3702. In at least one embodiment, CUDA runtime API 3702 may include, without limitation, any number of functions that execute on a host to allocate and deallocate device memory, transfer data between host memory and device memory, manage systems with multiple devices, etc. In at least one embodiment, CUDA source code 3710 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 3702, a CUDA driver API, APIs for any number of CUDA libraries, etc. In at least one embodiment and relative to CUDA runtime API 3702, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 3750 compiles input CUDA code (e.g., CUDA source code 3710) to generate host executable code 3770(1) and CUDA device executable code 3784. In at least one embodiment, CUDA compiler 3750 is NVCC. In at least one embodiment, host executable code 3770(1) is a compiled version of host code included in input source code that is executable on CPU 3790. In at least one embodiment, CPU 3790 may be any processor that is optimized for sequential instruction processing.

In at least one embodiment, CUDA device executable code 3784 is a compiled version of device code included in input source code that is executable on CUDA-enabled GPU 3794. In at least one embodiment, CUDA device executable code 3784 includes, without limitation, binary code. In at least one embodiment, CUDA device executable code 3784 includes, without limitation, IR code, such as PTX code, that is further compiled at runtime into binary code for a specific target device (e.g., CUDA-enabled GPU 3794) by a device driver. In at least one embodiment, CUDA-enabled GPU 3794 may be any processor that is optimized for parallel instruction processing and that supports CUDA. In at least one embodiment, CUDA-enabled GPU 3794 is developed by NVIDIA Corporation of Santa Clara, CA.

In at least one embodiment, CUDA to HIP translation tool 3720 is configured to translate CUDA source code 3710 to functionally similar HIP source code 3730. In a least one embodiment, HIP source code 3730 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 3712, but such a HIP programming language may lack support for dynamic parallelism and therefore global functions 3712 defined in HIP code may be callable from a host only.

In at least one embodiment, HIP source code 3730 includes, without limitation, any number (including zero) of global functions 3712, any number (including zero) of device functions 3714, any number (including zero) of host functions 3716, and any number (including zero) of host/ device functions 3718. In at least one embodiment, HIP source code 3730 may also include any number of calls to any number of functions that are specified in a HIP runtime API 3732. In at least one embodiment, HIP runtime API 3732 includes, without limitation, functionally similar versions of a subset of functions included in CUDA runtime API 3702. In at least one embodiment, HIP source code 3730 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 3732, a HIP driver API, APIs for any number of HIP libraries, APIs for any number of ROCm libraries, etc.

In at least one embodiment, CUDA to HIP translation tool 3720 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 3720 converts any number of calls to functions specified in CUDA runtime API 3702 to any number of calls to functions specified in HIP runtime API 3732.

In at least one embodiment, CUDA to HIP translation tool 3720 is a tool known as hipify-perl that executes a text-based translation process. In at least one embodiment, CUDA to HIP translation tool 3720 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 3720.

In at least one embodiment, HIP compiler driver 3740 is a front end that determines a target device 3746 and then configures a compiler that is compatible with target device 3746 to compile HIP source code 3730. In at least one embodiment, target device 3746 is a processor that is optimized for parallel instruction processing. In at least one embodiment, HIP compiler driver 3740 may determine target device 3746 in any technically feasible fashion.

In at least one embodiment, if target device 3746 is compatible with CUDA (e.g., CUDA-enabled GPU 3794), then HIP compiler driver 3740 generates a HIP/NVCC compilation command 3742. In at least one embodiment and as described in greater detail in conjunction with FIG. 37B, HIP/NVCC compilation command 3742 configures CUDA compiler 3750 to compile HIP source code 3730 using, without limitation, a HIP to CUDA translation header and a CUDA runtime library. In at least one embodiment and in response to HIP/NVCC compilation command 3742, CUDA compiler 3750 generates host executable code 3770(1) and CUDA device executable code 3784.

In at least one embodiment, if target device 3746 is not compatible with CUDA, then HIP compiler driver 3740 generates a HIP/HCC compilation command 3744. In at least one embodiment and as described in greater detail in conjunction with FIG. 37C, HIP/HCC compilation command 3744 configures HCC 3760 to compile HIP source code 3730 using, without limitation, an HCC header and a HIP/HCC runtime library. In at least one embodiment and in response to HIP/HCC compilation command 3744, HCC 3760 generates host executable code 3770(2) and HCC device executable code 3782. In at least one embodiment, HCC device executable code 3782 is a compiled version of device code included in HIP source code 3730 that is executable on GPU 3792. In at least one embodiment, GPU 3792 may be any processor that is optimized for parallel instruction processing, is not compatible with CUDA, and is compatible with HCC. In at least one embodiment, GPU 3792 is developed by AMD Corporation of Santa Clara, CA. In at least one embodiment GPU, 3792 is a non-CUDA-enabled GPU 3792.

For explanatory purposes only, three different flows that may be implemented in at least one embodiment to compile CUDA source code 3710 for execution on CPU 3790 and different devices are depicted in FIG. 37A. In at least one embodiment, a direct CUDA flow compiles CUDA source code 3710 for execution on CPU 3790 and CUDA-enabled GPU 3794 without translating CUDA source code 3710 to HIP source code 3730. In at least one embodiment, an indirect CUDA flow translates CUDA source code 3710 to HIP source code 3730 and then compiles HIP source code 3730 for execution on CPU 3790 and CUDA-enabled GPU 3794. In at least one embodiment, a CUDA/HCC flow translates CUDA source code 3710 to HIP source code 3730 and then compiles HIP source code 3730 for execution on CPU 3790 and GPU 3792.

A direct CUDA flow that may be implemented in at least one embodiment is depicted via dashed lines and a series of bubbles annotated A1-A3. In at least one embodiment and as depicted with bubble annotated A1, CUDA compiler 3750 receives CUDA source code 3710 and a CUDA compile command 3748 that configures CUDA compiler 3750 to compile CUDA source code 3710. In at least one embodiment, CUDA source code 3710 used in a direct CUDA flow is written in a CUDA programming language that is based on a programming language other than C++ (e.g., C, Fortran, Python, Java, etc.). In at least one embodiment and in response to CUDA compile command 3748, CUDA compiler 3750 generates host executable code 3770(1) and CUDA device executable code 3784 (depicted with bubble annotated A2). In at least one embodiment and as depicted with bubble annotated A3, host executable code 3770(1) and CUDA device executable code 3784 may be executed on, respectively, CPU 3790 and CUDA-enabled GPU 3794. In at least one embodiment, CUDA device executable code 3784 includes, without limitation, binary code. In at least one embodiment, CUDA device executable code 3784 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 3720 receives CUDA source code 3710. In at least one embodiment and as depicted with bubble annotated B2, CUDA to HIP translation tool 3720 translates CUDA source code 3710 to HIP source code 3730. In at least one embodiment and as depicted with bubble annotated B3, HIP compiler driver 3740 receives HIP source code 3730 and determines that target device 3746 is CUDA-enabled.

In at least one embodiment and as depicted with bubble annotated B4, HIP compiler driver 3740 generates HIP/NVCC compilation command 3742 and transmits both HIP/NVCC compilation command 3742 and HIP source code 3730 to CUDA compiler 3750. In at least one embodiment and as described in greater detail in conjunction with FIG. 37B, HIP/NVCC compilation command 3742 configures CUDA compiler 3750 to compile HIP source code 3730 using, without limitation, a HIP to CUDA translation header and a CUDA runtime library. In at least one embodiment and in response to HIP/NVCC compilation command 3742, CUDA compiler 3750 generates host executable code 3770 (1) and CUDA device executable code 3784 (depicted with bubble annotated B5). In at least one embodiment and as depicted with bubble annotated B6, host executable code 3770(1) and CUDA device executable code 3784 may be executed on, respectively, CPU 3790 and CUDA-enabled GPU 3794. In at least one embodiment, CUDA device executable code 3784 includes, without limitation, binary code. In at least one embodiment, CUDA device executable code 3784 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 3720 receives CUDA source code 3710. In at least one embodiment and as depicted with bubble annotated C2, CUDA to HIP translation tool 3720 translates CUDA source code 3710 to HIP source code 3730. In at least one embodiment and as depicted with bubble annotated C3, HIP compiler driver 3740 receives HIP source code 3730 and determines that target device 3746 is not CUDA-enabled.

In at least one embodiment, HIP compiler driver 3740 generates HIP/HCC compilation command 3744 and transmits both HIP/HCC compilation command 3744 and HIP source code 3730 to HCC 3760 (depicted with bubble annotated C4). In at least one embodiment and as described in greater detail in conjunction with FIG. 37C, HIP/HCC compilation command 3744 configures HCC 3760 to compile HIP source code 3730 using, without limitation, an HCC header and a HIP/HCC runtime library. In at least one embodiment and in response to HIP/HCC compilation command 3744, HCC 3760 generates host executable code 3770(2) and HCC device executable code 3782 (depicted with bubble annotated C5). In at least one embodiment and as depicted with bubble annotated C6, host executable code 3770(2) and HCC device executable code 3782 may be executed on, respectively, CPU 3790 and GPU 3792.

In at least one embodiment, after CUDA source code 3710 is translated to HIP source code 3730, HIP compiler driver 3740 may subsequently be used to generate executable code for either CUDA-enabled GPU 3794 or GPU 3792 without re-executing CUDA to HIP translation tool 3720. In at least one embodiment, CUDA to HIP translation tool 3720 translates CUDA source code 3710 to HIP source code 3730 that is then stored in memory. In at least one embodiment, HIP compiler driver 3740 then configures HCC 3760 to generate host executable code 3770(2) and HCC device executable code 3782 based on HIP source code 3730. In at least one embodiment, HIP compiler driver 3740 subsequently configures CUDA compiler 3750 to generate host executable code 3770(1) and CUDA device executable code 3784 based on stored HIP source code 3730.

Figure 37B:
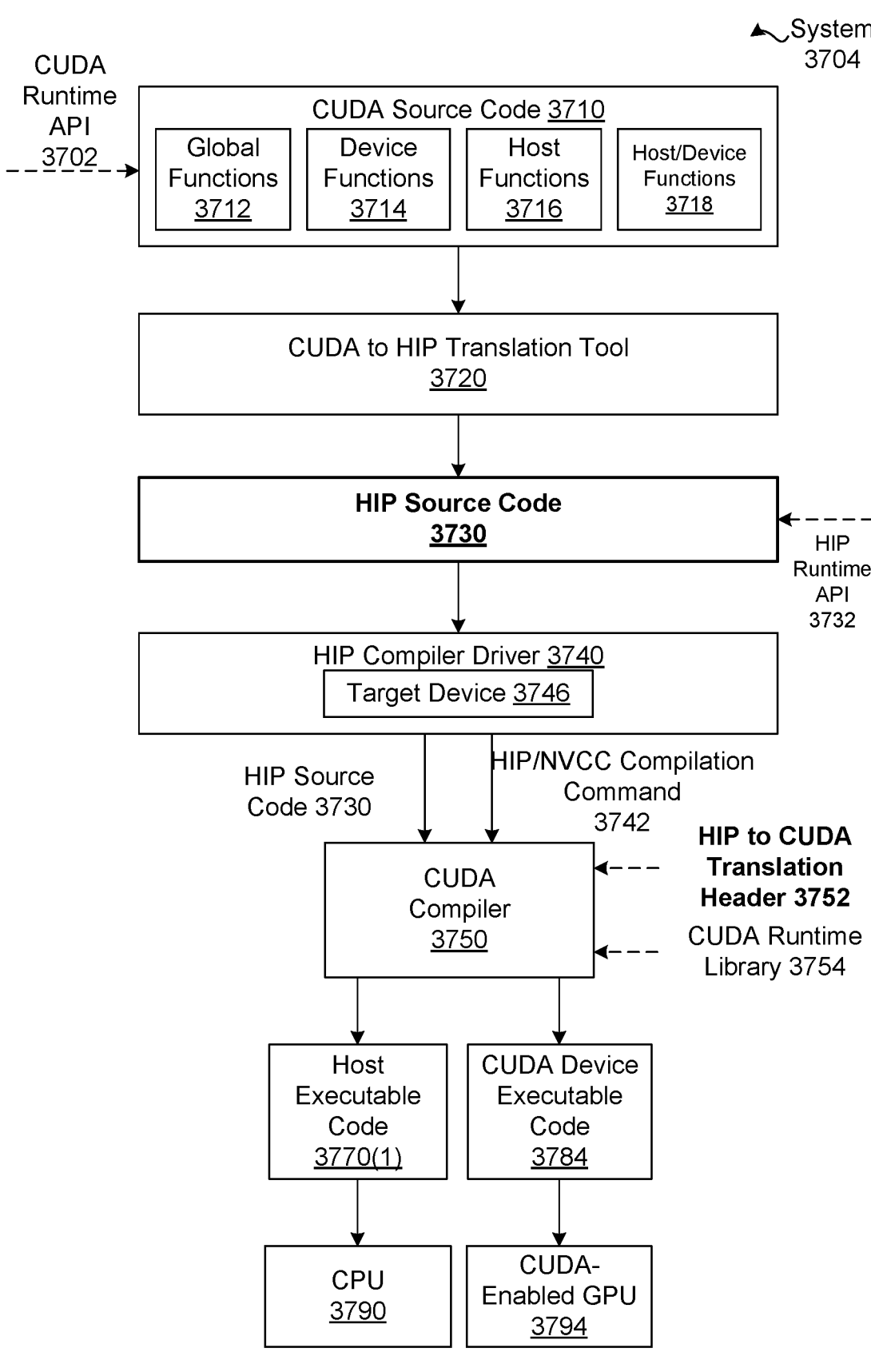
FIG. 37B illustrates a system configured to compile and execute CUDA source code of FIG. 37A using a CPU and a CUDA-enabled GPU, in accordance with at least one embodiment.

FIG. 37B illustrates a system 3704 configured to compile and execute CUDA source code 3710 of FIG. 37A using CPU 3790 and CUDA-enabled GPU 3794, in accordance with at least one embodiment. In at least one embodiment, system 3704 includes, without limitation, CUDA source code 3710, CUDA to HIP translation tool 3720, HIP source code 3730, HIP compiler driver 3740, CUDA compiler 3750, host executable code 3770(1), CUDA device executable code 3784, CPU 3790, and CUDA-enabled GPU 3794.

In at least one embodiment and as described previously herein in conjunction with FIG. 37A, CUDA source code 3710 includes, without limitation, any number (including zero) of global functions 3712, any number (including zero) of device functions 3714, any number (including zero) of host functions 3716, and any number (including zero) of host/device functions 3718. In at least one embodiment, CUDA source code 3710 also includes, without limitation, any number of calls to any number of functions that are specified in any number of CUDA APIs.

In at least one embodiment, CUDA to HIP translation tool 3720 translates CUDA source code 3710 to HIP source code 3730. In at least one embodiment, CUDA to HIP translation tool 3720 converts each kernel call in CUDA source code 3710 from a CUDA syntax to a HIP syntax and converts any number of other CUDA calls in CUDA source code 3710 to any number of other functionally similar HIP calls.

In at least one embodiment, HIP compiler driver 3740 determines that target device 3746 is CUDA-enabled and generates HIP/NVCC compilation command 3742. In at least one embodiment, HIP compiler driver 3740 then configures CUDA compiler 3750 via HIP/NVCC compilation command 3742 to compile HIP source code 3730. In at least one embodiment, HIP compiler driver 3740 provides access to a HIP to CUDA translation header 3752 as part of configuring CUDA compiler 3750. In at least one embodiment, HIP to CUDA translation header 3752 translates any number of mechanisms (e.g., functions) specified in any number of HIP APIs to any number of mechanisms specified in any number of CUDA APIs. In at least one embodiment, CUDA compiler 3750 uses HIP to CUDA translation header 3752 in conjunction with a CUDA runtime library 3754 corresponding to CUDA runtime API 3702 to generate host executable code 3770(1) and CUDA device executable code 3784. In at least one embodiment, host executable code 3770(1) and CUDA device executable code 3784 may then be executed on, respectively, CPU 3790 and CUDA-enabled GPU 3794. In at least one embodiment, CUDA device executable code 3784 includes, without limitation, binary code. In at least one embodiment, CUDA device executable code 3784 includes, without limitation, PTX code and is further compiled into binary code for a specific target device at runtime.

Figure 37C:
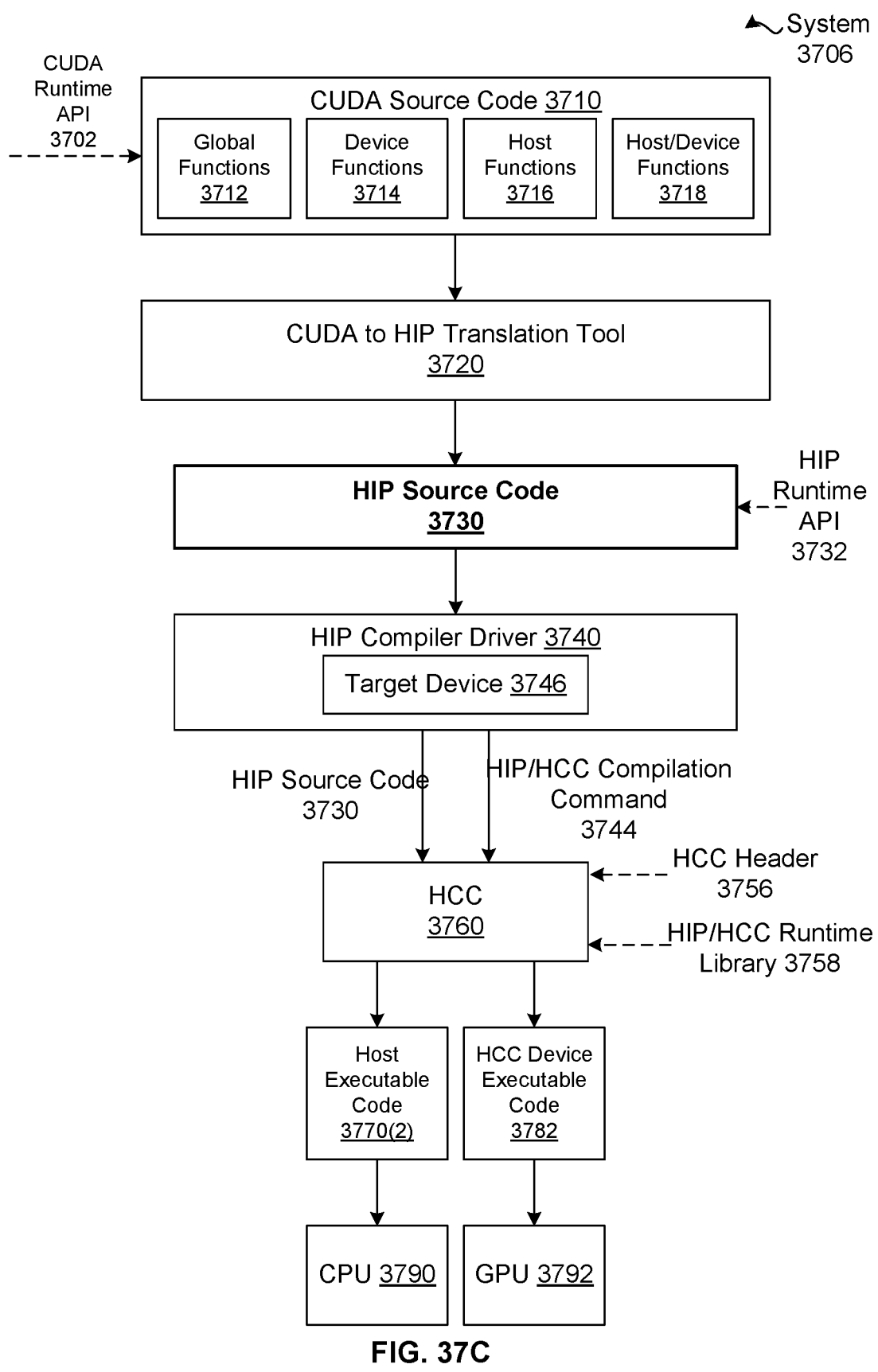
FIG. 37C illustrates a system configured to compile and execute CUDA source code of FIG. 37A using a CPU and a non-CUDA-enabled GPU, in accordance with at least one embodiment.

FIG. 37C illustrates a system 3706 configured to compile and execute CUDA source code 3710 of FIG. 37A using CPU 3790 and non-CUDA-enabled GPU 3792, in accordance with at least one embodiment. In at least one embodiment, system 3706 includes, without limitation, CUDA source code 3710, CUDA to HIP translation tool 3720, HIP source code 3730, HIP compiler driver 3740, HCC 3760, host executable code 3770(2), HCC device executable code 3782, CPU 3790, and GPU 3792.

In at least one embodiment and as described previously herein in conjunction with FIG. 37A, CUDA source code 3710 includes, without limitation, any number (including zero) of global functions 3712, any number (including zero) of device functions 3714, any number (including zero) of host functions 3716, and any number (including zero) of host/device functions 3718. In at least one embodiment, CUDA source code 3710 also includes, without limitation, any number of calls to any number of functions that are specified in any number of CUDA APIS.

In at least one embodiment, CUDA to HIP translation tool 3720 translates CUDA source code 3710 to HIP source code 3730. In at least one embodiment, CUDA to HIP translation tool 3720 converts each kernel call in CUDA source code 3710 from a CUDA syntax to a HIP syntax and converts any number of other CUDA calls in source code 3710 to any number of other functionally similar HIP calls.

In at least one embodiment, HIP compiler driver 3740 subsequently determines that target device 3746 is not CUDA-enabled and generates HIP/HCC compilation command 3744. In at least one embodiment, HIP compiler driver 3740 then configures HCC 3760 to execute HIP/HCC compilation command 3744 to compile HIP source code 3730. In at least one embodiment, HIP/HCC compilation command 3744 configures HCC 3760 to use, without limitation, a HIP/HCC runtime library 3758 and an HCC header 3756 to generate host executable code 3770(2) and HCC device executable code 3782. In at least one embodiment, HIP/HCC runtime library 3758 corresponds to HIP runtime API 3732. In at least one embodiment, HCC header 3756 includes, without limitation, any number and type of interoperability mechanisms for HIP and HCC. In at least one embodiment, host executable code 3770(2) and HCC device executable code 3782 may be executed on, respectively, CPU 3790 and GPU 3792.

FIG. 38 illustrates an exemplary kernel translated by CUDA-to-HIP translation tool 3720 of FIG. 37C, in accordance with at least one embodiment. In at least one embodiment, CUDA source code 3710 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 3710 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 3810. In at least one embodiment, CUDA kernel launch syntax 3810 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 3810 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 3810, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 3810, SharedMemorySize defaults to zero. In at least one embodiment and with respect to CUDA kernel launch syntax 3810, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 3710 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 3810, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 3710 to HIP source code 3730, CUDA to HIP translation tool 3720 translates each kernel call in CUDA source code 3710 from CUDA kernel launch syntax 3810 to a HIP kernel launch syntax 3820 and converts any number of other CUDA calls in source code 3710 to any number of other functionally similar HIP calls. In at least one embodiment, HIP kernel launch syntax 3820 is specified as "hipLaunchKernelGGL(KernelName, GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 3820 as in CUDA kernel launch syntax 3810 (described previously herein). In at least one embodiment, arguments SharedMemorySize and Stream are required in HIP kernel launch syntax 3820 and are optional in CUDA kernel launch syntax 3810.

In at least one embodiment, a portion of HIP source code 3730 depicted in FIG. 38 is identical to a portion of CUDA source code 3710 depicted in FIG. 38 except for a kernel call that causes kernel MatAdd to execute on a device. In at least one embodiment, kernel MatAdd is defined in HIP source code 3730 with the same "_global_" declaration specifier with which kernel MatAdd is defined in CUDA source code 3710. In at least one embodiment, a kernel call in HIP source code 3730 is "hipLaunchKernelGGL (MatAdd, numBlocks, threadsPerBlock, 0, 0, A, B, C);", while a corresponding kernel call in CUDA source code 3710 is "MatAdd<<<numBlocks, threadsPerBlock>>>(A, B, C);".

Figure 39:
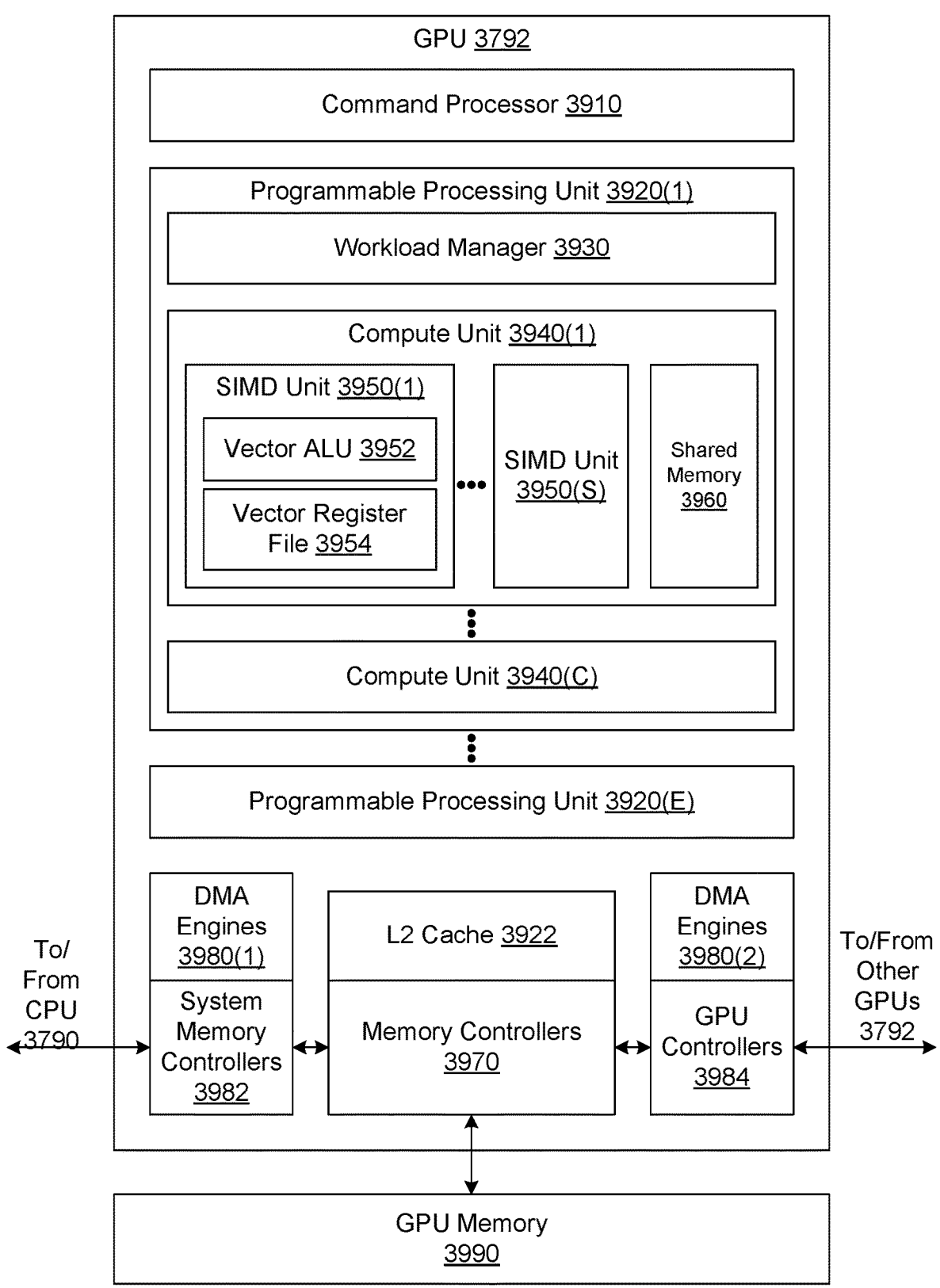
FIG. 39 illustrates non-CUDA-enabled GPU of FIG. 37C in greater detail, in accordance with at least one embodiment.

FIG. 39 illustrates non-CUDA-enabled GPU 3792 of FIG. 37C in greater detail, in accordance with at least one embodiment. In at least one embodiment, GPU 3792 is developed by AMD corporation of Santa Clara. In at least one embodiment, GPU 3792 can be configured to perform compute operations in a highly-parallel fashion. In at least one embodiment, GPU 3792 is configured to execute graphics pipeline operations such as draw commands, pixel operations, geometric computations, and other operations associated with rendering an image to a display. In at least one embodiment, GPU 3792 is configured to execute operations unrelated to graphics. In at least one embodiment, GPU 3792 is configured to execute both operations related to graphics and operations unrelated to graphics. In at least one embodiment, GPU 3792 can be configured to execute device code included in HIP source code 3730.

In at least one embodiment, GPU 3792 includes, without limitation, any number of programmable processing units 3920, a command processor 3910, an L2 cache 3922, memory controllers 3970, DMA engines 3980(1), system memory controllers 3982, DMA engines 3980(2), and GPU controllers 3984. In at least one embodiment, each programmable processing unit 3920 includes, without limitation, a workload manager 3930 and any number of compute units 3940. In at least one embodiment, command processor 3910 reads commands from one or more command queues (not shown) and distributes commands to workload managers 3930. In at least one embodiment, for each programmable processing unit 3920, associated workload manager 3930 distributes work to compute units 3940 included in programmable processing unit 3920. In at least one embodiment, each compute unit 3940 may execute any number of thread blocks, but each thread block executes on a single compute unit 3940. In at least one embodiment, a workgroup is a thread block.

In at least one embodiment, each compute unit 3940 includes, without limitation, any number of SIMD units 3950 and a shared memory 3960. In at least one embodiment, each SIMD unit 3950 implements a SIMD architecture and is configured to perform operations in parallel. In at least one embodiment, each SIMD unit 3950 includes, without limitation, a vector ALU 3952 and a vector register file 3954. In at least one embodiment, each SIMD unit 3950 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3960.

In at least one embodiment, programmable processing units 3920 are referred to as "shader engines." In at least one embodiment, each programmable processing unit 3920 includes, without limitation, any amount of dedicated graphics hardware in addition to compute units 3940. In at least one embodiment, each programmable processing unit 3920 includes, without limitation, any number (including zero) of geometry processors, any number (including zero) of rasterizers, any number (including zero) of render back ends, workload manager 3930, and any number of compute units 3940.

In at least one embodiment, compute units 3940 share L2 cache 3922. In at least one embodiment, L2 cache 3922 is partitioned. In at least one embodiment, a GPU memory 3990 is accessible by all compute units 3940 in GPU 3792. In at least one embodiment, memory controllers 3970 and system memory controllers 3982 facilitate data transfers between GPU 3792 and a host, and DMA engines 3980(1) enable asynchronous memory transfers between GPU 3792 and such a host. In at least one embodiment, memory controllers 3970 and GPU controllers 3984 facilitate data transfers between GPU 3792 and other GPUs 3792, and DMA engines 3980(2) enable asynchronous memory transfers between GPU 3792 and other GPUs 3792.

In at least one embodiment, GPU 3792 includes, without limitation, any amount and type of system interconnect that facilitates data and control transmissions across any number and type of directly or indirectly linked components that may be internal or external to GPU 3792. In at least one embodiment, GPU 3792 includes, without limitation, any number and type of I/O interfaces (e.g., PCIe) that are coupled to any number and type of peripheral devices. In at least one embodiment, GPU 3792 may include, without limitation, any number (including zero) of display engines and any number (including zero) of multimedia engines. In at least one embodiment, GPU 3792 implements a memory subsystem that includes, without limitation, any amount and type of memory controllers (e.g., memory controllers 3970 and system memory controllers 3982) and memory devices (e.g., shared memories 3960) that may be dedicated to one component or shared among multiple components. In at least one embodiment, GPU 3792 implements a cache subsystem that includes, without limitation, one or more cache memories (e.g., L2 cache 3922) that may each be private to or shared between any number of components (e.g., SIMD units 3950, compute units 3940, and programmable processing units 3920).

Figure 40:
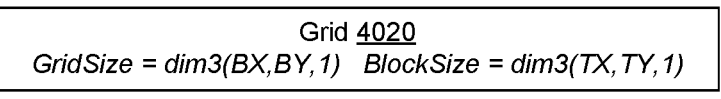
FIG. 40 illustrates how threads of an exemplary CUDA grid are mapped to different compute units of FIG. 39, in accordance with at least one embodiment.

FIG. 40 illustrates how threads of an exemplary CUDA grid 4020 are mapped to different compute units 3940 of FIG. 39, in accordance with at least one embodiment. In at least one embodiment and for explanatory purposes only, grid 4020 has a GridSize of BX by BY by 1 and a BlockSize of TX by TY by 1. In at least one embodiment, grid 4020 therefore includes, without limitation, (BX*BY) thread blocks 4030 and each thread block 4030 includes, without limitation, (TX*TY) threads 4040. Threads 4040 are depicted in FIG. 40 as squiggly arrows.

In at least one embodiment, grid 4020 is mapped to programmable processing unit 3920(1) that includes, without limitation, compute units 3940(1)-3940(C). In at least one embodiment and as shown, (BJ*BY) thread blocks 4030 are mapped to compute unit 3940(1), and the remaining thread blocks 4030 are mapped to compute unit 3940(2). In at least one embodiment, each thread block 4030 may include, without limitation, any number of warps, and each warp is mapped to a different SIMD unit 3950 of FIG. 39.

In at least one embodiment, warps in a given thread block 4030 may synchronize together and communicate through shared memory 3960 included in associated compute unit 3940. For example and in at least one embodiment, warps in thread block 4030 (BJ, 1) can synchronize together and communicate through shared memory 3960(1). For example and in at least one embodiment, warps in thread block 4030 (BJ+1,1) can synchronize together and communicate through shared memory 3960(2).

Figure 41:
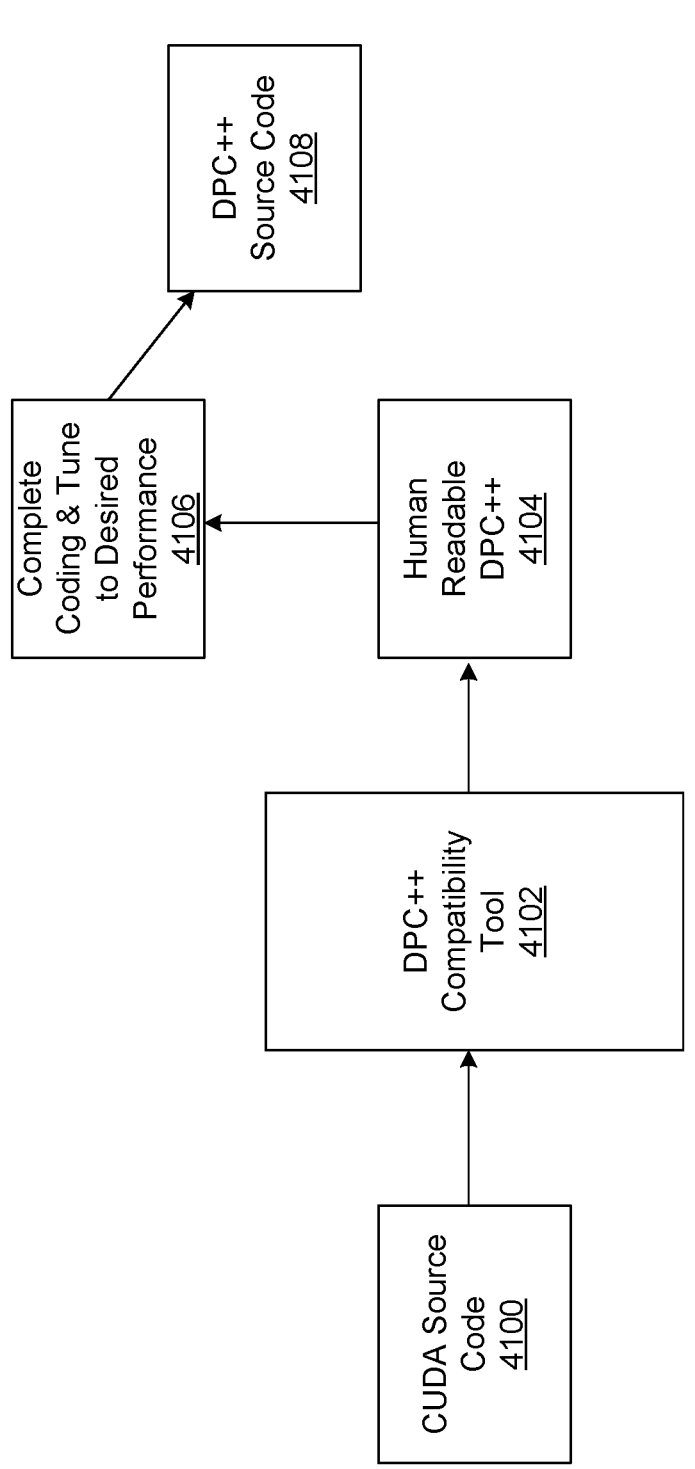
FIG. 41 illustrates how to migrate existing CUDA code to Data Parallel C++ code, in accordance with at least one embodiment.

FIG. 41 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 4100 is provided as an input to a DPC++ compatibility tool 4102 to generate human readable DPC++ 4104. In at least one embodiment, human readable DPC++ 4104 includes inline comments generated by DPC++ compatibility tool 4102 that guides a developer on how and/or where to modify DPC++ code to complete coding and tuning to desired performance 4106, thereby generating DPC++ source code 4108.

In at least one embodiment, CUDA source code 4100 is or includes a collection of human-readable source code in a CUDA programming language. In at least one embodiment, CUDA source code 4100 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 4100 described in connection with FIG. 41 may be in accordance with those discussed elsewhere in this document.

In at least one embodiment, DPC++ compatibility tool 4102 refers to an executable tool, program, application, or any other suitable type of tool that is used to facilitate migration of CUDA source code 4100 to DPC++ source code 4108. In at least one embodiment, DPC++ compatibility tool 4102 is a command-line-based code migration tool available as part of a DPC++ tool kit that is used to port existing CUDA sources to DPC++. In at least one embodiment, DPC++ compatibility tool 4102 converts some or all source code of a CUDA application from CUDA to DPC++ and generates a resulting file that is written at least partially in DPC++, referred to as human readable DPC++ 4104. In at least one embodiment, human readable DPC++ 4104 includes comments that are generated by DPC++ compatibility tool 4102 to indicate where user intervention may be necessary. In at least one embodiment, user intervention is necessary when CUDA source code 4100 calls a CUDA API that has no analogous DPC++ API; other examples where user intervention is required are discussed later in greater detail.

In at least one embodiment, a workflow for migrating CUDA source code 4100 (e.g., application or portion thereof) includes creating one or more compilation database files; migrating CUDA to DPC++ using a DPC++ compatibility tool 4102; completing migration and verifying correctness, thereby generating DPC++ source code 4108; and compiling DPC++ source code 4108 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 4102 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 4102 migrates CUDA code (e.g., applications) written in CUDA to DPC++ by generating DPC++ wherever possible. In at least one embodiment, DPC++ compatibility tool 4102 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 4102 to migrate CUDA code to DPC++. In at least one embodiment, non-CUDA C++ code and files are migrated as is. In at least one embodiment, DPC++ compatibility tool 4102 generates human readable DPC++ 4104 which may be DPC++ code that, as generated by DPC++ compatibility tool 4102, cannot be compiled by DPC++ compiler and requires additional plumbing for verifying portions of code that were not migrated correctly, and may involve manual intervention, such as by a developer. In at least one embodiment, DPC++ compatibility tool 4102 provides hints or tools embedded in code to help developers manually migrate additional code that could not be migrated automatically. In at least one embodiment, migration is a one-time activity for a source file, project, or application.

In at least one embodiment, DPC++ compatibility tool 41002 is able to successfully migrate all portions of CUDA code to DPC++ and there may simply be an optional step for manually verifying and tuning performance of DPC++ source code that was generated. In at least one embodiment, DPC++ compatibility tool 4102 directly generates DPC++ source code 4108 which is compiled by a DPC++ compiler without requiring or utilizing human intervention to modify DPC++ code generated by DPC++ compatibility tool 4102. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 4102. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B

```
#include <cuda.h>
#include <stdio.h>
#define VECTOR_SIZE 256
[ ] global__void VectorAddKernel(float* A, float* B, float* C)
  A[threadIdx.x] = threadIdx.x + 1.0f;
  B[threadIdx.x] = threadIdx.x + 1.0f;
  C[threadIdx.x] = A[threadIdx.x] + B[threadIdx.x];
}
int main( )
{
  float *d_A, *d_B, *d_C;
  cudaMalloc(&d_A, VECTOR_SIZE*sizeof(float));
  cudaMalloc(&d_B, VECTOR_SIZE*sizeof(float));
  cudaMalloc(&d_C, VECTOR_SIZE*sizeof(float));
  VectorAddKernel<<<1, VECTOR_SIZE>>>(d_A, d_B, d_C);
  float Result[VECTOR_SIZE] = { };
  cudaMemcpy(Result, d_C, VECTOR_SIZE*sizeof(float),
cudaMemcpyDeviceToHost);
  cudaFree(d_A);
  cudaFree(d_B);
  cudaFree(d_C);
  for (int i=0; i<VECTOR_SIZE; i++ {
    if (i % 16 == 0) {
      printf("\n");
    }
    printf("%f ", Result[i]);
  }
  return 0;
}
```

In at least one embodiment and in connection with CUDA source file presented above, DPC++ compatibility tool 4102 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 4102 converts CUDA thread IDs used to index work elements to SYCL standard addressing for work elements via a local ID as part of migrating CUDA code to DPC++ code. In at least one embodiment, DPC++ code generated by DPC++ compatibility tool 4102 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc_device( ) to which together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 4102. In at least one embodiment, DPC++ compatibility tool 4102 modify CUDA APIs for memory setup and/or host calls to execute kernel on the acceleration device. In at least one embodiment and in connection with CUDA source file presented above, a corresponding human readable DPC++ 4104 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
```

-continued

```
        sycl::nd_item<3>item_ct1)
    A[item_ct1.get_local_id(2)] = item_ct1.get_local_id(2) + 1.0f;
    B[item_ct1.get_local_id(2)] = item_ct1.get_local_id(2) + 1.0f;
    C[item_ct1.get_local_id(2)] =
        A[item_ct1.get_local_id(2)] + B[item_ct1.get_local_id(2)];
}
int main( )
    float *d_A, *d_B, *d_C;
    d_A = (float *)sycl::malloc_device(VECTOR_SIZE * sizeof(float),
        dpct::get_current_device( ),
        dpct::get_default_context( ));
    d_B = (float *)sycl::malloc_device(VECTOR_SIZE * sizeof(float),
        dpct::get_current_device( ),
        dpct::get_default_context( ));
    d_C = (float *)sycl::malloc_device(VECTOR_SIZE * sizeof(float),
        dpct::get_current_device( ),
        dpct::get_default_context( ));
    dpct::get_default_queue_wait( ).submit([&](sycl::handler &cgh) {
        cgh.parallel_for(
            sycl::nd_range<3>(sycl::range<3>(1, 1, 1) *
                sycl::range<3>(1, 1, VECTOR_SIZE) *
                sycl::range<3>(1, 1, VECTOR_SIZE)),
            [=](sycl::nd_items<3> item_ct1) {
                VectorAddKernel(d_A, d_B, d_C, item_ct1);
            });
    });
    float Result[VECTOR_SIZE] = { };
    dpct::get_default_queue_wait( )
        .memcpy(Result, d_C, VECTOR_SIZE * sizeof(float))
        .wait( );
    sycl::free(d_A, dpct::get_default_context( ));
    sycl::free(d_B, dpct::get_default_context( ));
    sycl::free(d_C, dpct::get_default_context( ));
    for (int i=0; i<VECTOR_SIZE; i++ {
        if (i % 16 == 0) {
            printf("\n");
        }
        printf("%f ", Result[i]);
    }
    return 0;
}
```

In at least one embodiment, human readable DPC++ 4104 refers to output generated by DPC++ compatibility tool 4102 and may be optimized in one manner or another. In at least one embodiment, human readable DPC++ 4104 generated by DPC++ compatibility tool 4102 can be manually edited by a developer after migration to make it more maintainable, performance, or other considerations. In at least one embodiment, DPC++ code generated by DPC++ compatibility tool 41002 such as DPC++ disclosed can be optimized by removing repeat calls to get_current_device( ) and/or get_default_context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 4102 replace uses of unified shared memory with accessors. In at least one embodiment, DPC++ compatibility tool 4102 has an option to change how it migrates CUDA code to DPC++ code. In at least one embodiment, DPC++ compatibility tool 4102 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 4102; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, one VPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

It should be noted that, while example embodiments described herein may relate to a CUDA programming model, techniques described herein can be utilized with any suitable programming model, such HIP, oneAPI, and/or variations thereof.

At least one embodiment of the disclosure can be described in view of the following clauses:

1. A processor comprising: one or more circuits to cause two or more dependent threads to be performed in parallel using two or more separate multithreaded processor cores.

2. The processor of clause 1, wherein the two or more dependent threads are synchronized using a barrier stored in shared memory accessible to the two or more dependent threads.

3. The processor of clause 1 or 2, wherein the two or more dependent threads are part of a cooperative thread group.

4. The processor of any of clauses 1 to 3, wherein the two or more dependent threads are threads are part of a cooperative thread group, and a number of threads in the cooperative thread group is restricted to a power of 2.

5. The processor of any of clauses 1 to 4, wherein the two or more dependent threads are each part of different groups of threads, each group of threads capable of being executed in parallel by a symmetric multiprocessor core.

6. The processor of clause 5, wherein the one or more circuits cause the groups of threads to be executed in parallel.

7. The processor of any of clauses 1 to 6, wherein the one or more circuits synchronize a plurality of cooperative groups, and the plurality of cooperative groups are part of a cooperative thread array.

8. A processor comprising one or more circuits to cause a first group of threads to be organized in two or more subgroups of threads to be performed in parallel using two or more processor cores.

9. The processor of clause 8, wherein the two or more subgroups are synchronized using a barrier stored in shared memory.

10. The processor of clause 8 or 9, wherein the barrier is implemented as a counter that counts a number of subgroups that are synchronized to determine that the first group of threads is synchronized.

11. The processor of any of clauses 8 to 10, wherein each of the two or more subgroups of threads is group of threads capable of being run in parallel on a symmetric multiprocessor.

12. The processor of any of clauses 8 to 11, wherein each subgroup of threads of the two or more subgroups of threads is the same size.

13. The processor of any of clauses 8 to 12, wherein a number of barriers are allocated sufficient to synchronize every possible combination of the two or more subgroups of threads into a cooperative group.

14. The processor of any of clauses 8 to 13, wherein a number of subgroups of threads that the first group of threads is organized into is a power of two.

15. The processor of any of clauses 8 to 14, wherein an application programming interface provides alternative implementations for collaborative groups based at least in part on a size of each subgroup of threads of the two or more subgroups of threads.

16. A computer-implemented method comprising causing two or more dependent threads to be performed in parallel using two or more separate multithreaded processor cores.

17. The computer-implemented method of clause 16, wherein the two or more dependent threads are synchronized using a barrier stored in shared memory accessible to the two or more dependent threads.

18. The computer-implemented method of clause 16 or 17, wherein the two or more dependent threads are part of a cooperative thread group.

19. The computer-implemented method of any of clauses 16 to 18, wherein the two or more dependent threads are threads are part of a cooperative thread group, and a number of threads in the cooperative thread group is restricted to a power of 2.

20. The computer-implemented method of any of clauses 16 to 18, wherein the two or more dependent threads are each part of different groups of threads, each group of threads capable of being executed in parallel by a symmetric multiprocessor core.

21. The computer-implemented method of clause 20, further comprising causing the groups of threads to be executed in parallel.

22. The computer-implemented method of any of clauses 16 to 21, further comprising synchronizing a plurality of cooperative groups, the plurality of cooperative groups are part of a cooperative thread array.

23. A computer-implemented method further comprising causing a first group of threads to be organized in two or more subgroups of threads to be performed in parallel using two or more processor cores.

24. The computer-implemented method of clause 23, wherein the two or more subgroups are synchronized using a barrier stored in shared memory.

25. The computer-implemented method of clause 24, wherein the barrier is implemented as a counter that counts a number of subgroups that are synchronized to determine that the first group of threads is synchronized.

26. The computer-implemented method of any of clauses 23 to 25, wherein each of the two or more subgroups of threads is group of threads capable of being run in parallel on a symmetric multiprocessor.

27. The computer-implemented method of any of clauses 23 to 26, wherein each subgroup of threads of the two or more subgroups of threads is the same size.

28. The computer-implemented method of any of clauses 23 to 27, wherein a number of barriers are allocated sufficient to synchronize every possible combination of the two or more subgroups of threads into a cooperative group.

29. The computer-implemented method of any of clauses 23 to 28, wherein a number of subgroups of threads that the first group of threads is organized into is a power of two.

30. The computer-implemented method of any of clauses 23 to 29, wherein an application programming interface provides alternative implementations for collaborative groups based at least in part on a size of each subgroup of threads of the two or more subgroups of threads.

31. A computer system comprising one or more processors and memory storing executable instructions that, as a result of being executed by the one or more processors, cause two or more dependent threads to be performed in parallel using two or more separate multithreaded processor cores.

32. The computer system of clause 31, wherein the two or more dependent threads are synchronized using a barrier stored in shared memory accessible to the two or more dependent threads.

33. The computer system of claim 31 or 32, wherein the two or more dependent threads are part of a cooperative thread group.

34. The computer system of any of claims 31 to 33, wherein the two or more dependent threads are threads are part of a cooperative thread group, and a number of threads in the cooperative thread group is restricted to a power of two.

35. The computer system of any of claims 31 to 34, wherein the two or more dependent threads are each part of different groups of threads, each group of threads capable of being executed in parallel by a symmetric multiprocessor core.

36. The computer system of clause 35, wherein the executable instructions further cause the groups of threads to be executed in parallel.

37. The computer system of any of claims 31 to 36, wherein the executable instructions further cause the computer system to synchronize a plurality of cooperative groups, and the plurality of cooperative groups are part of a cooperative thread array.

38. A computer system comprising one or more processors and memory storing executable instructions that, as a result of being executed by the one or more processors, cause a first group of threads to be organized in two or more subgroups of threads to be performed in parallel using two or more processor cores.

39. The computer system of clause 38, wherein the two or more subgroups are synchronized using a barrier stored in shared memory.

40. The computer system of clause 39, wherein the barrier is implemented as a counter that counts a number of subgroups that are synchronized to determine that the first group of threads is synchronized.

41. The computer system of clause 38 or 39, wherein each of the two or more subgroups of threads is group of threads capable of being run in parallel on a symmetric multiprocessor.

42. The computer system of any of clauses 38 to 41, wherein each subgroup of threads of the two or more subgroups of threads is the same size.

43. The computer system of any of clauses 38 to 42, wherein a number of barriers are allocated sufficient to synchronize every possible combination of the two or more subgroups of threads into a cooperative group.

44. The computer system of any of clauses 38 to 43, wherein a number of subgroups of threads that the first group of threads is organized into is a power of two.

45. The computer system of any of clauses 38 to 44, wherein an application programming interface provides alternative implementations for collaborative groups based at least in part on a size of each subgroup of threads of the two or more subgroups of threads.

46. A machine-readable medium having stored thereon a set of instructions, which if performed by one or more processors, cause the one or more processors to at least cause two or more dependent threads to be performed in parallel using two or more separate multithreaded processor cores.

47. The machine-readable medium of clause 46, wherein the two or more dependent threads are synchronized using a barrier stored in shared memory accessible to the two or more dependent threads.

48. The machine-readable medium of clause 46 or 47, wherein the two or more dependent threads are part of a cooperative thread group.

49. The machine-readable medium of any of clauses 46 to 48, wherein the two or more dependent threads are threads are part of a cooperative thread group, and a number of threads in the cooperative thread group is restricted to a power of two.

50. The machine-readable medium of any of clauses 46 to 49, wherein the two or more dependent threads are each part of different groups of threads, each group of threads capable of being executed in parallel by a symmetric multiprocessor core.

51. The machine-readable medium of clause 50, wherein the instructions further cause the groups of threads to be executed in parallel.

52. The machine-readable medium of any of clauses 46 to 51, wherein the instructions further cause the one or more processors to synchronize a plurality of cooperative groups, and the plurality of cooperative groups are part of a cooperative thread array.

53. A machine-readable medium having stored thereon a set of instructions, which if performed by one or more processors, cause the one or more processors to at least cause a first group of threads to be organized in two or more subgroups of threads to be performed in parallel using two or more processor cores.

54. The machine-readable medium of clause 53, wherein the two or more subgroups are synchronized using a barrier stored in shared memory.

55. The machine-readable medium of clause 54, wherein the barrier is implemented as a counter that counts a number of subgroups that are synchronized to determine that the first group of threads is synchronized.

56. The machine-readable medium of any of clauses 53 to 55, wherein each of the two or more subgroups of threads is group of threads capable of being run in parallel on a symmetric multiprocessor.

57. The machine-readable medium of any of clauses 53 to 56, wherein each subgroup of threads of the two or more subgroups of threads is the same size.

58. The machine-readable medium of any of clauses 53 to 57, wherein a number of barriers are allocated sufficient to synchronize every possible combination of the two or more subgroups of threads into a cooperative group.

59. The machine-readable medium of any of clauses 53 to 58, wherein a number of subgroups of threads that the first group of threads is organized into is a power of two.

60. The machine-readable medium of any of clauses 53 to 59, wherein an application programming interface provides alternative implementations for collaborative groups based at least in part on a size of each subgroup of threads of the two or more subgroups of threads.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising: circuitry to distribute a processing task into two or more warps and cause each of the two or more warps to be performed concurrently in parallel using a separate multithreaded processor core, wherein a first group of the two or more warps is dependent on at least one warp in a second group of the two or more warps.

2. The one or more processors of claim 1, wherein the two or more warps are synchronized using a barrier stored in shared memory accessible to the two or more warps.

3. The one or more processors of claim 2, wherein:
the barrier is implemented as a counter; and
the barrier increments when each thread of the two or more warps are synchronized.

4. The one or more processors of claim 2, wherein:
the barrier is implemented as a counter; and
the barrier releases the two or more warps when the counter reaches a predetermined value.

5. The one or more processors of claim 2, wherein:
the barrier is implemented as a bit field; and
each bit of the bit field represents a different thread of the two or more warps.

6. The one or more processors of claim 2, wherein:
the barrier is implemented as a bit field; and
each bit of the bit field is modified when a corresponding thread of the two or more warps is synchronized.

7. The one or more processors of claim 1, wherein the two or more warps are part of a cooperative thread group.

8. The one or more processors of claim 1, wherein:
the two or more warps comprise threads that are part of a cooperative thread group; and
a number of threads in the cooperative thread group is restricted to a power of 2.

9. The one or more processors of claim 1, wherein each of the two or more warps comprise different groups of threads of a single cooperative thread group, wherein each group of threads is capable of being executed in parallel by a symmetric multiprocessor core.

10. The one or more processors of claim 9, wherein the circuitry causes each group of the different groups of threads to be executed in parallel.

11. The one or more processors of claim 9, wherein the different groups of threads is the same size.

12. The one or more processors of claim 9, wherein the different groups of threads are synchronized by a barrier.

13. The one or more processors of claim 1, wherein:
the circuitry synchronizes a plurality of cooperative groups; and
the plurality of cooperative groups are part of a cooperative thread array.

14. The one or more processors of claim 13, wherein the circuitry synchronizes the plurality of cooperative groups using a barrier.

15. The one or more processors of claim 1, wherein:
the two or more warps are each organized into different subgroups of threads;
the different subgroups of threads are synchronized using a barrier; and
the barrier is implemented as a counter that increments when each of the different subgroups of threads is synchronized.

16. The one or more processors of claim 1, wherein:
the two or more warps are each organized into different subgroups of threads;
the different subgroups of threads are synchronized using a barrier;
the barrier is implemented as a bit field; and
each bit of the bit field corresponds to each of the different subgroups of threads.

17. A computer-implemented method comprising:
generating a cooperative thread group to perform a processing task, the cooperative thread group comprising two or more dependent warps;
performing a first warp of the two or more dependent warps of the cooperative thread group in a first multithreaded processor core in parallel with a second warp of the two or more dependent warps of the cooperative thread group in a second multithreaded processor core; and releasing a memory corresponding to the cooperative thread group based, at least in part, on an identification that all of the two or more dependent warps are performed.

18. The computer-implemented method of claim 17, wherein the two or more dependent warps are synchronized using a barrier stored in shared memory accessible to the two or more dependent warps.

19. The computer-implemented method of claim 18, wherein:

the barrier is implemented as a counter; and the barrier increments when each thread of the two or more dependent warps are synchronized.

20. The computer-implemented method of claim 18, wherein:

the barrier is implemented as a counter; and the barrier releases the two or more dependent warps when the counter reaches a predetermined value.

21. The computer-implemented method of claim 18, wherein:

the barrier is implemented as a bit field; and each bit of the bit field represents a different thread of the two or more dependent warps.

22. The computer-implemented method of claim 18, wherein:

the barrier is implemented as a bit field; and each bit of the bit field is modified when a corresponding thread of the two or more dependent warps is synchronized.

23. The computer-implemented method of claim 17, wherein the two or more dependent warps are part of a cooperative thread group.

24. The computer-implemented method of claim 17, wherein:

the two or more dependent warps comprise threads that are part of a cooperative thread group; and a number of threads in the cooperative thread group is restricted to a power of 2.

25. The computer-implemented method of claim 17, wherein each of the two or more dependent warps comprise different groups of threads of the cooperative thread group, wherein each group of threads is capable of being executed in parallel by a symmetric multiprocessor core.

26. The computer-implemented method of claim 25, further comprising causing each group of the different groups of threads to be executed in parallel.

27. The computer-implemented method of claim 25, wherein the different groups of threads is the same size.

28. The computer-implemented method of claim 25, wherein the different groups of threads are synchronized by a barrier.

29. The computer-implemented method of claim 17, further comprising synchronizing a plurality of cooperative groups, the plurality of cooperative groups are part of a cooperative thread array.

30. The computer-implemented method of claim 29, wherein synchronizing the plurality of cooperative groups comprises using a barrier.

31. The computer-implemented method of claim 17, wherein:

the two or more dependent warps are each organized into different subgroups of threads;

the different subgroups of threads are synchronized using a barrier; and the barrier is implemented as a counter that increments when each of the different subgroups of threads is synchronized.

32. The computer-implemented method of claim 17, wherein:

the two or more dependent warps are each organized into different subgroups of threads;

the different subgroups of threads are synchronized using a barrier;

the barrier is implemented as a bit field; and each bit of the bit field corresponds to each of the different subgroups of threads.

33. A computer system, comprising:

one or more processors and memory storing executable instructions that, as a result of being executed by the one or more processors, distribute a processing task into two or more warps and cause each of the two or more warps to be performed concurrently in parallel using a separate multithreaded processor core, wherein a first group of the two or more warps is dependent on at least one warp in a second group of the two or more warps.

34. The computer system of claim 33, wherein the two or more warps are synchronized using a barrier stored in shared memory accessible to the two or more warps.

35. The computer system of claim 34, wherein:

the barrier is implemented as a counter; and the barrier increments when each thread of the two or more warps are synchronized.

36. The computer system of claim 34, wherein:

the barrier is implemented as a counter; and the barrier releases the two or more warps when the counter reaches a predetermined value.

37. The computer system of claim 34, wherein:

the barrier is implemented as a bit field; and each bit of the bit field represents a different thread of the two or more warps.

38. The computer system of claim 34, wherein:

the barrier is implemented as a bit field; and each bit of the bit field is modified when a corresponding thread of the two or more warps is synchronized.

39. The computer system of claim 33, wherein the two or more warps are part of a cooperative thread group.

40. The computer system of claim 33, wherein:

the two or more warps comprise threads that are part of a cooperative thread group; and a number of threads in the cooperative thread group is restricted to a power of two.

41. The computer system of claim 33, wherein each of the two or more warps comprise different groups of threads of a single cooperative thread group, wherein each group of threads is capable of being executed in parallel by a symmetric multiprocessor core.

42. The computer system of claim 41, wherein the executable instructions further cause each group of the different groups of threads to be executed in parallel.

43. The computer system of claim 41, wherein the different groups of threads is the same size.

44. The computer system of claim 41, wherein the different groups of threads are synchronized by a barrier.

45. The computer system of claim 33, wherein:

the executable instructions further cause the computer system to synchronize a plurality of cooperative groups; and the plurality of cooperative groups are part of a cooperative thread array.

46. The computer system of claim 45, wherein the computer system synchronizes the plurality of cooperative groups using a barrier.

47. The computer system of claim 33, wherein:
the two or more warps are each organized into different subgroups of threads;
the different subgroups of threads are synchronized using a barrier; and
the barrier is implemented as a counter that increments when each of the different subgroups of threads is synchronized.

48. The computer system of claim 33, wherein:
the two or more warps are each organized into different subgroups of threads;
the different subgroups of threads are synchronized using a barrier;
the barrier is implemented as a bit field; and
each bit of the bit field corresponds to each of the different subgroups of threads.

49. A machine-readable medium having stored thereon a set of instructions, which if performed by one or more processors, distribute a processing task into two or more warps and cause each of the two or more warps to be performed concurrently in parallel using a separate multithreaded processor core, wherein a first group of the two or more warps is dependent on at least one warp in a second group of the two or more warps.

50. The machine-readable medium of claim 49, wherein the two or more warps are synchronized using a barrier stored in shared memory accessible to the two or more warps.

51. The machine-readable medium of claim 50, wherein:
the barrier is implemented as a counter; and
the barrier increments when each thread of the two or more warps are synchronized.

52. The machine-readable medium of claim 50, wherein:
the barrier is implemented as a counter; and
the barrier releases the two or more warps when the counter reaches a predetermined value.

53. The machine-readable medium of claim 50, wherein:
the barrier is implemented as a bit field; and
each bit of the bit field represents a different thread of the two or more warps.

54. The machine-readable medium of claim 49, wherein the two or more warps are part of a cooperative thread group.

55. The machine-readable medium of claim 49, wherein:
the two or more warps comprise threads that are part of a cooperative thread group; and
a number of threads in the cooperative thread group is restricted to a power of two.

56. The machine-readable medium of claim 49, wherein each of the two or more warps comprise different groups of threads of a single cooperative thread group, wherein each group of threads is capable of being executed in parallel by a symmetric multiprocessor core.

57. The machine-readable medium of claim 56, wherein the instructions further cause each group of the different groups of threads to be executed in parallel.

58. The machine-readable medium of claim 49, wherein:
the instructions further cause the one or more processors to synchronize a plurality of cooperative groups; and
the plurality of cooperative groups are part of a cooperative thread array.

59. The machine-readable medium of claim 49, wherein:
the two or more warps are each organized into different subgroups of threads;
the different subgroups of threads are synchronized using a barrier; and
the barrier is implemented as a counter that increments when each of the different subgroups of threads is synchronized.

60. The machine-readable medium of claim 49, wherein:
the two or more warps are each organized into different subgroups of threads;
the different subgroups of threads are synchronized using a barrier;
the barrier is implemented as a bit field; and
each bit of the bit field corresponds to each of the different subgroups of threads.

* * * * *